United States Patent
Ko et al.

(10) Patent No.: US 10,425,264 B2
(45) Date of Patent: Sep. 24, 2019

(54) METHOD OF TRANSMITTING SYNCHRONIZATION SIGNAL AND APPARATUS THEREFOR

(71) Applicant: LG ELECTRONICS INC., Seoul (KR)

(72) Inventors: Hyunsoo Ko, Seoul (KR); Kijun Kim, Seoul (KR); Eunsun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 68 days.

(21) Appl. No.: 15/864,680

(22) Filed: Jan. 8, 2018

(65) Prior Publication Data
US 2018/0198659 A1 Jul. 12, 2018

Related U.S. Application Data

(60) Provisional application No. 62/444,302, filed on Jan. 9, 2017, provisional application No. 62/502,543, filed on May 5, 2017.

(51) Int. Cl.
| | |
|---|---|
| *H04L 12/50* | (2006.01) |
| *H04L 27/26* | (2006.01) |
| *H04W 56/00* | (2009.01) |
| *H04L 5/00* | (2006.01) |

(52) U.S. Cl.
CPC .......... *H04L 27/2613* (2013.01); *H04L 5/005* (2013.01); *H04L 5/0053* (2013.01); *H04L 27/2602* (2013.01); *H04L 27/2662* (2013.01); *H04W 56/00* (2013.01)

(58) Field of Classification Search
CPC ...................................................... H04L 12/50
USPC ........................................................... 370/329
See application file for complete search history.

(56) References Cited

U.S. PATENT DOCUMENTS 10,075,985 B2 * 9/2018 Pawar .................. H04L 5/1469

* cited by examiner

*Primary Examiner* — Dang T Ton
(74) *Attorney, Agent, or Firm* — Dentons US LLP

(57) ABSTRACT

A method of transmitting a synchronization signal block, which is transmitted by a base station in a wireless communication system, is disclosed in the present invention. The method includes the steps of mapping a synchronization signal block including a PSS (primary synchronization signal), an SSS (secondary synchronization signal), and a PBCH (physical broadcasting channel) to a plurality of symbols, and transmitting the synchronization signal block mapped to a plurality of the symbols to a user equipment. In this case, in a symbol mapped the PSS, in a symbol mapped the SSS, and in a symbol mapped the PBCH, centers of subcarriers to which the PSS, the SSS, and the PBCH are mapped are the same and the number of subcarriers to which the PBCH is mapped is greater than the number of subcarriers to which the PSS and the SSS are mapped.

20 Claims, 50 Drawing Sheets

FIG. 2
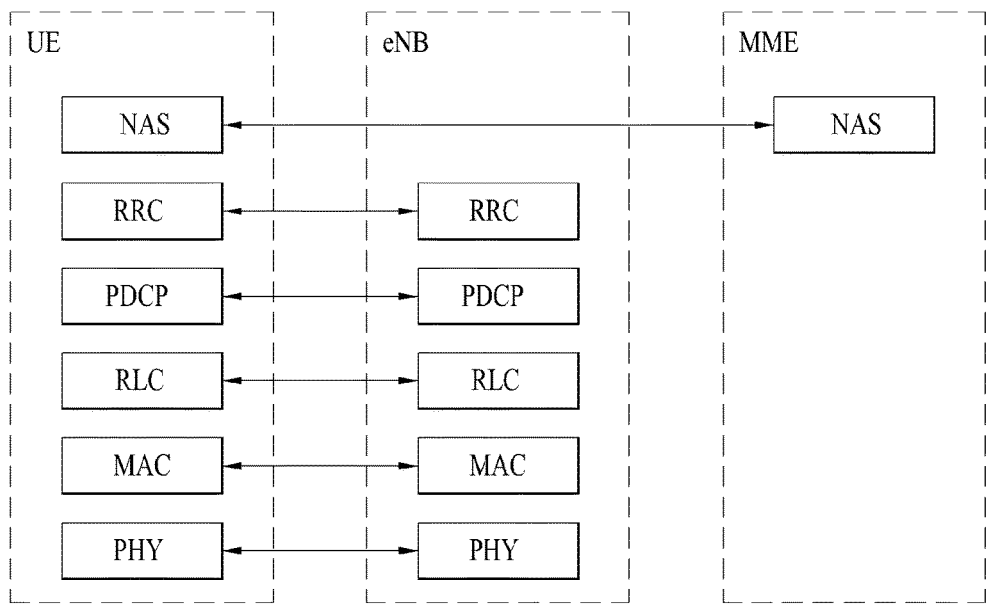
(A) CONTROL-PLANE PROTOCOL STACK
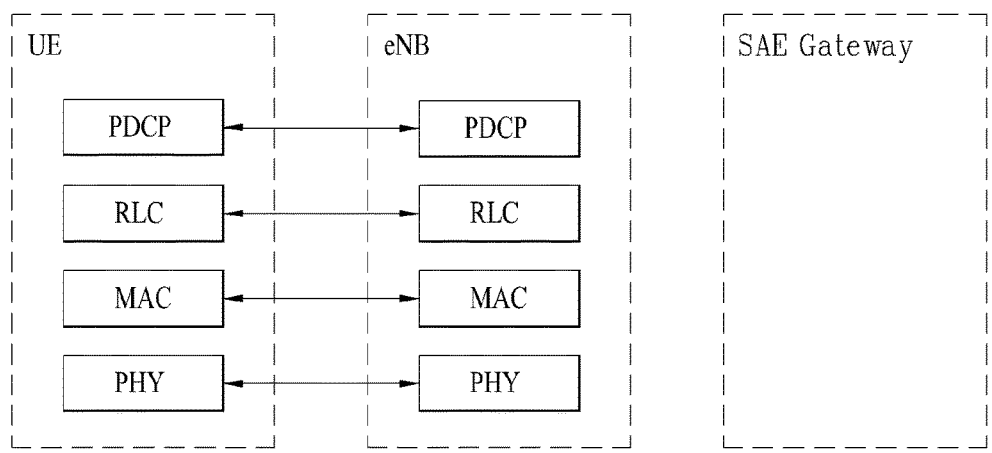
(B) USER-PLANE PROTOCOL STACK (a)          (b)

FIG. 13
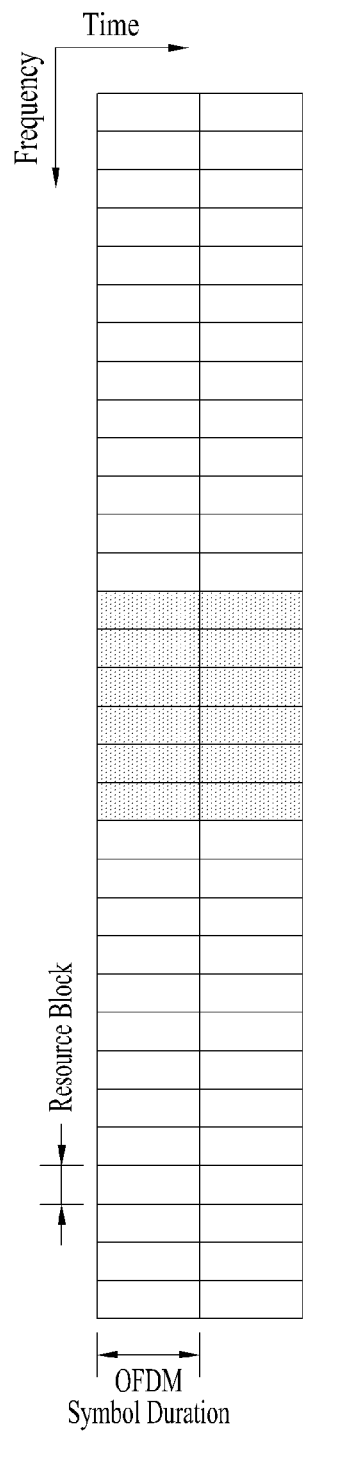
(a)
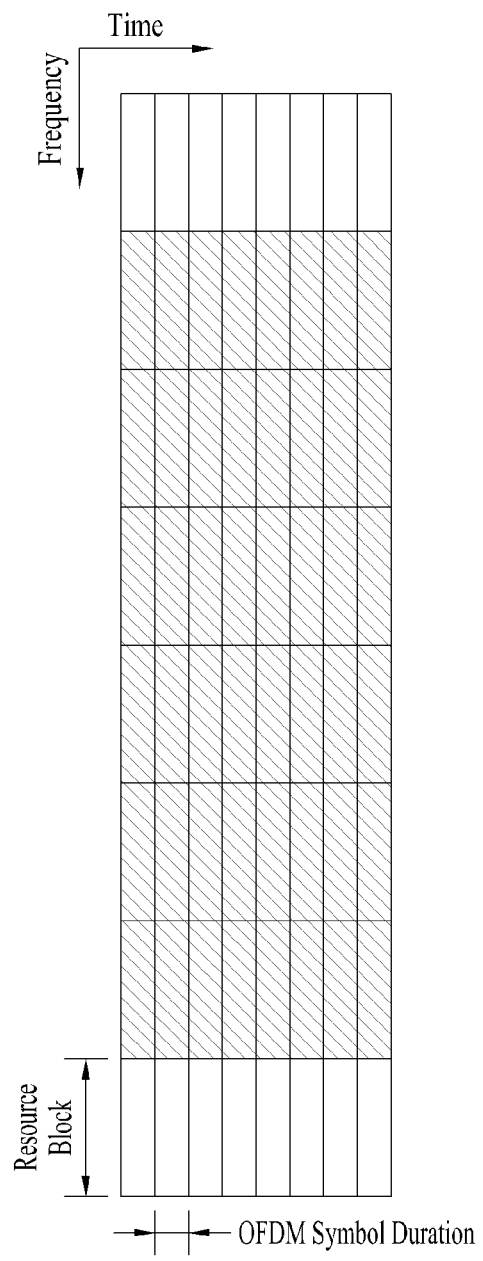
(b)

FIG. 19
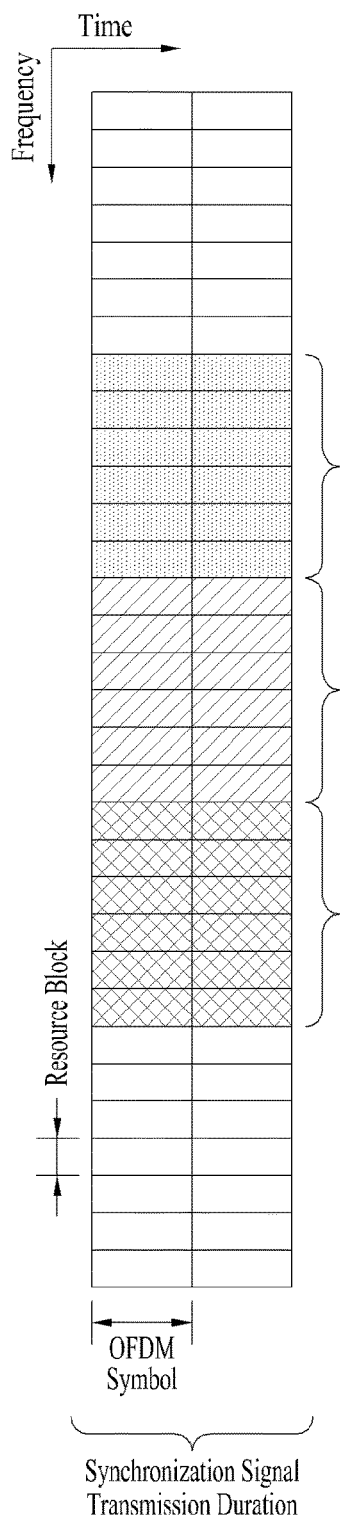
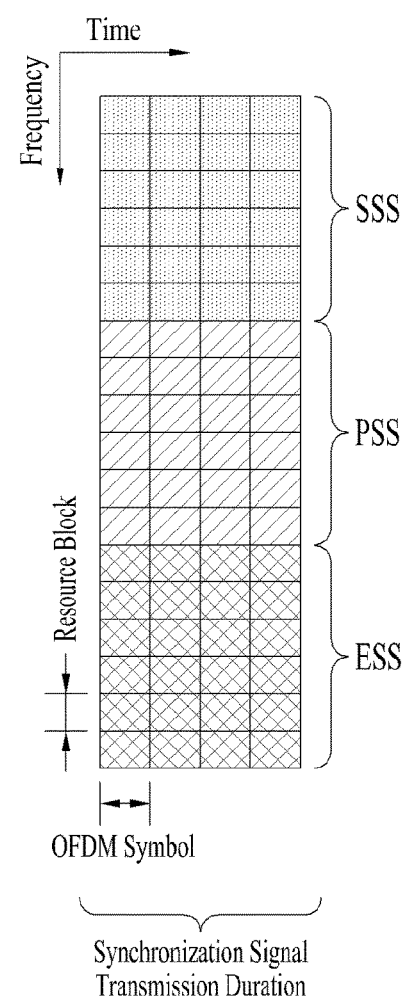
(a)    (b)

FIG. 38
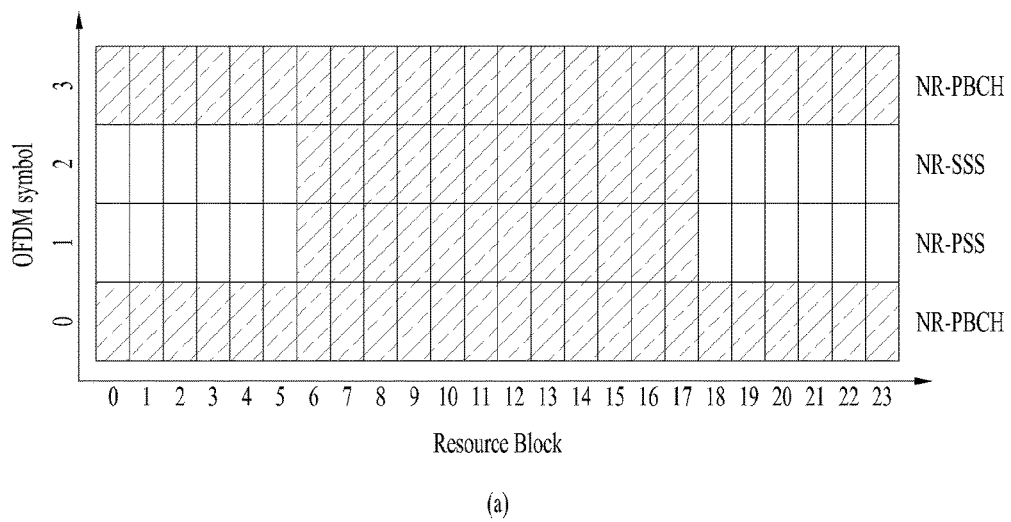
(a)
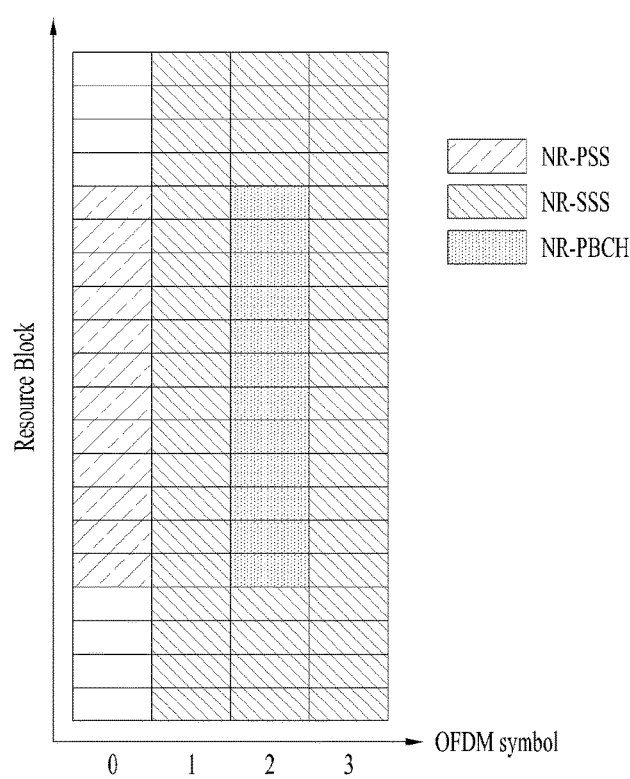
(b)

FIG. 47
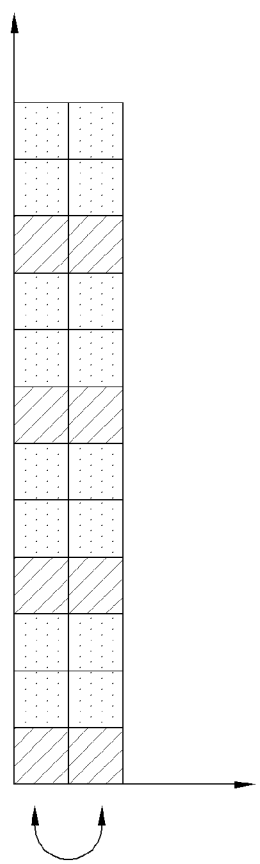
(a) 1 symbol spacing
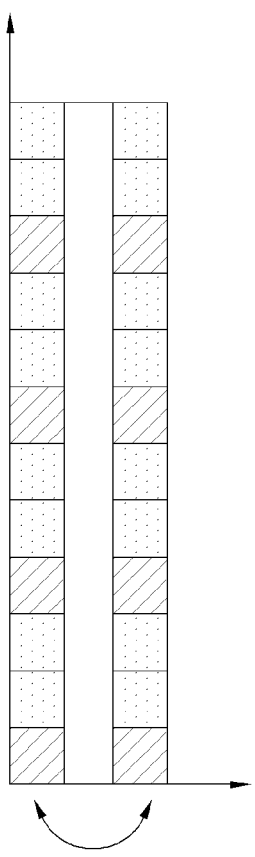
(b) 2 symbol spacing
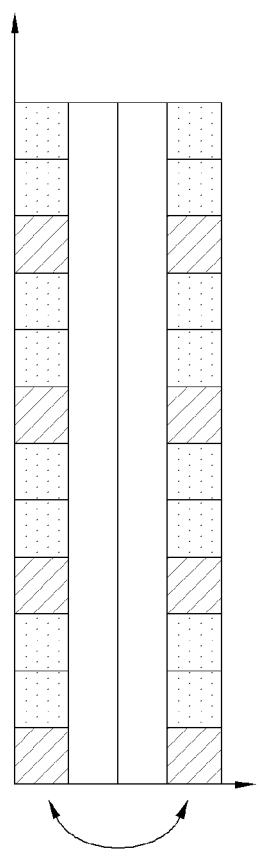
(c) 3 symbol spacing

METHOD OF TRANSMITTING SYNCHRONIZATION SIGNAL AND APPARATUS THEREFOR

CROSS-REFERENCE TO RELATED APPLICATIONS

Pursuant to 35 U.S.C. § 119(a), this application claims the benefit of earlier filing date and right of priority to U.S. Patent Application No. 62/444,302, filed on Jan. 9, 2017 and U.S. Patent Application No. 62/502,543, filed on May 5, 2017, the contents of which are hereby incorporated by reference herein in their entirety.

BACKGROUND OF THE INVENTION

Field of the Invention

The present invention relates to a method of transmitting a synchronization signal in a wireless communication system, and more particularly, to a method of transmitting a synchronization signal block including a PSS (primary synchronization signal), an SSS (secondary synchronization signal), and a PBCH (physical broadcasting channel) and an apparatus therefor.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to an apparatus and method thereof that substantially obviate one or more problems due to limitations and disadvantages of the related art.

An object of the present invention is to provide a method of transmitting a synchronization signal in a wireless communication system and an apparatus therefor.

Technical tasks obtainable from the present invention are non-limited the above mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting a synchronization signal block, which is transmitted by a base station in a wireless communication system, includes the steps of mapping a synchronization signal block including a PSS (primary synchronization signal), an SSS (secondary synchronization signal), and a PBCH (physical broadcasting channel) to a plurality of symbols, and transmitting the synchronization signal block mapped to a plurality of the symbols to a user equipment. In this case, in a symbol mapped the PSS, in a symbol mapped the SSS, and in a symbol mapped the PBCH, centers of subcarriers to which the PSS, the SSS, and the PBCH are mapped are the same and the number of subcarriers to which the PBCH is mapped is greater than the number of subcarriers to which the PSS and the SSS are mapped.

In this case, the PBCH is mapped to a plurality of symbols and the symbol to which the SSS is mapped can be located between symbols to which the PBCH is dedicatedly mapped.

And, all of the symbols to which the PBCH is mapped include a plurality of DMRSs and a plurality of the DMRSs can be arranged with an equal interval in the symbols to which the PBCH is mapped.

And, subcarrier spacing for the SSS is identical to subcarrier spacing for the PBCH and the SSS can be mapped to at least one symbol among a plurality of the symbols to which the PBCH is mapped.

wherein subcarriers to which the PBCH is mapped, in the at least one symbol to which the PBCH and the SSS are mapped, are located at the top or the bottom of a frequency axis of subcarriers to which the SSS is mapped and the PSS, the SSS, and the PBCH can be mapped to a plurality of contiguous symbols.

To further achieve these objects and other advantages and in accordance with the purpose of the invention, as embodied and broadly described herein, according to a different embodiment, a base station transmitting a synchronization signal block in a wireless communication system includes an RF unit configured to transceive a radio signal with a user equipment and a processor configured to map a synchronization signal block containing a PSS (primary synchronization signal), an SSS (secondary synchronization signal), and a PBCH (physical broadcasting channel) to a plurality of symbols in a manner of being connected with the RF unit, the processor configured to transmit the synchronization signal block mapped to a plurality of the symbols to the user equipment. In this case, in a symbol mapped the PSS, in a symbol mapped the SSS, and in a symbol mapped the PBCH, centers of subcarriers to which the PSS, the SSS, and the PBCH are mapped are the same and the number of subcarriers to which the PBCH is mapped is greater than the number of subcarriers to which the PSS and the SSS are mapped.

In this case, PBCH is mapped to a plurality of symbols and the symbol to which the SSS is mapped can be located between symbols to which the PBCH is dedicatedly mapped.

And, all of the symbols to which the PBCH is mapped include a plurality of DMRSs and a plurality of the DMRSs can be arranged with an equal interval in the symbols to which the PBCH is mapped.

subcarriers to which the PBCH is mapped, in the at least one symbol to which the PBCH and the SSS are mapped, are located at the top or the bottom of a frequency axis of subcarriers to which the SSS is mapped.

According to the present invention, it is able to more efficiently perform initial access by efficiently transmitting a synchronization signal in a subframe.

It will be appreciated by persons skilled in the art that the effects that can be achieved with the present disclosure are not limited to what has been particularly described hereinabove and other advantages of the present disclosure will be more clearly understood from the following detailed description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIGS. 12 to 15 are diagrams for explaining a method of designing a synchronization signal.

FIGS. 16 to 20 are diagrams for explaining embodiments for a method of multiplexing a synchronization signal.

Figure 21:
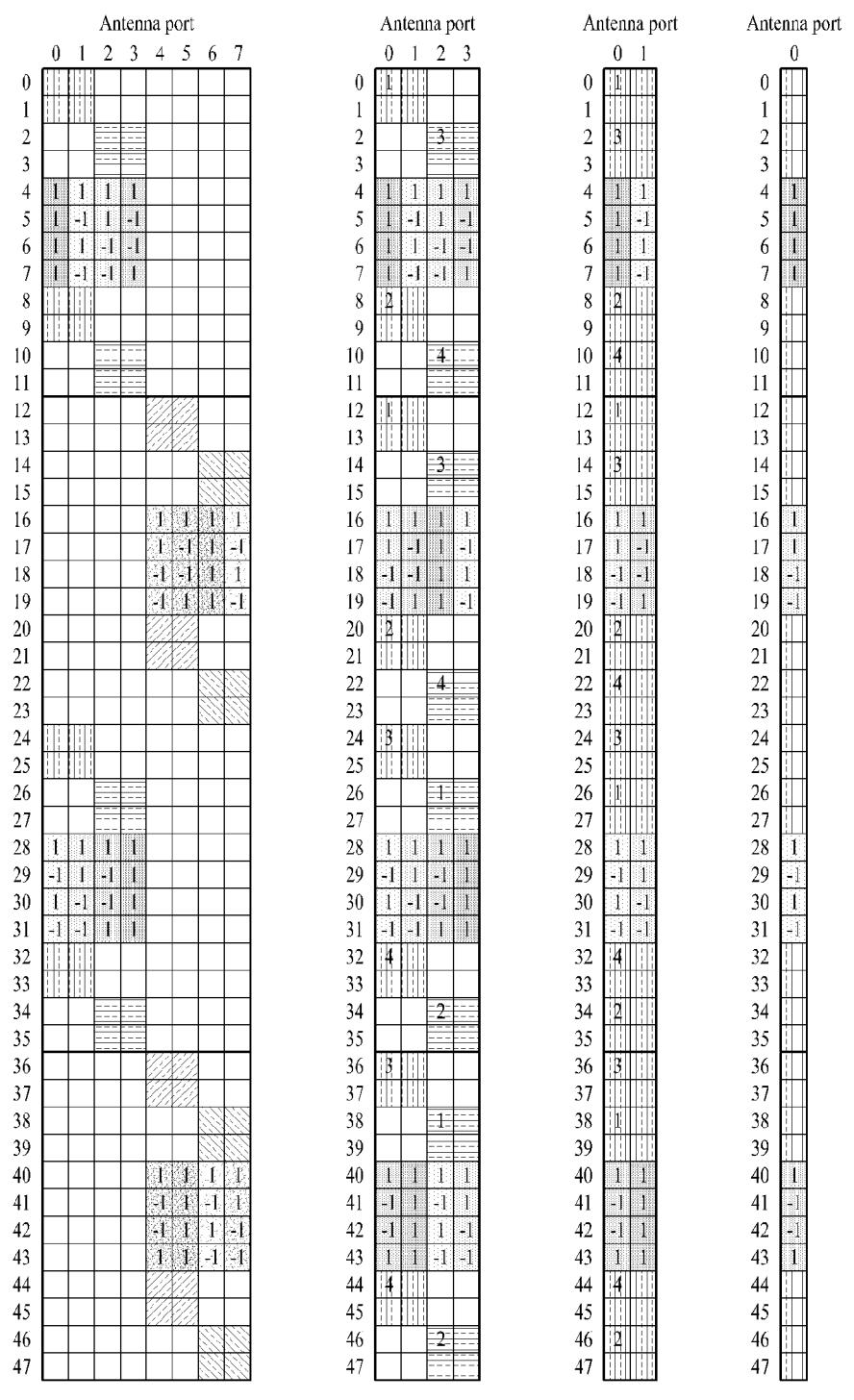
Figure 22:
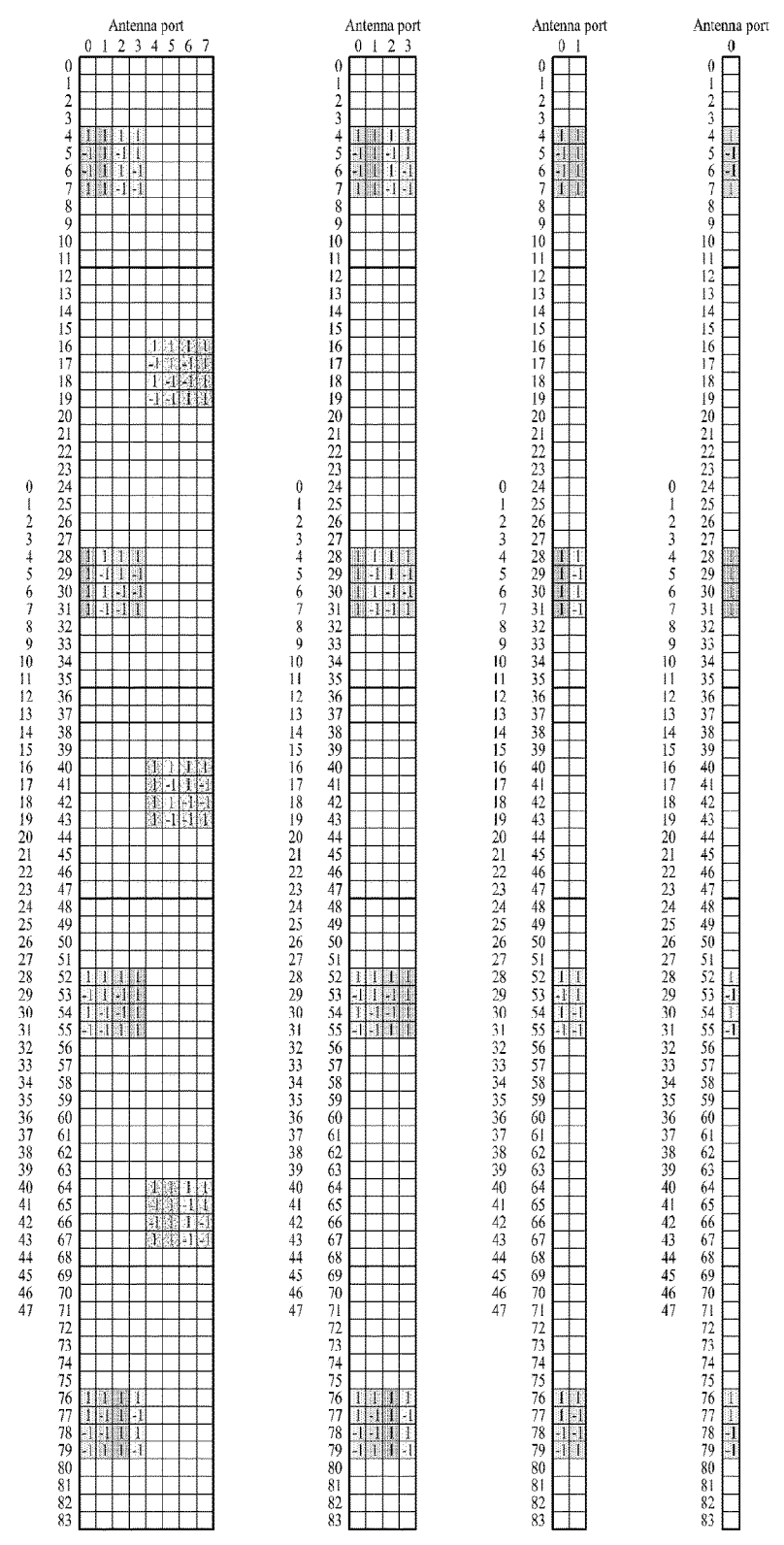

FIGS. 21 to 24 are diagrams for explaining a method of mapping a reference signal in a PBCH (physical broadcast channel).

FIGS. 32 to 38 are diagrams for explaining embodiments of multiplexing a PSS/SSS/PBCH in a synchronization signal.

FIGS. 43 to 49 are diagram for a result of measuring performance according to embodiments of the present invention.

DETAILED DESCRIPTION OF THE INVENTION

Figure 1:
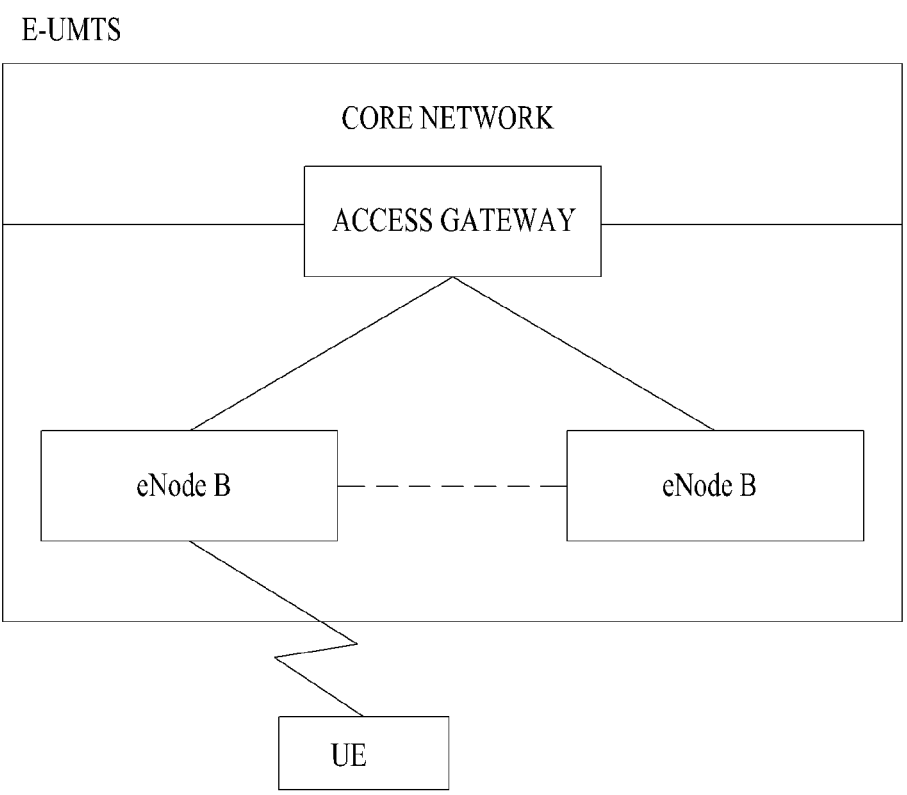
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present invention is described based on an LTE system and an LTE-A system in this specification, the LTE system and the LTE-A system are only exemplary and may be applied to all systems corresponding to the aforementioned definition.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
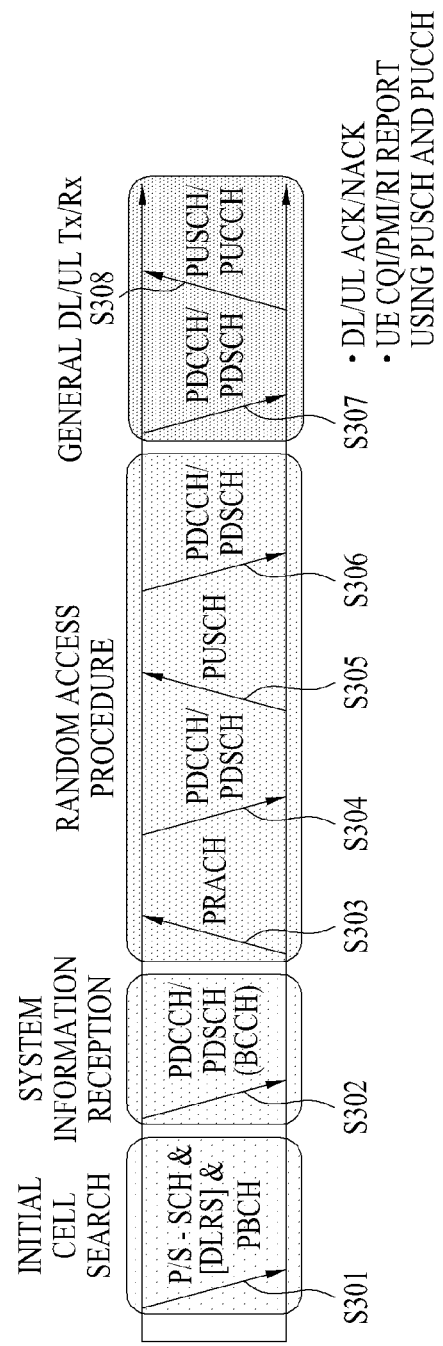
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
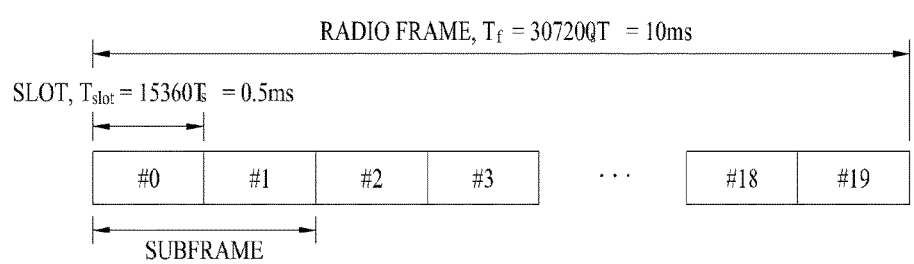
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
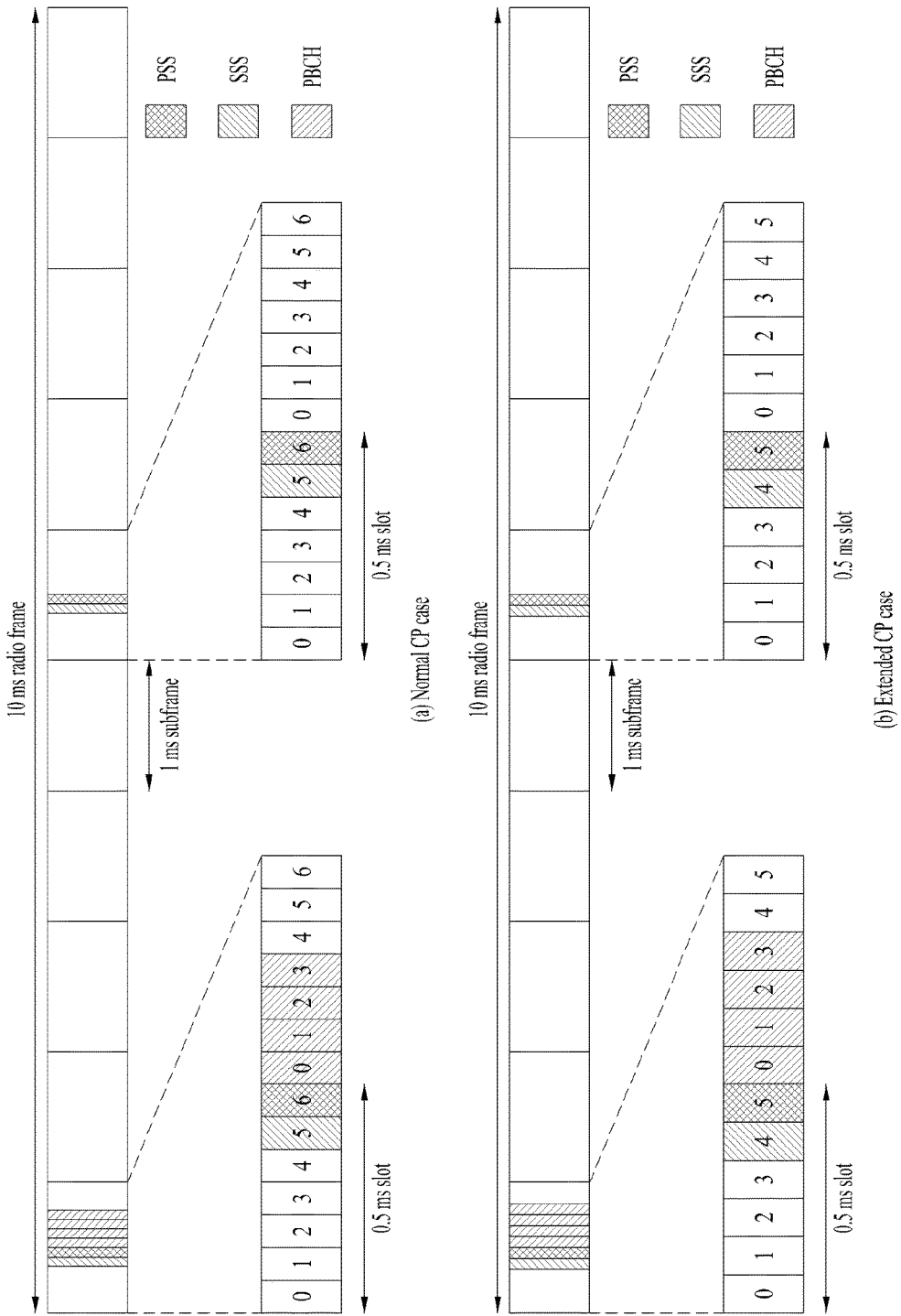
FIG. 5 illustrates a radio frame structure for transmitting an SS (synchronization signal) in LTE system.

FIG. 5 illustrates a radio frame structure for transmitting an SS (synchronization signal) in LTE system. In particular, FIG. 5 illustrates a radio frame structure for transmitting a synchronization signal and PBCH in FDD (frequency division duplex). FIG. 5 (*a*) shows positions at which the SS and the PBCH are transmitted in a radio frame configured by a normal CP (cyclic prefix) and FIG. 5 (b) shows positions at which the SS and the PBCH are transmitted in a radio frame configured by an extended CP.

An SS will be described in more detail with reference to FIG. 5. An SS is categorized into a PSS (primary synchronization signal) and an SSS (secondary synchronization signal). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 5, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 5, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)

Step 2: Random access response (RAR) (via PDCCH and PDSCH (eNB to)

Step 3: Layer 2/Layer 3 message (via PUSCH) (UE to eNB)

Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)

Step 1: RACH preamble (via PRACH) (UE to eNB)

Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In LTE/LTE-A system, subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 6:
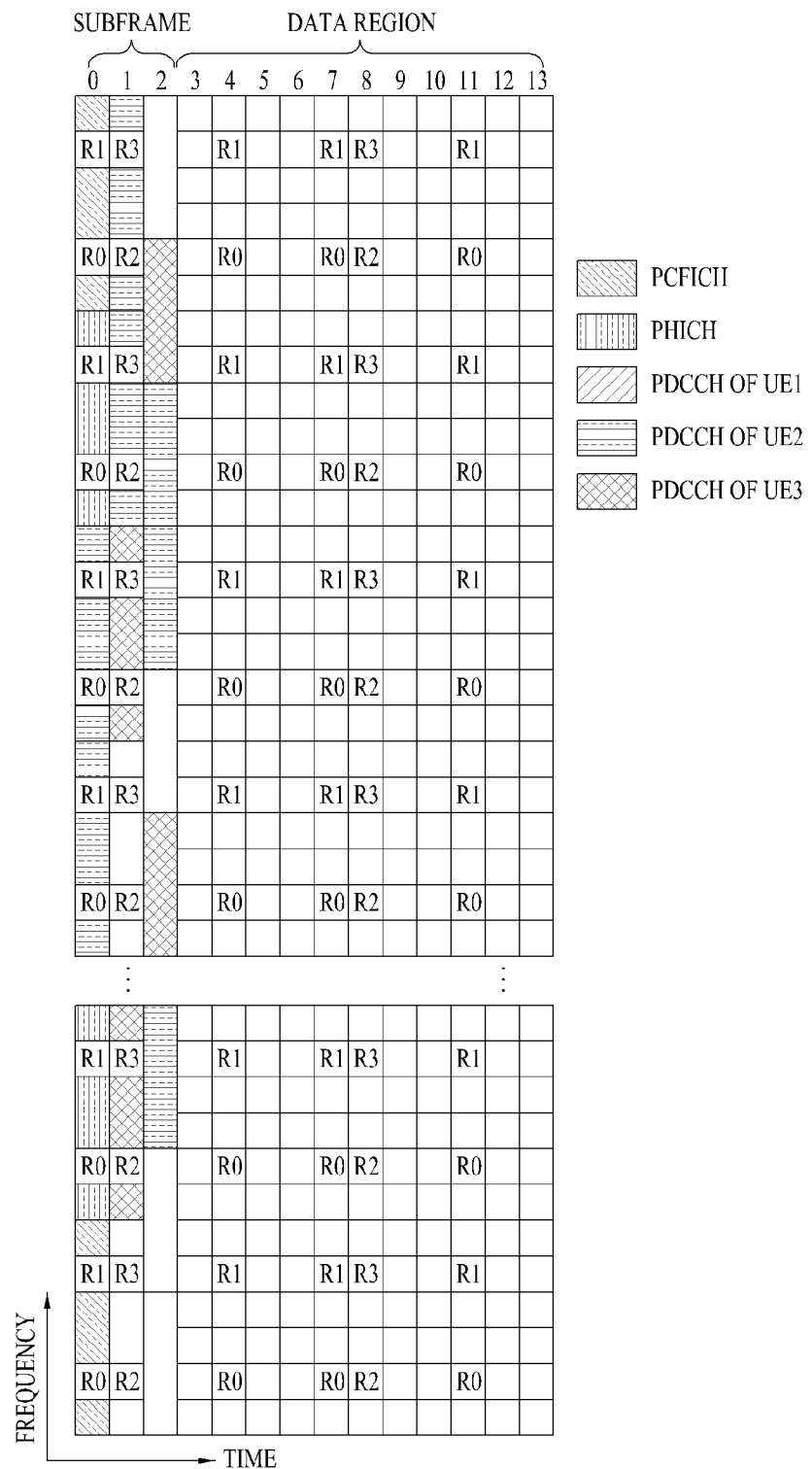
FIG. 6 illustrates a structure of a downlink radio frame in the LTE system.

FIG. 6 illustrates exemplary control channels included in a control region of a subframe in a DL radio frame.

Referring to FIG. 6, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3.

RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 7:
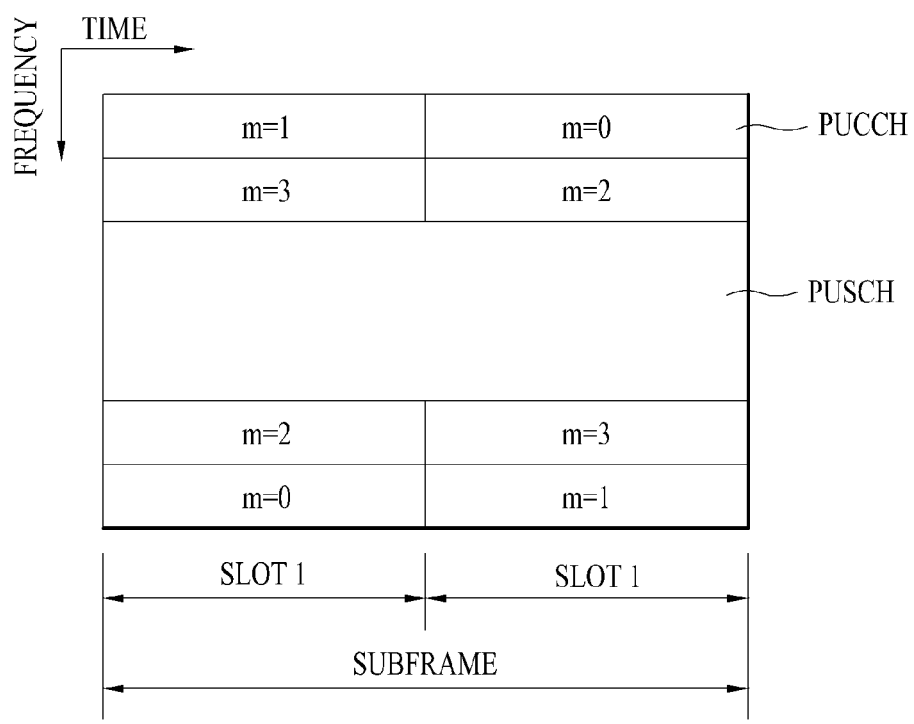
FIG. 7 illustrates a structure of an uplink subframe in the LTE system.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 7.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 8:
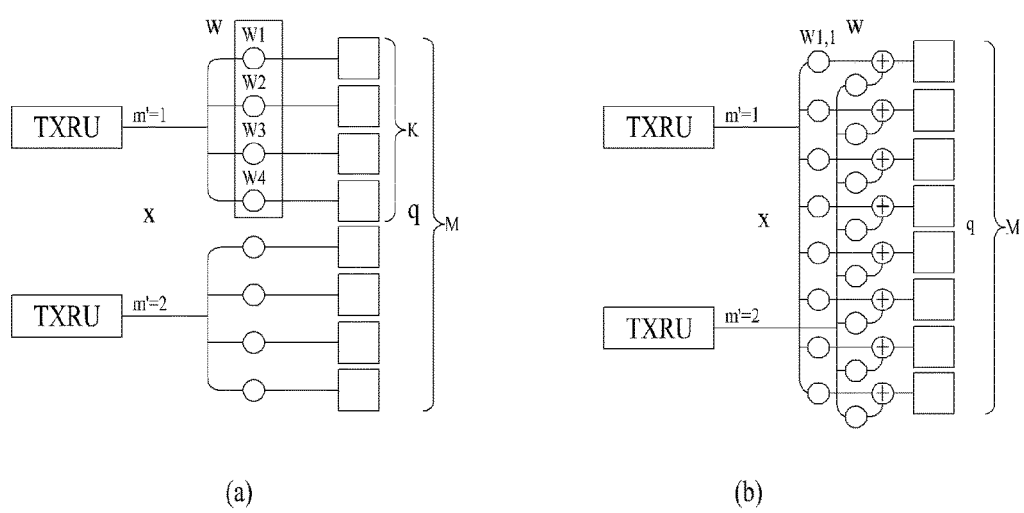
FIG. 8 illustrates examples of a connection scheme between TXRUs and antenna elements.

FIG. 8 illustrates examples of a connection scheme between TXRUs and antenna elements.

(a) of FIG. 8 illustrates that TXRU is connected to a sub-array. In this case, the antenna elements are connected to only one TXRU. Unlike (a) of FIG. 8, (b) of FIG. 8 illustrates that TXRU is connected to all antenna elements. In this case, the antenna elements are connected to all TXRUs. In FIG. 8, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 9:
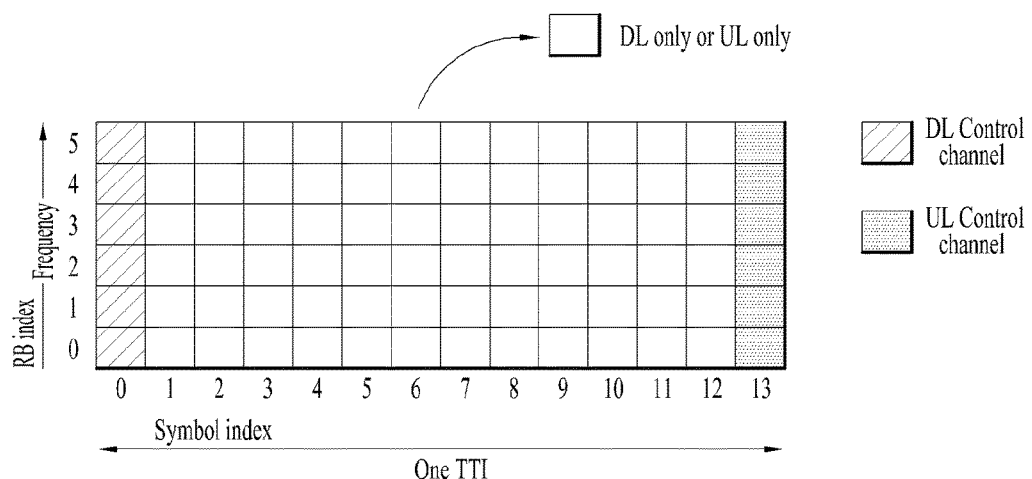
FIG. 9 illustrates an example of a self-contained subframe structure.

A self-contained subframe structure shown in FIG. 9 is considered in the fifth generation NewRAT to minimize data transmission latency in a TDD system. FIG. 9 illustrates an example of a self-contained subframe structure.

In FIG. 9, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
    downlink control period+downlink data period
    downlink control period+GP+uplink data period+uplink control period
    downlink control period+GP+uplink data period In the following, a method of configuring a synchronization signal is explained according to embodiments of the present invention. More specifically, a method of configuring a synchronization signal block (SS block), a synchronization signal burst (SS burst), and a synchronization signal burst set (SS burst set) is explained according to the embodiments of the present invention.

Unlike a legacy LTE system, as shown in the following, various numerologies are considered in a next generation mobile communication.

Subcarrier spacing: 15 kHz×$2^n$ (n=0, 1, 2, 3, . . . ), 15 kHz×(m=1, 2, 3, . . . )

Spectrum allocation: 20 MHz, 40 MHz, 80 MHz, 160 MHz . . . . In the next generation mobile communication, a BRS (beam selection reference signal) corresponding to a reference signal for selecting a best beam from among a plurality of beams is transmitted. In order to transmit the BRS, a plurality of OFDM symbols are required and an overhead problem may occur. As a result, complexity in designing a synchronization signal may increase in the next generation mobile communication system in which various numerologies are allowed. In order to reduce the complexity in designing the synchronization signal, the present invention proposes various methods in the following.

<1. Numerology>

Numerology including a CP length and subcarrier spacing can be differently applied to a channel and a signal defined in a physical layer of a mobile communication system. In particular, when there are channels and signals newly defined for a specific purpose as well as channels and signals such as a shared channel (SCH), a control channel (CCH), a broadcasting channel (BCH), a synchronization signal (SS), a channel state information reference signal (CSI-RS), a sounding reference signal (SRS), a data demodulation reference signal (DMRS), a random access channel (RACH), a multicast channel (MCH), and the like, as shown in the following embodiments, each of the channels and the signals can be designed to have a different numerology.

1. Embodiment 1

In a beam-formed system providing coverage using a plurality of beams, a method of transmitting a signal when an appropriate beam direction is obtained between a transmission point and a reception point may differ from a method of transmitting a signal when it fails to obtain a beam direction. For example, when a control channel and a data channel are transmitted, it is preferable to perform signal transmission after a beam appropriate for enhancing signal quality between a transmission point and a reception point is selected. On the other hand, in case of Initial access, Paging, Random access, Scheduling Request, and the like to be delivered by a TRP (transmission reception point) and a UE located at a random position before a beam appropriate for both directions is selected, it may be preferable to forward information in each direction to which a plurality of beams are heading. In this case, each of channels and signals can be designed with a different numerology.

Figure 10:
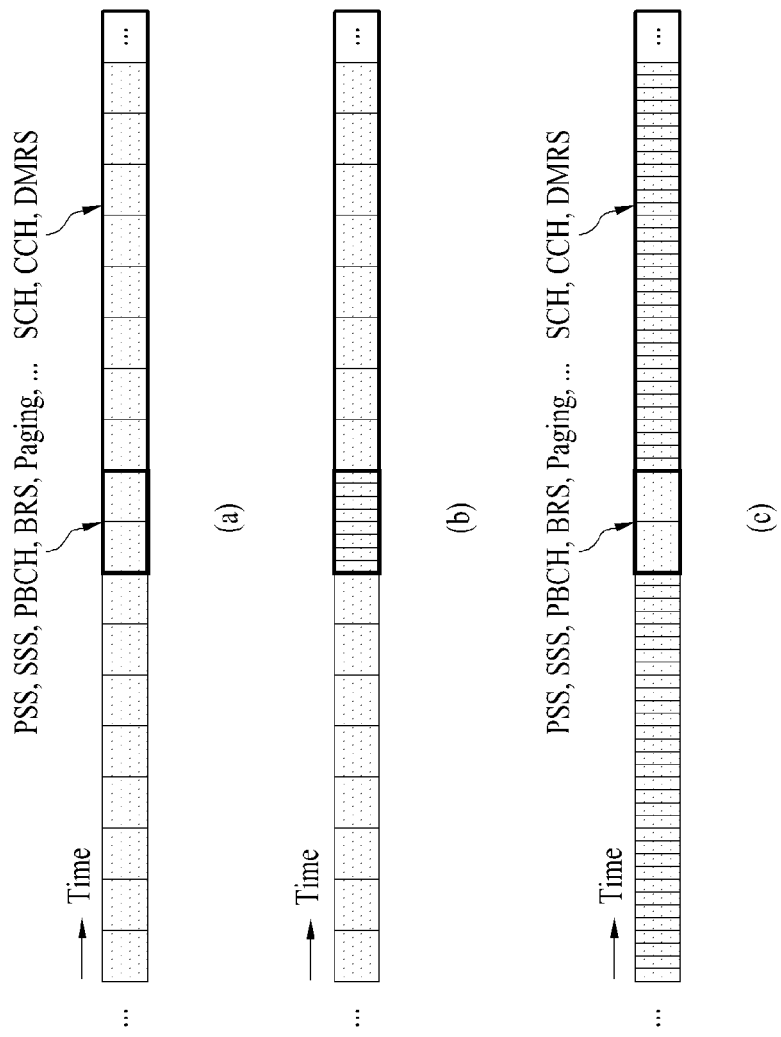
FIGS. 10 and 11 illustrate examples of applying a different numerology according to a channel and a signal.

For example, as shown in FIG. 10 (a), channels and signals can be designed to have the same symbol duration irrespective of a type of the channels and a type of the signals. Or, as shown in FIG. 10 (b), a PSS, an SSS, a PBCH, a BRS and a paging signal can be transmitted via a short OFDM symbol. An SCH, a CCH, and a DMRS can be transmitted via a long OFDM symbol.

On the other hand, in some cases, as shown in FIG. 10 (c), a PSS, an SSS, a PBCH, a BRS and a paging signal can be transmitted via a long OFDM symbol, whereas an SCH, a CCH, and a DMRS can be transmitted via a short OFDM symbol.

2. Embodiment 2

A numerology set including subcarrier spacing, a CP length, and the like of a shared channel (SCH) for transmitting data and a control channel (CCH) for transmitting control information can be configured in a manner of being different from a numerology set including a synchronization signal (SS) for performing initial access, a broadcasting channel (BCH) on which essential system information is transmitted, a paging control channel (PCCH) in charge of paging, a beam selection reference signal (BSR) for selecting a beam, and the like.

Specifically, when there are various subcarrier spacing (e.g., 15, 30, 60, 75, 120, 150, 240, . . . KHz) supported by a system, it may be able to configure a channel and a signal for forwarding data and control information to use all subcarrier spacing as much as possible.

On the contrary, a channel and a signal for performing initial access, paging, broadcasting, and the like are configured with subcarrier spacing (e.g., 15, 60, 240 kHz) of a limited value.

For example, in case of using numerology configured with subcarrier spacing of 15 kHz and a CP length of 4.69 us to transmit data, PSS/SSS can be configured with numerology identical to numerology of SCH or the PSS/SSS can be configured with subcarrier spacing (e.g., 60 kHz) wider than that of the SCH.

As a different example, when PSS/SSS is transmitted with specific numerology (e.g., subcarrier spacing of 15 kHz), different channels transmitted on a component carrier including the PSS/SSS can be configured by various numerologies (e.g., 15, 30, 60 kHz, etc.).

As a further different example, when PSS/SSS is transmitted with specific numerology (e.g., subcarrier spacing of 60 kHz), different channels transmitted on a component carrier including the PSS/SSS can be configured by various numerologies (e.g., 60, 120 kHz, etc.). As a further different example, when PSS/SSS is transmitted on 15 kHz, a BRS can be transmitted on 60 kHz.

3. Embodiment 3

A CP length applied to a channel and a signal for forwarding data and control information can be independently configured irrespective of a CP length applied to a channel and a signal for performing initial access, paging, and broadcasting.

When a PSS/SSS is configured with wider subcarrier spacing, if CP overhead is maintained with a legacy level (e.g., 4.69 us/66.667 us=7%), a CP length become shorter as much as 1/N (e.g., N=4, 15 kHz×N=60 kHz, 4.69 us×1/N=1.172 us). In this case, if delay spread becomes longer similar to a case that a cell radius is long or multi-TRP transmission is performed, it may cause inter-symbol interference.

In order to solve the inter-symbol interference problem, when a PSS/SSS, a paging signal, a broadcasting channel, or a beam selection signal is configured using symbol duration shorter than SCH, it may consider a method of matching a CP length with a length of the SCH.

For example, when PSS/SSS transmission time of a legacy LTE system corresponds to (4.69 us+66.667 us)× 2=142.714 us, in order to transmit PSS/SSS of wider subcarrier spacing during the time, it may use 8 OFDM symbols having a length of 17.839 us (=1.1725 us+16.667 us). In this case, since a CP length becomes shorter (4.69 us→1.1725 us), it may be difficult to handle delay spread of legacy coverage.

Hence, if a method of extending a CP length and reducing the number of symbols is applied, it may consider designing a CP length of 3.8 us and 7 OFDM symbols. (142.8 us=7×20.4 us=7×(3.8 us+16.667 us).

Figure 11:
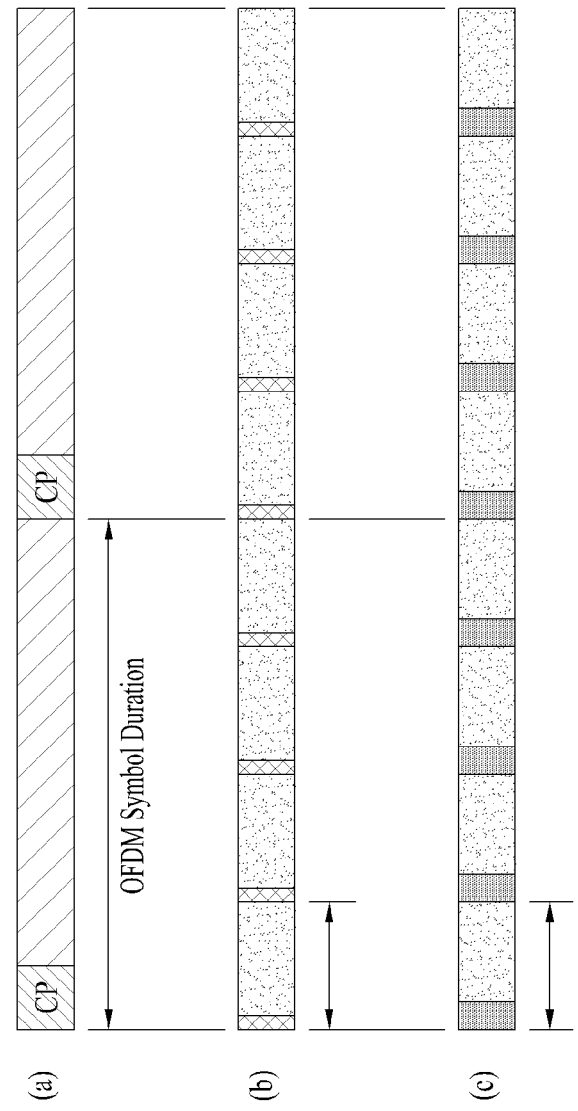

As shown in FIGS. 11 (a) and (b), if a length of an OFDM symbol is differentiated according to subcarrier spacing, it is able to see that a CP length becomes shorter in proportion to the length of the OFDM symbol. As shown in FIG. 11 (c), it may be able to generate an OFDM symbol robust to ISI by increasing CP overhead. For example, SCH is transmitted using a method shown in FIG. 11 (a) and SS/BCH/BRS can be transmitted using a method shown in FIG. 11 (a) or FIG. 11 (c).

4. Embodiment 4

It may configure time duration for which a common signal/channel is transmitted and beam sweeping can be performed as many as the number of OFDM symbols included in the time duration. Or, it may be able to define single beam transmission or multi-beam transmission according to a length of OFDM symbols included in the time duration.

Time duration shown in FIG. 11 is defined as duration for which a common signal/channel is transmitted. As shown in FIG. 11 (a), if two OFDM symbols are transmitted during the time duration, assume that a beam change occurs in each OFDM symbol and two beams are used. As shown in FIG. 11 (b), if eight OFDM symbols are transmitted during the time duration, assume that a different beam is transmitted in each of the eight OFDM symbols.

Or, the time duration shown in FIG. 11 is defined as duration for which a common signal/channel is transmitted. As shown in FIG. 11 (a), if a long OFDM symbol is transmitted, assume that single beam transmission is performed. As shown in FIG. 11 (b), if a short OFDM symbol is transmitted, assume that multi-beam transmission is performed.

<2. Common Design>

When a signal for performing initial access is configured in a system including various numerologies, the present invention proposes methods of designing the signal to be common to each of the numerologies as much as possible.

1. Embodiment 1

When a synchronization signal is designed, if a sequence is mapped using N number of subcarriers, it may use the N number of subcarriers irrespective of a length of subcarrier spacing.

Figure 12:
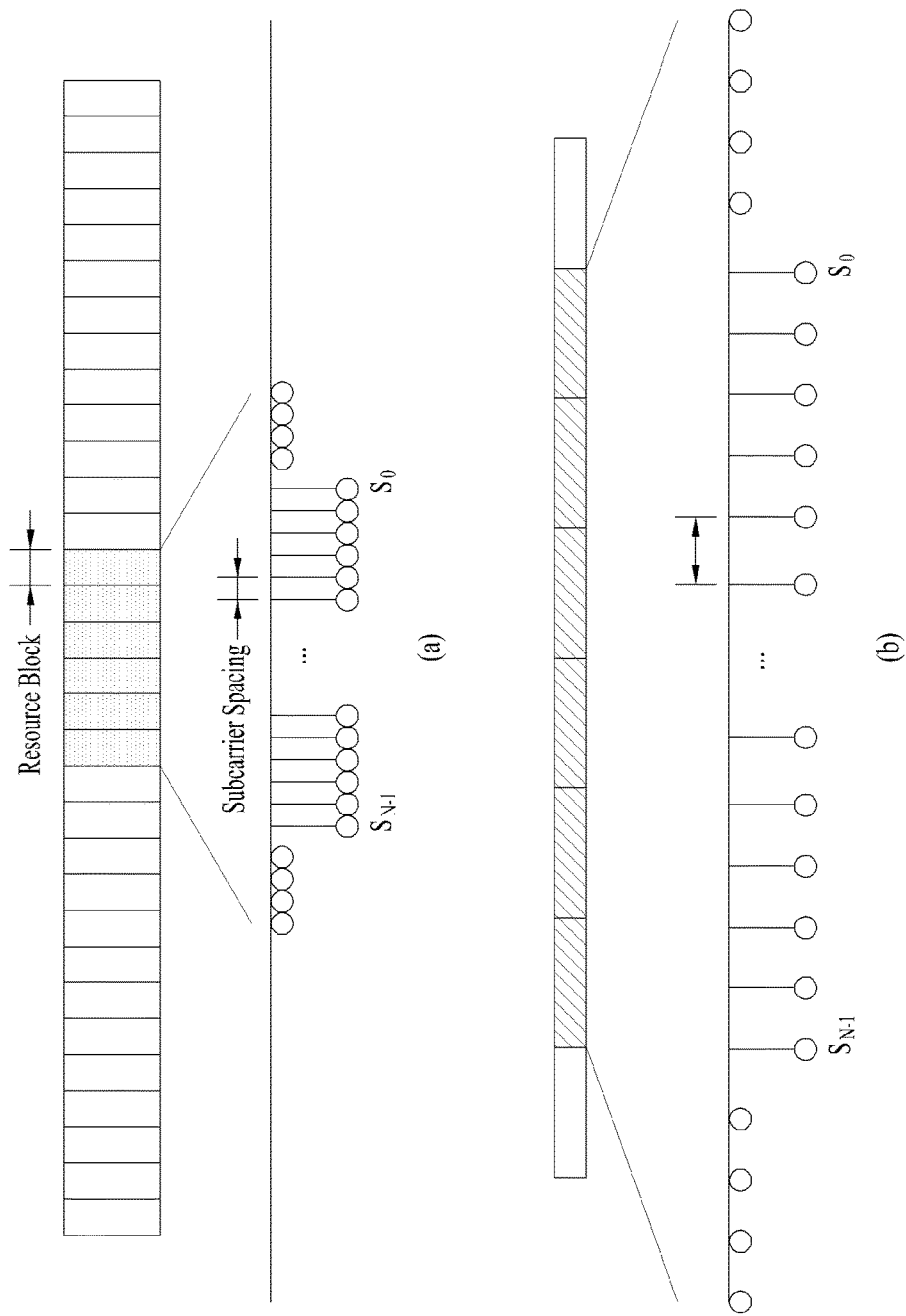

In particular, as shown in FIG. 12, when N numbers of sequences are used and a synchronization signal is configured by mapping the sequences to M (>N) number of subcarriers, the M number of subcarriers are commonly used by a symbol having narrow subcarrier spacing and a symbol having wide subcarrier spacing.

For example, when 72 subcarriers are used, if subcarrier spacing corresponds to 15 kHz, it may use a bandwidth of 1.08 MHz (=72×15 kHz). If subcarrier spacing corresponds to 60 kHz, it may use a bandwidth of 4.32 MHz (=72×60 kHz).

2. Embodiment 2

Duration of an OFDM symbol having narrow subcarrier spacing becomes longer, whereas duration of an OFDM symbol having wide subcarrier spacing becomes shorter. In this case, total time duration used for synchronization is used with a similar level irrespective of subcarrier spacing.

For example, as shown in FIG. 13 (a), if two OFDM symbols are used when subcarrier spacing is 15 kHz, as shown in FIG. 13 (b), total time duration is used with a similar level using 8 OFDM symbols when subcarrier spacing is 60 kHz.

Meanwhile, if a system bandwidth is wide enough and a space for transmitting a signal is sufficiently wide, it may be able to provide a time resource for performing multi-beam transmission by using wide subcarrier spacing and generating a plurality of OFDM symbols having a narrow time interval. On the contrary, if a system bandwidth is narrow, resource allocation is performed in a frequency unit using narrow subcarrier spacing.

3. Embodiment 3

A signal using narrow subcarrier spacing can be distinguished from a signal using wide subcarrier spacing according to a signal/channel used for initial access.

In this case, such a signal having narrow subcarrier spacing as a PSS/SSS/ESSS is transmitted using a long OFDM symbol and such a signal having wide subcarrier spacing as a BRS can be transmitted using a short OFDM symbol.

4. Embodiment 4

When a synchronization signal or a beam measurement reference signal is transmitted using multi-beam in a massive MIMO system, duration for which the synchronization signal or the beam measurement reference signal is transmitted can be restricted with a prescribed range irrespective of numerology. In particular, if the synchronization signal or the beam measurement reference signal is transmitted based on a long OFDM symbol, it may use the limited number of multi-beams compared to a case of transmitting the synchronization signal or the beam measurement reference signal based on a short OFDM symbol.

Figure 14:
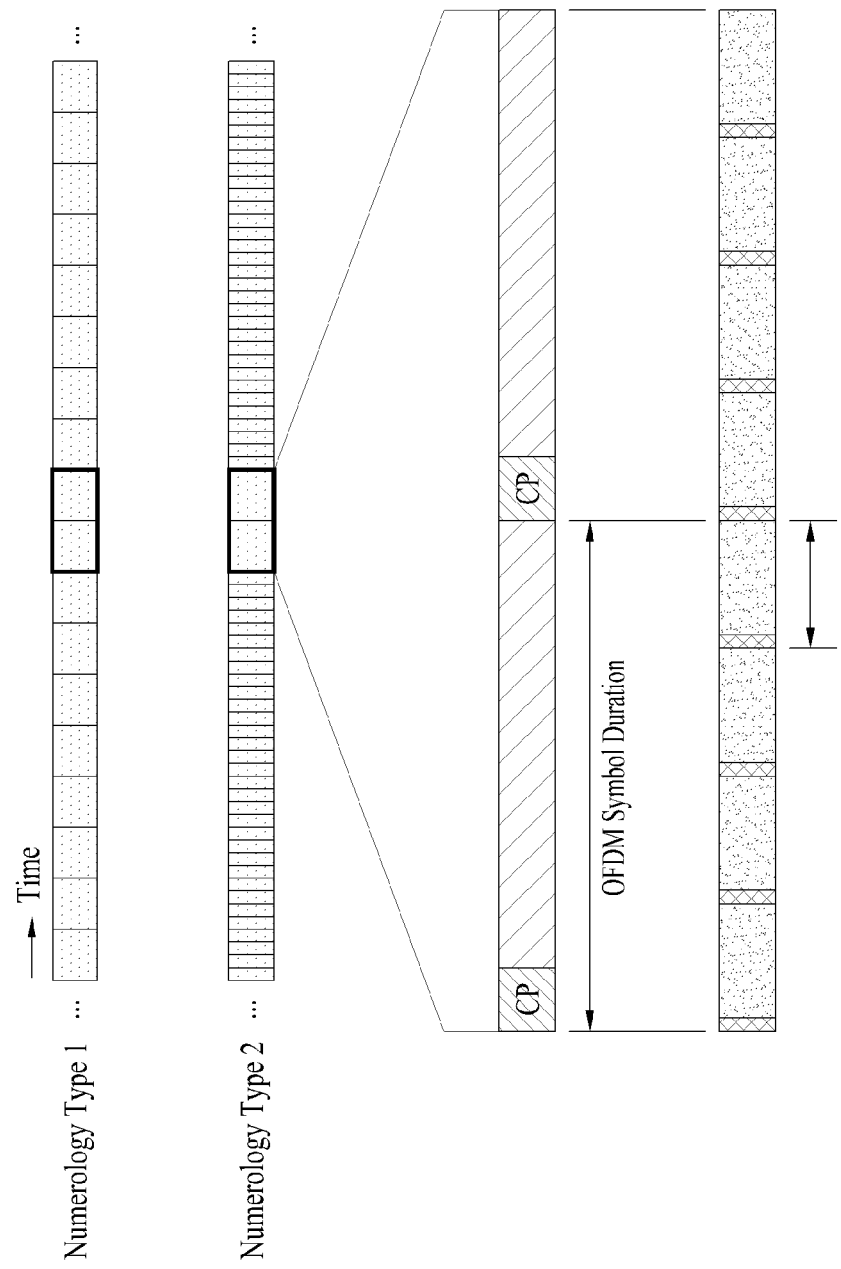

For example, as shown in FIG. 14, a time position of a synchronization signal of a numerology type 1 having long OFDM symbol duration can be matched with a time position of a synchronization signal of a numerology type 2 having short OFDM symbol duration.

As a different example, a period of transmitting a synchronization signal can be configured to have the same period irrespective of an OFDM symbol period.

Figure 15:
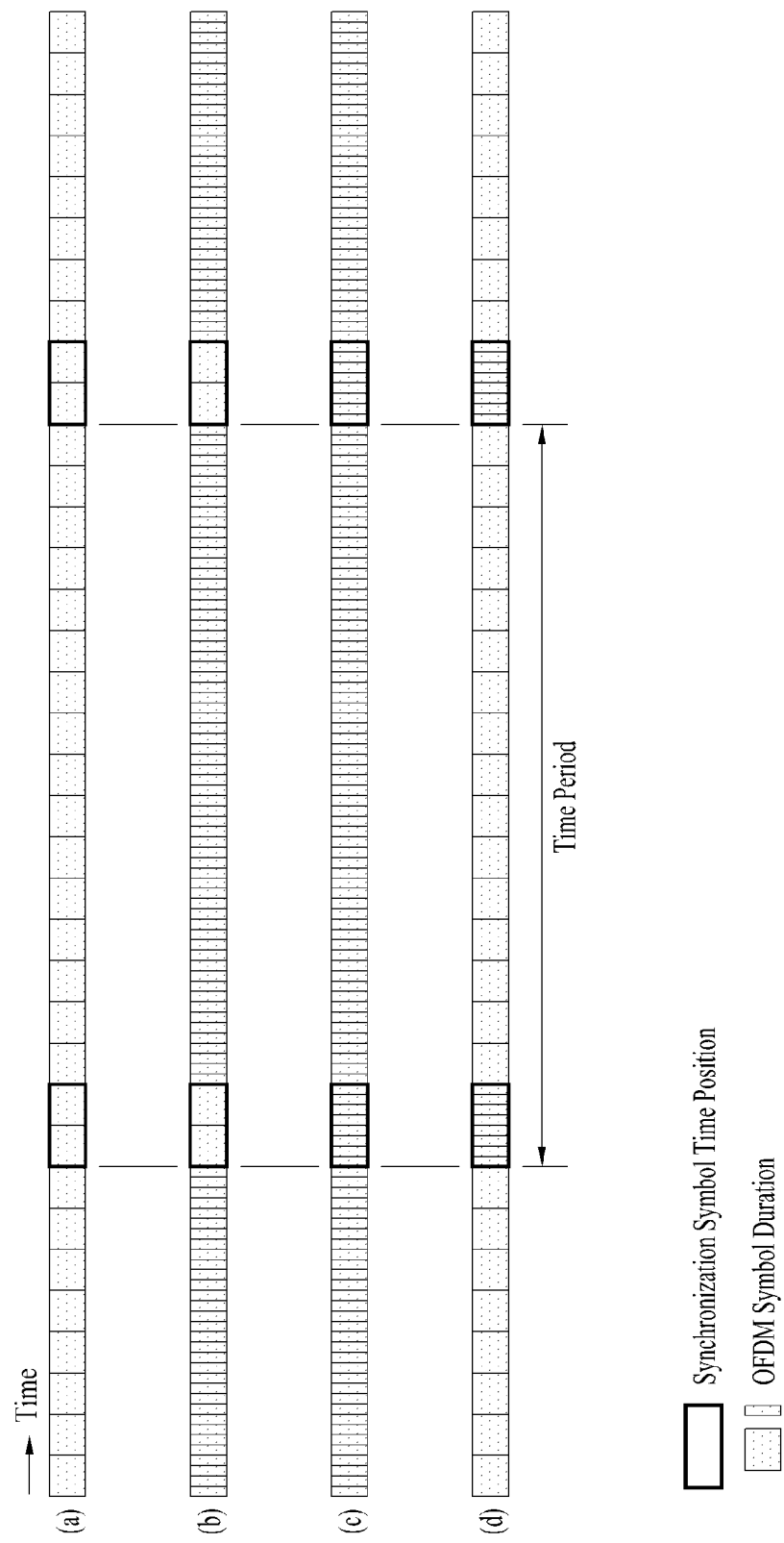

FIG. 15 illustrates an example for a time period of a synchronization signal. FIGS. 15 (a) to (d) show an example that OFDM symbol duration for a synchronization signal is identical or different to/from OFDM symbol duration of a different channel Referring to FIGS. 15 (a) to (d), when there are signals and channels having various numerologies on a component carrier, a synchronization signal is transmitted with the same transmission period (e.g., 5 ms).

<3. Multiplexing>

Figure 16:
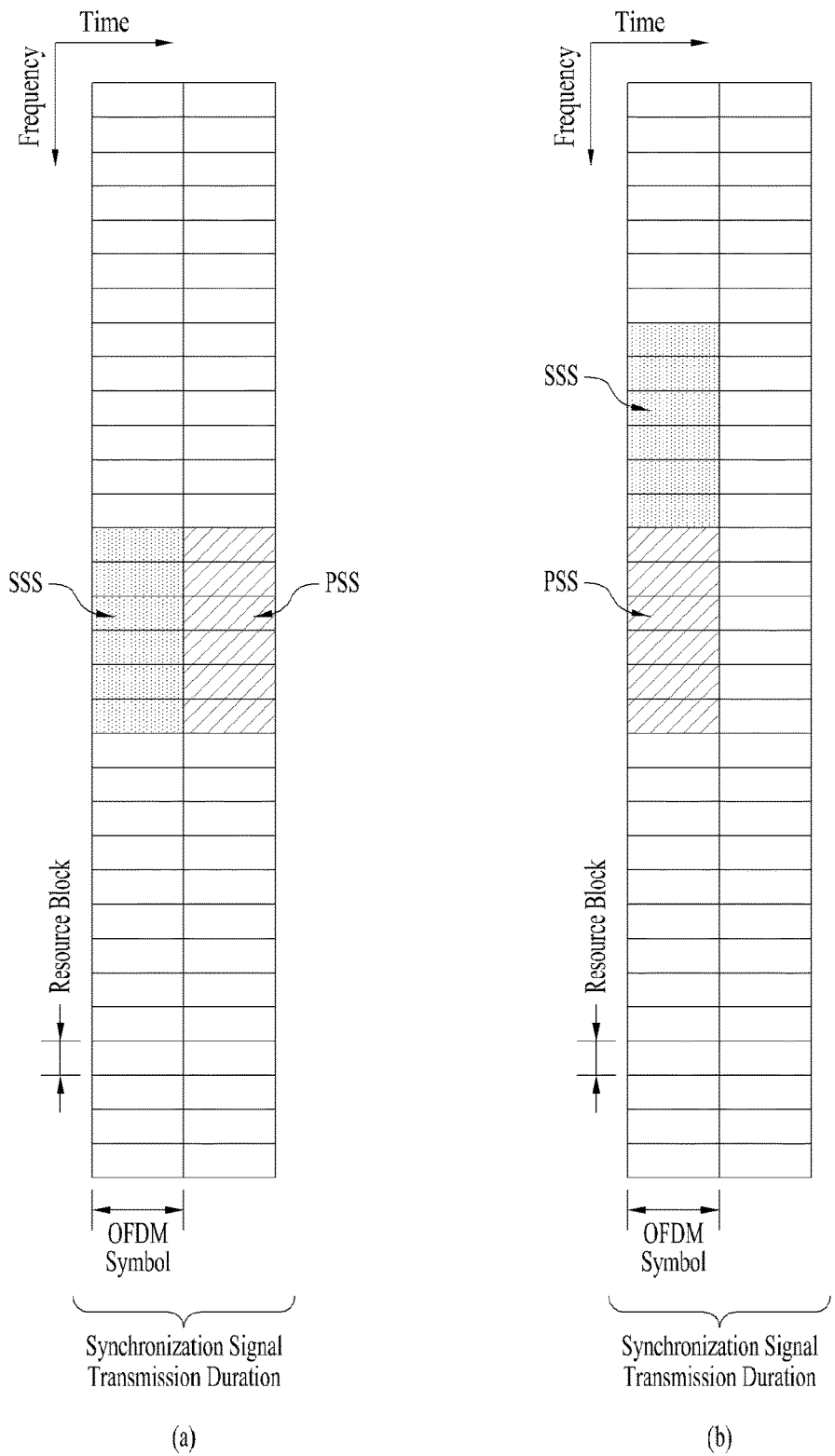

An NR system may have such a synchronization signal as a primary synchronization signal (PSS), a secondary synchronization signal (SSS), and the like. As shown in FIG. 16, the signals included in the synchronization signal can be multiplexed using a TDM or FDM scheme.

As mentioned in the following embodiments, a multiplexing scheme of a PSS/SSS can be differently applied according to numerology.

1. Embodiment 1-1

Figure 17:
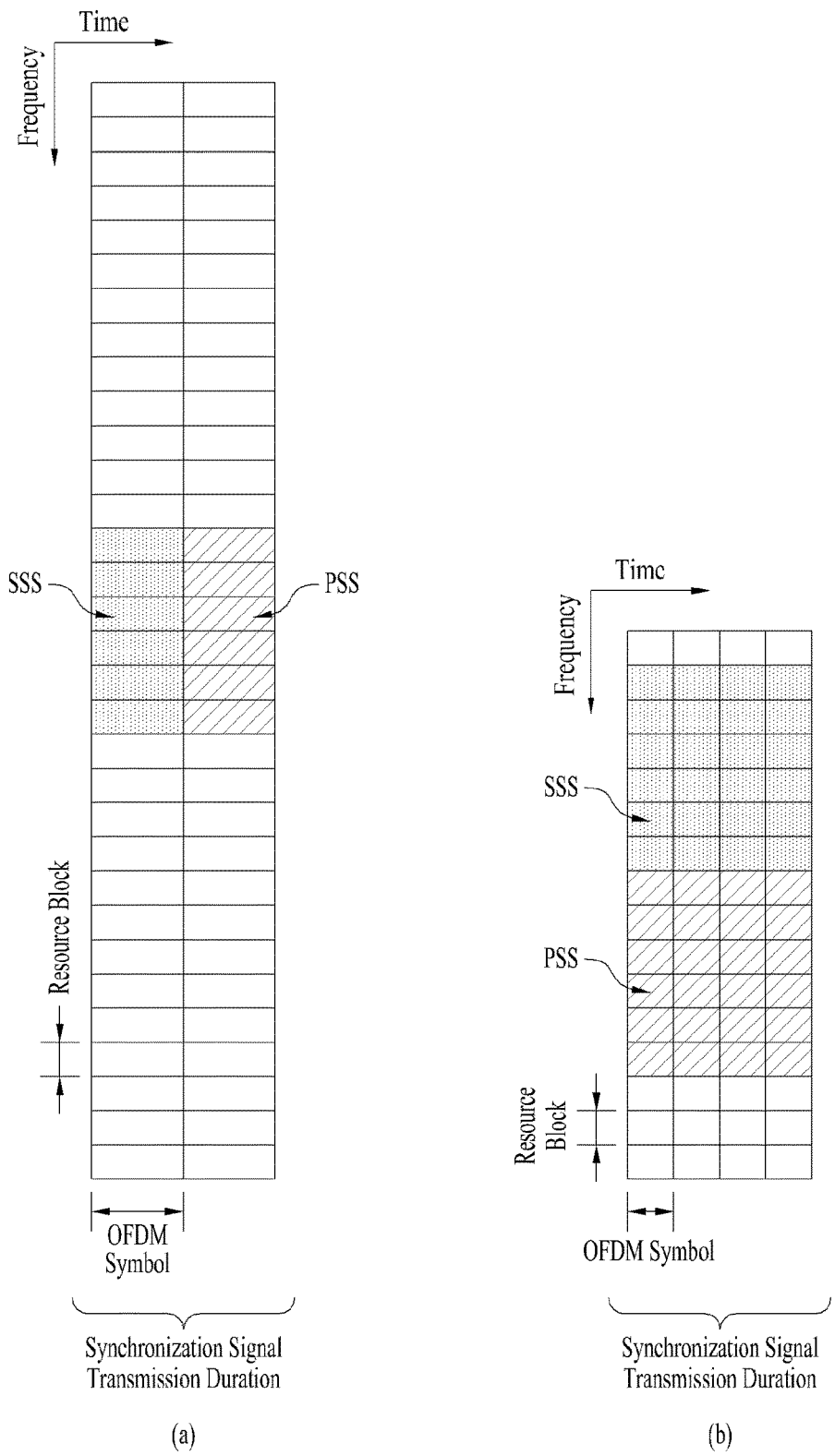

As shown in FIG. 17, TDM is performed on a PSS/SSS having long OFDM symbol duration (e.g., 15 kHz subcarrier spacing based) and FDM is performed on a PSS/SSS having short OFDM symbol duration (e.g., 30 kHz subcarrier spacing based). And, assume that the PSS/SSS on which TDM is performed has the same beam direction and the PSS/SSS on which FDM is performed has a different beam direction.

When a PSS/SSS is transmitted on a different frequency band, a multiplexing scheme can be differently applied according to a minimum bandwidth of a channel. For example, if a system bandwidth has a limit such as a bandwidth less than 6 GHz, TDM is performed on a PSS/SSS. On the contrary, if a system bandwidth is wide such as a bandwidth wider than 6 GHz, FDM can be performed on a PSS/SSS. Meanwhile, TDM is performed on a PSS/SSS in a band on which a single beam is transmitted and FDM can be performed on a PSS/SSS in a band on which multi-beam is transmitted.

In case of performing multi-beam-based synchronization signal transmission, a synchronization signal is transmitted in accordance with a direction of each beam to obtain a beamforming gain. If there are N number of beams, time as much as N times of unit time for transmitting a PSS/SSS may be required. In this case, as shown in FIG. 17, one OFDM symbol or two OFDM symbols may become the unit time for transmitting a PSS/SSS depending on a multiplexing method.

In this case, a special signal for notifying OFDM symbol positions of repeatedly transmitted PSSs/SSSs can be transmitted according to an OFDM symbol in a manner of being multiplexed with a PSS/SSS.

For clarity, the special signal is referred to as an extended synchronization signal (ESS). Yet, a function of the ESS can be included in a different signal depending on a design of a synchronization signal. A state to be expressed is determined according to the number of OFDM symbols used for transmission. The state is identical to the amount of information to be detected from the ESS.

2. Embodiment 1-2

Figure 18:
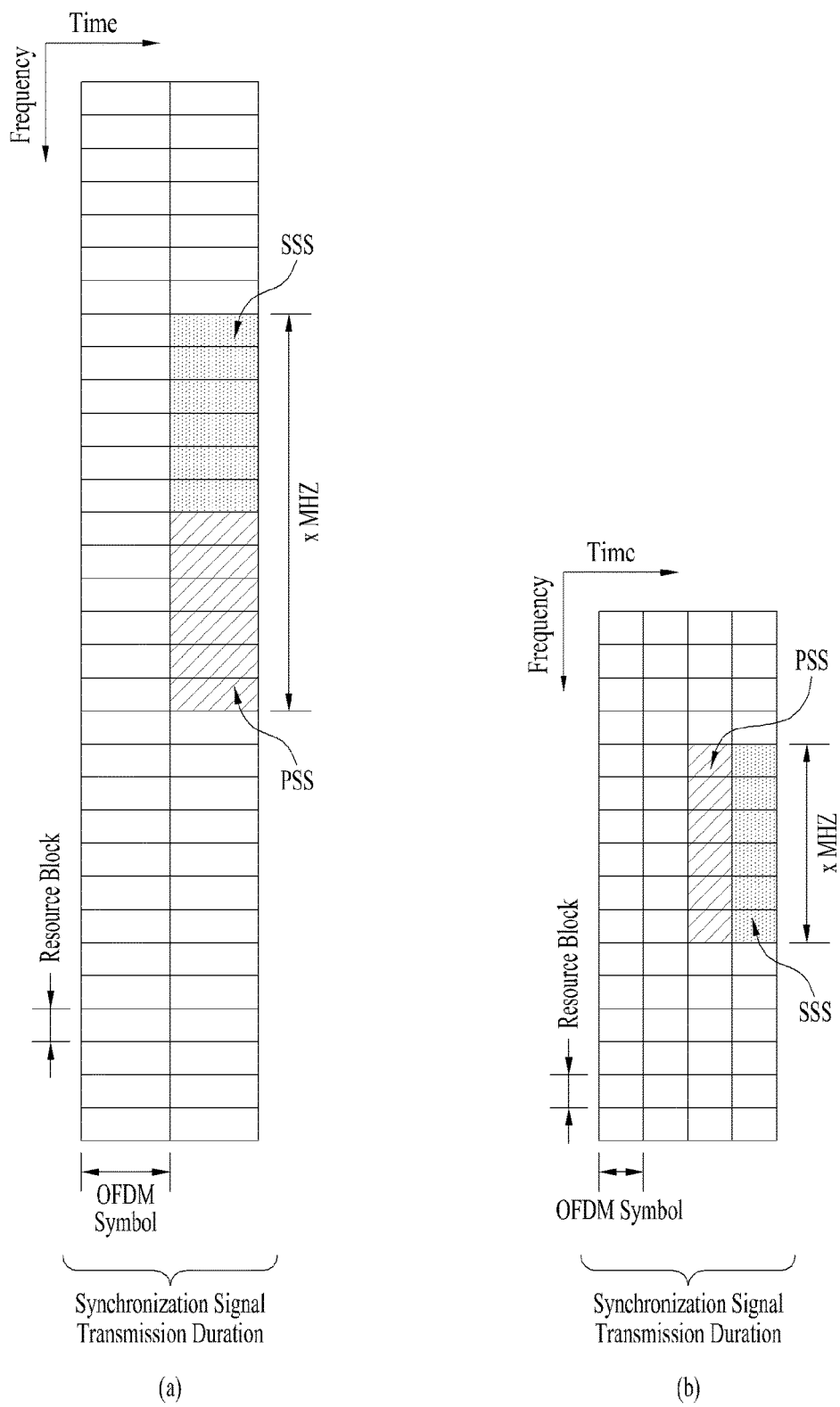

On the contrary to the embodiment 1, as shown in FIG. 18, FDM is performed on a PSS/SSS having long OFDM symbol duration (e.g., 15 kHz subcarrier spacing based) and TDM is performed on a PSS/SSS having short OFDM symbol duration (e.g., 30 kHz subcarrier spacing based).

For example, when PSS/SSS is multiplexed in consideration of a minimum system bandwidth, if a synchronization signal is transmitted by differentiating numerology in a system supporting various numerologies, FDM is performed on the PSS/SSS in an OFDM symbol having narrow subcarrier spacing. On the other hand, TDM can be performed on the PSS/SSS in an OFDM symbol having wide subcarrier spacing due to a bandwidth limit. When numerology is selected in accordance with a system policy on the same carrier or a carrier having a similar minimum system bandwidth, the abovementioned scheme can be introduced.

Meanwhile, a size of subcarrier spacing (15 kHz, 30 kHz) exemplarily mentioned in the present invention is not restrictively used. Subcarrier spacing of a different size can be applied as well.

And, although multiplexing of a PSS/SSS is described in the present invention as an example, the embodiments 1-1 and 1-2 can also be identically applied to multiplexing of signals used for an initial synchronization procedure such as an extended synchronization signal, a PBCH, a beam measurement reference signal, and the like.

3. Embodiment 1-3

FIG. 19 illustrates an example of configuring a multi-beam-based synchronization signal using an OFDM symbol of a different length.

Depending on OFDM symbol duration, it may be able to differently configure the number of OFDM symbols used in time domain to transmit a synchronization signal. In this case, the amount of information to be detected by the synchronization signal can also be differentiated. Meanwhile, for example, the information to be detected by the synchronization signal may correspond to OFDM symbol position information via ESS.

Figure 20:
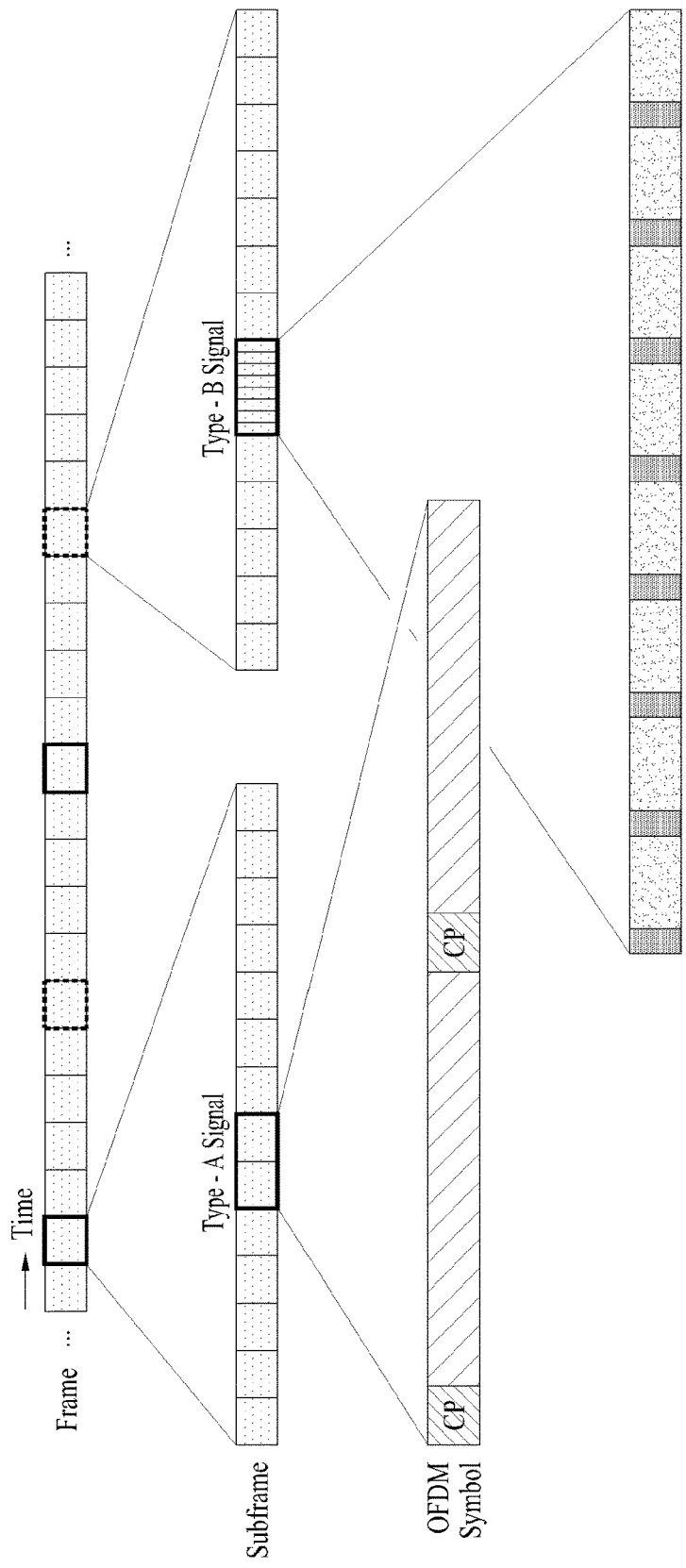

Meanwhile, referring to FIG. 20, a common signal and a common channel different from each other in a type can be transmitted at different time according to embodiments described in the following.

1. Embodiment 2-1

When such a signal as a PSS/SSS and the like corresponds to a type-A signal and such a signal as a PBCH/discovery RS, and the like corresponds to a type-B signal, the type-A signal and the type-B signal can be transmitted in a different subframe or a different OFDM symbol in the same subframe.

2. Embodiment 2-2

Various signals can be divided into a type-A signal and a type-B signal according to numerology. In this case, the type-A signal using a wide OFDM symbol and the type-B signal using a narrow OFDM symbol can be transmitted to a different subframe or a different OFDM symbol in a subframe.

3. Embodiment 2-3

The type-A signal and the type-B signal designated in the embodiments 2-1 and 2-2 can be multiplexed in a partial OFDM symbol in a channel including a different attribute.

4. Embodiment 2-4

In the embodiment 2-3, a discovery reference signal, a CSI-RS, or a measurement RS can be configured with a short OFDM symbol and a different beam can be applied according to a short symbol.

<4. PBCH, Beam Reference Signal>

In NR system, if massive MIMO is used, the number of antenna ports can be increased as well. In this case, it is necessary to consider a method of obtaining maximum spatial diversity using a plurality of antenna ports and a method of reducing channel estimation performance deterioration. When a receiving end does not know the number of antenna ports of a transmitting end, it is necessary to have a signal detection method capable of receiving a signal without increasing reception complexity.

Figure 23:
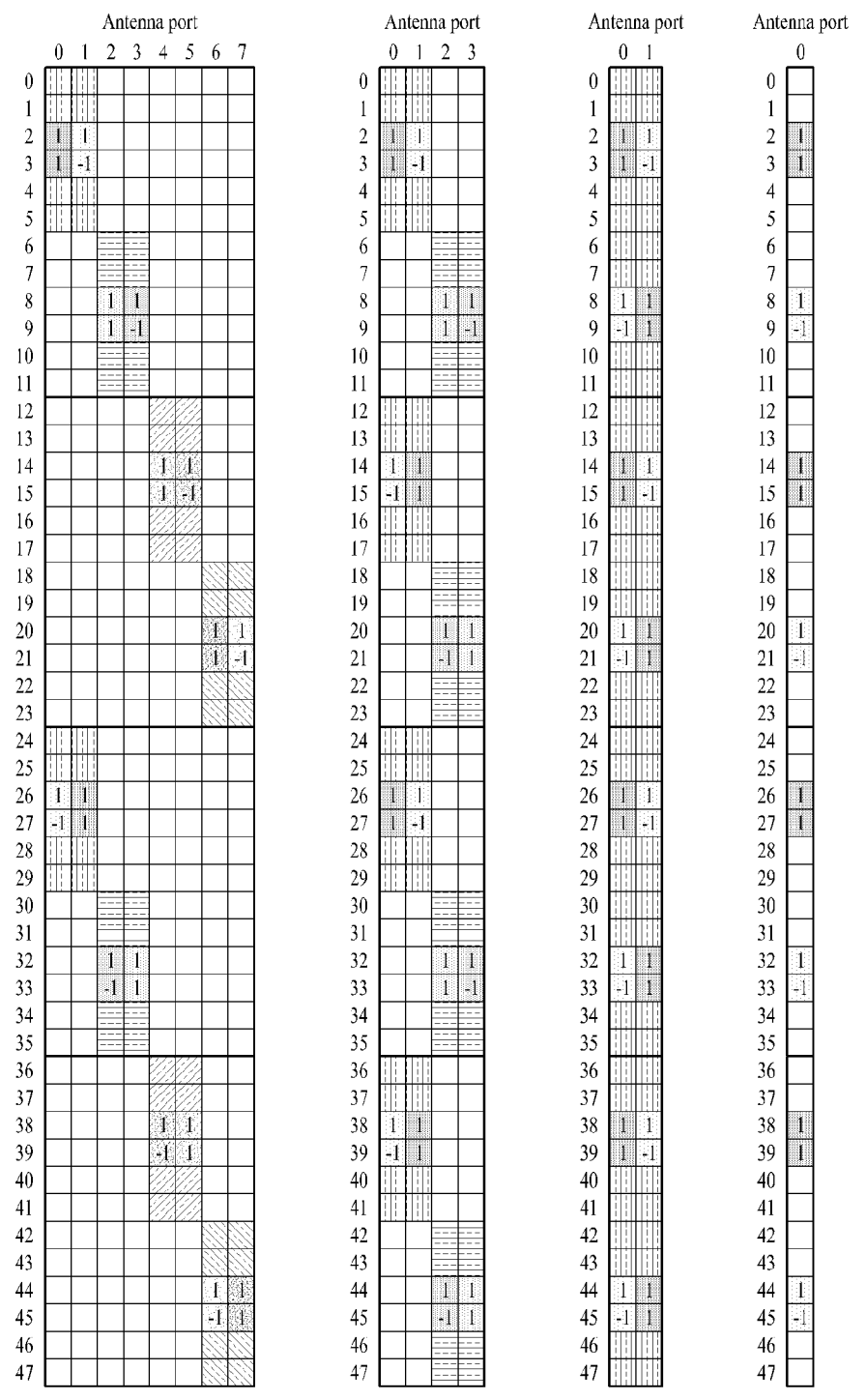
Figure 24:
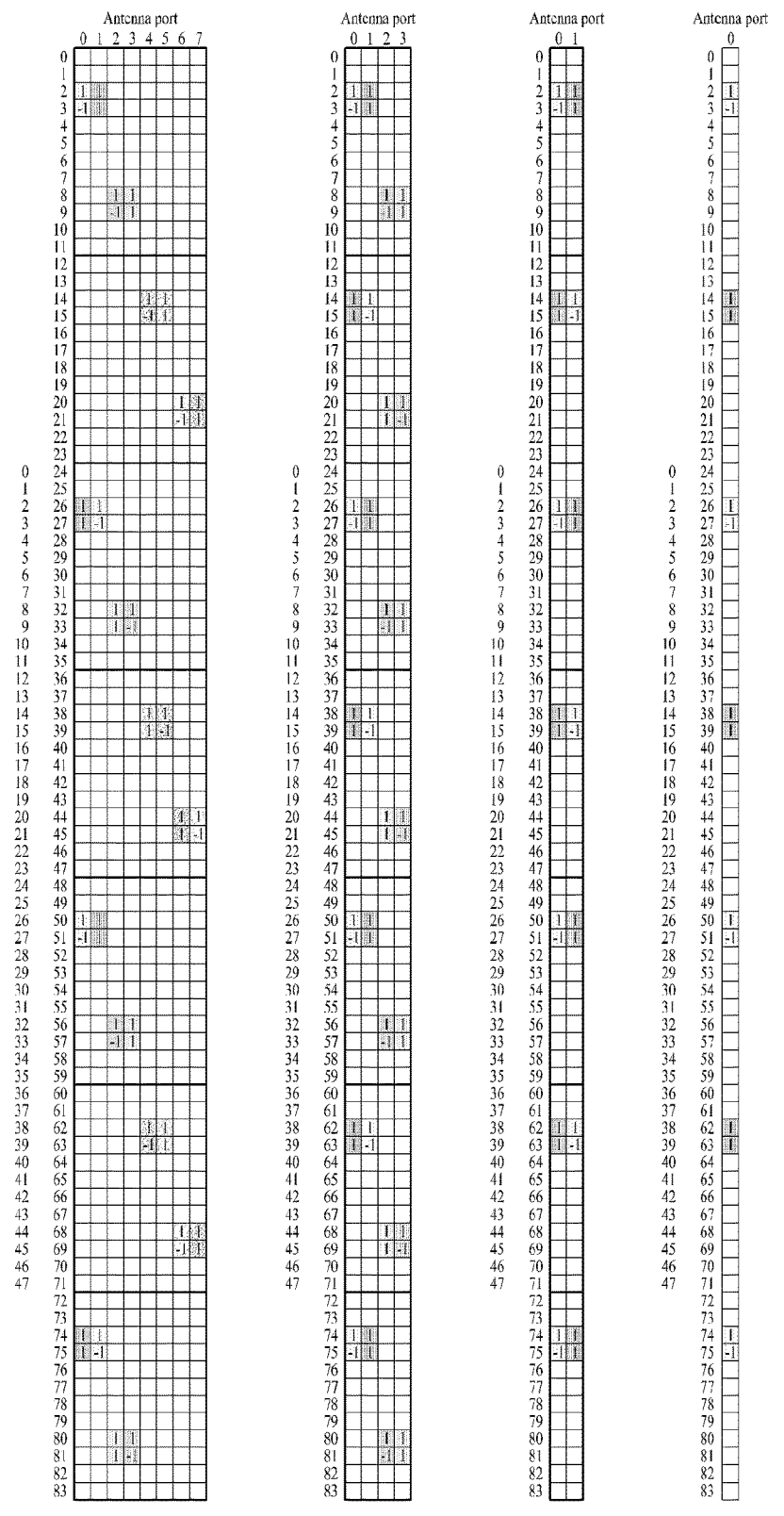

To this end, referring to FIGS. 21 to 24, FIG. 21 and FIG. 22 illustrate an example of a control channel using 4 antenna ports (APs) per unit and an example of a discovery RS using 4 antenna ports (APs) per unit, respectively. Meanwhile, FIG. 23 and FIG. 24 illustrate an example of a control channel using 2 antenna ports (APs) per unit and an example of a discovery RS using 4 antenna ports (APs) per unit, respectively.

When a control channel is transmitted using a plurality of antennas in a single OFDM, spatial diversity transmission is assumed when two or more antenna ports are transmitted. A demodulation reference signal is shared by the M number of antenna ports.

N numbers of frequency resource pairs near an OCC DMRS or an FDM DMRS perform spatial diversity transmission. If the N numbers of frequency resource pairs near the DMRS resource shared by the M number of antenna ports are defined as a single unit, each unit is multiplexed in a frequency unit and adjacent units are transmitted via antenna ports different from each other.

Meanwhile, when data demodulation is performed, a receiving end estimates a channel using a DMRS included in a unit and restores data from an adjacent resource pair.

If the number of antenna ports included in a unit is less than the number of antenna ports of a transmitting end, a signal is transmitted using a different antenna port between units adjacent to each other.

If the number of antenna ports included in a unit is equal to the number of antenna ports of a transmitting end, an adjacent unit can transmit a signal using the same antenna ports. If the number of antenna ports capable of being included in a unit is greater than the number of antenna ports of a transmitting end, a signal is transmitted using a partial resource corresponding to the number of antenna ports of the transmitting end among DMRS resources included in the unit and an adjacent unit can transmit a signal using the same antenna port. A receiving end assumes that a signal is transmitted using a different antenna port between units.

In the following, embodiments of transmitting a DMRS are explained based on the aforementioned discussion.

Embodiment 1

OCC is applied to a DMRS included in a unit using frequency domain Or, when antenna ports included in a unit are repeatedly used in a frequency axis, an OCC value applied to each port is changed. For example, it may be able to cyclically select an OCC according to a port. By doing so, it is able to prevent PARR of an OFDM symbol from being increased.

Embodiment 2

A control channel demodulation reference signal is used as an RRM measurement RS, a CSI measurement RS, or a TRP discovery RS.

Embodiment 3

A TRP discovery RS and a control channel DMRS are configured with the same pattern.

Embodiment 4

It may be able to configure a TRP discovery RS transmission period to be different from a control channel transmission period. If the transmissions are overlapped, a part of the TRP discovery RS is used as a DMRS of the control channel.

Embodiment 5

When a unit is configured in a unit of 4 antenna ports, OCC-4 is applied. In this case, a sequence is mapped using 4 contiguous REs.

Embodiment 6

When a unit is configured in a unit of 4 antenna ports, SFBC transmission is performed using two antennas and SFBC transmission is performed in a different adjacent resource pair using another two antennas.

Embodiment 7

In the embodiment 6, a resource pair using a different antenna can be used in an adjacent frequency resource.

Embodiment 8

In the embodiments 5 and 6, a unit uses 12 REs in total. In this case, center 4 REs are used as a DMRS and the remaining 8 REs adjacent to the DMRS are used for transmitting a control signal. In this case, SFBC is performed using 2 RE pairs and a signal is transmitted using a different antenna in a different adjacent resource pair. A resource can be expanded in a scalable manner.

Embodiment 9

It is able to perform FDM on control channels having a different usage. For example, as an example of a resource including a different usage, there are a PBCH and a common control channel including a grant or a triggering message for performing paging, RAR, SIB1/2. The PBCH is positioned at the center of an available frequency resource and the common control channel can be distributed to the opposite ends of a frequency.

Embodiment 10

If a unit is configured in a unit of 2 antenna ports, it may apply OCC-2 and a sequence is mapped using 2 contiguous REs.

Embodiment 11

If a unit is configured in a unit of 2 antenna ports, SFBC transmission is performed using 2 antennas. The unit can also be utilized in single antenna transmission.

Embodiment 12

In the embodiments 10 and 11, a unit uses 6 REs in total. In this case, center 2 REs are used as a DMRS and the remaining 4 REs adjacent to the DMRS are used for transmitting a control signal. In this case, SFBC is performed using 2 RE pairs. A resource can be expanded in a scalable manner.

<5. Beam Swept Control Channel Transmission>

When a transmitting end is not precisely aware of a position of a receiving end (e.g., initial attach procedure, a user in an idle state, a user performing handover, etc.), if the transmitting end transmits a control channel using beamforming, beam sweeping is perform on the control channel during prescribed time using multi-beam to transmit the control channel.

1. Embodiment 1-1

A beam swept control channel is transmitted in a manner of being multiplexed with a different channel and a signal in a beam sweeping period.

For example, 1) the control channel can be multiplexed in an OFDM symbol including a PSS/SSS on which beam sweeping is performed, 2) the control channel can be multiplexed in an RE section, which is not used as a BRS in a BRS section in which beam sweeping is performed, or 3) the control channel can be multiplexed in a section in which PBCH is transmitted.

2. Embodiment 1-2

Figure 25:
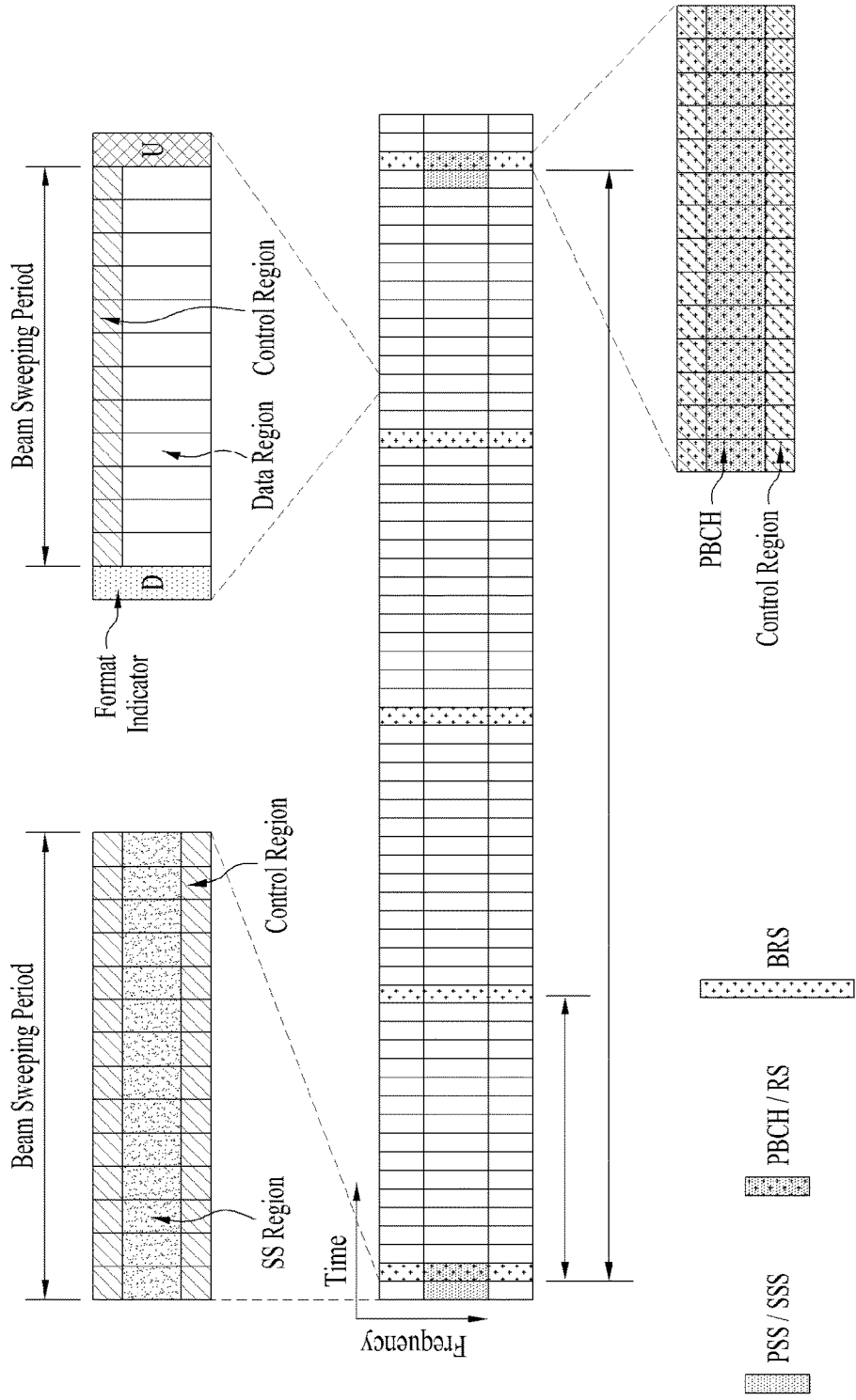
FIGS. 25 to 26 are diagrams for explaining a method of transmitting a beam swept control channel.

As shown in FIG. 25, a special subframe including a beam sweeping period is defined. Beam sweeping is performed on each OFDM symbol in the special subframe. A control channel region and a data channel region are defined by FDM in each OFDM symbol.

Figure 26:
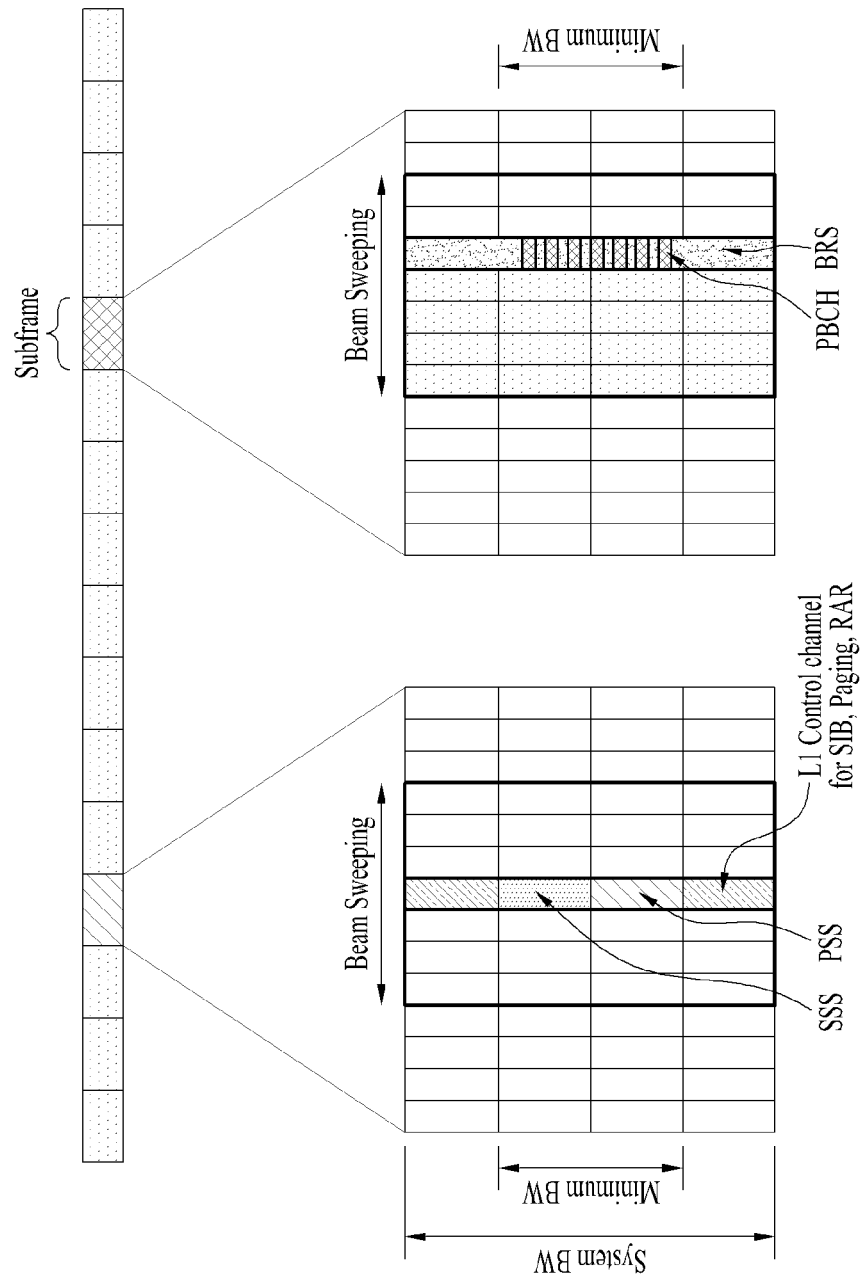

And, as shown in FIG. 26, if there is a subframe including a beam sweeping period, all or a part of OFDM symbols included in the subframe can be used for beam sweeping.

<6. NR PBCH Design Target and Approach>

NR system should be designed to operate on extremely different environment (e.g. extremely large coverage, very high speed, wide range of frequency band, etc.). Also, essential information to access network should be delivered to any UEs. If it is desired for NR system to meet at least LTE coverage, it may design NR-PBCH based on the assumptions, which is to provide similar coding rate with LTE PBCH and to follow similar design way (e.g. Self decoderable, Spread over multiple subframe, Similar RS overhead).

Meanwhile, different with LTE system, NR system is operated by single-beam and multi-beam operation. In the multi-beam operation, beam sweeping is considering for initial access related channel/signal delivery. On the other hand, it is desirable to limit beam sweeping instances. So, NR could approach to use less resource elements based on assumption of less information bit size for MIB.

In the aspects above, it may provide a possible list for NR-PBCH design as follows.

1) MIB bit size: less than 40 bits (e.g. 40 bits=12 bits (information)+8 bits (CRS))
2) Coded bits: 980 bits (in order to provide similar coverage with LTE)
3) Channel Coding Scheme: TBCC
4) Modulation Scheme: QPSK
5) Occupied Resource Elements (REs): 120 REs (=72× 2–24)
6) Periodicity: 10 ms
7) Transmission scheme:
Option 1: Single antenna transmission scheme
Option 2: Transmit diversity scheme (e.g. SFBC)
8) Reference Signal:
Option 1: Self-contained DMRS
Option 2: Secondary Synchronization Signal
Note: Assume to use Cell-ID based scrambling <7. NR-PBCH Design Example>

Figure 27:
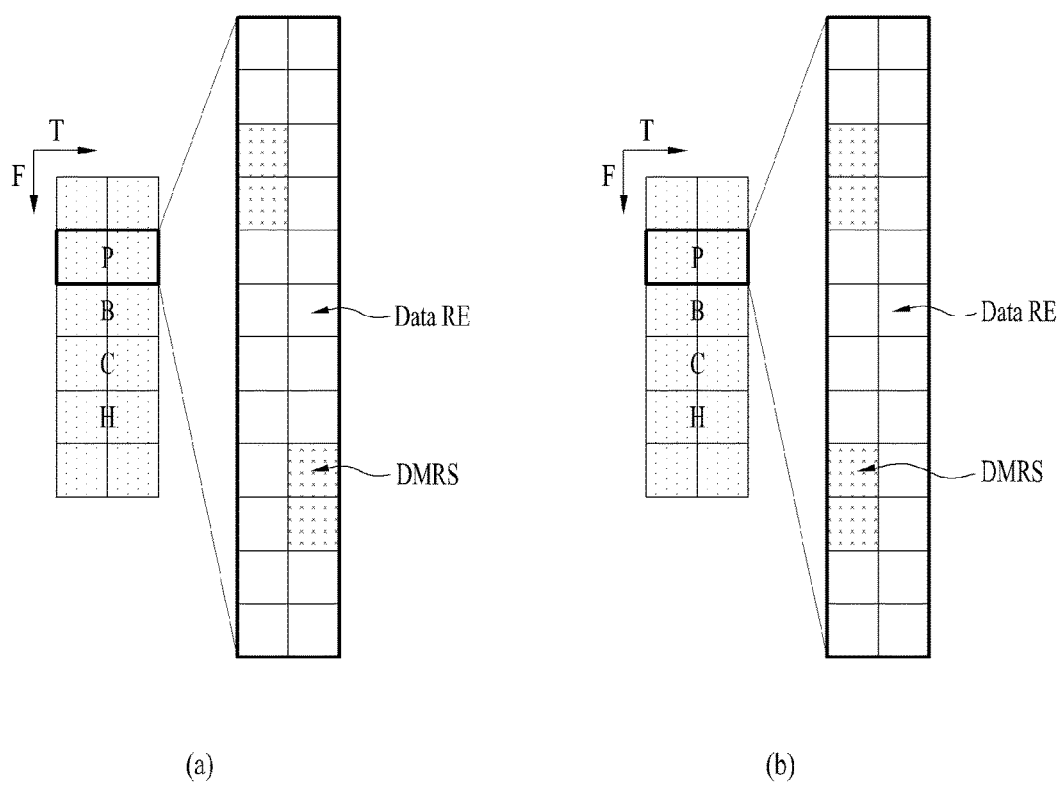
FIG. 27 is a diagram for explaining a method of mapping a DMRS (demodulation reference signal) in a PBCH.

As shown in above design guide, it may assume that NR-PBCH provides 120 REs, which means 24 REs can be used for DMRS within 6 RBs and 2 OFDM symbols. Based on the assumption that adjacent two REs are used for DMRS in order to facilitate RE pairing for two antenna ports based on transmit diversity, the NR-PBCH can be designed as shown in FIG. 27 (a) or FIG. 27 (b).

For the performance evaluation of NR-PBCH, as shown in FIGS. 28 to 31, the performance of LTE PBCH is provided as a baseline. Similar with periodicity of LTE PBCH, assume 10 ms periodicity for NR PBCH and 4 times repetition in time domain. Also, it is assumed that PBCH is self-decoderable in each subframe, and LLR combining is operated for decoding of repeated PBCH symbol.

In this evaluation, assume that a group 1 and a group 2 for NR PBCH have MIB bit size and time/frequency resource for PBCH transmission as below.

1) Group 1 for NR PBCH:
12RBs with 2 symbols for 40 bits
6RBs with 2 symbols for 20 bits
Group 2 for NR PBCH
24RBs with 2 symbols for 40 bits
12RBs with 2 symbols for 20 bits Group 1 for NR PBCH design has similar coding rate with LTE PBCH. On the other hand, twice time/frequency resources are assigned for Group 2 for NR PBCH. In this simulation, 2Tx SFBC is assumed with same DMRS overhead for both LTE PBCH and NR PBCH.

Figure 28:
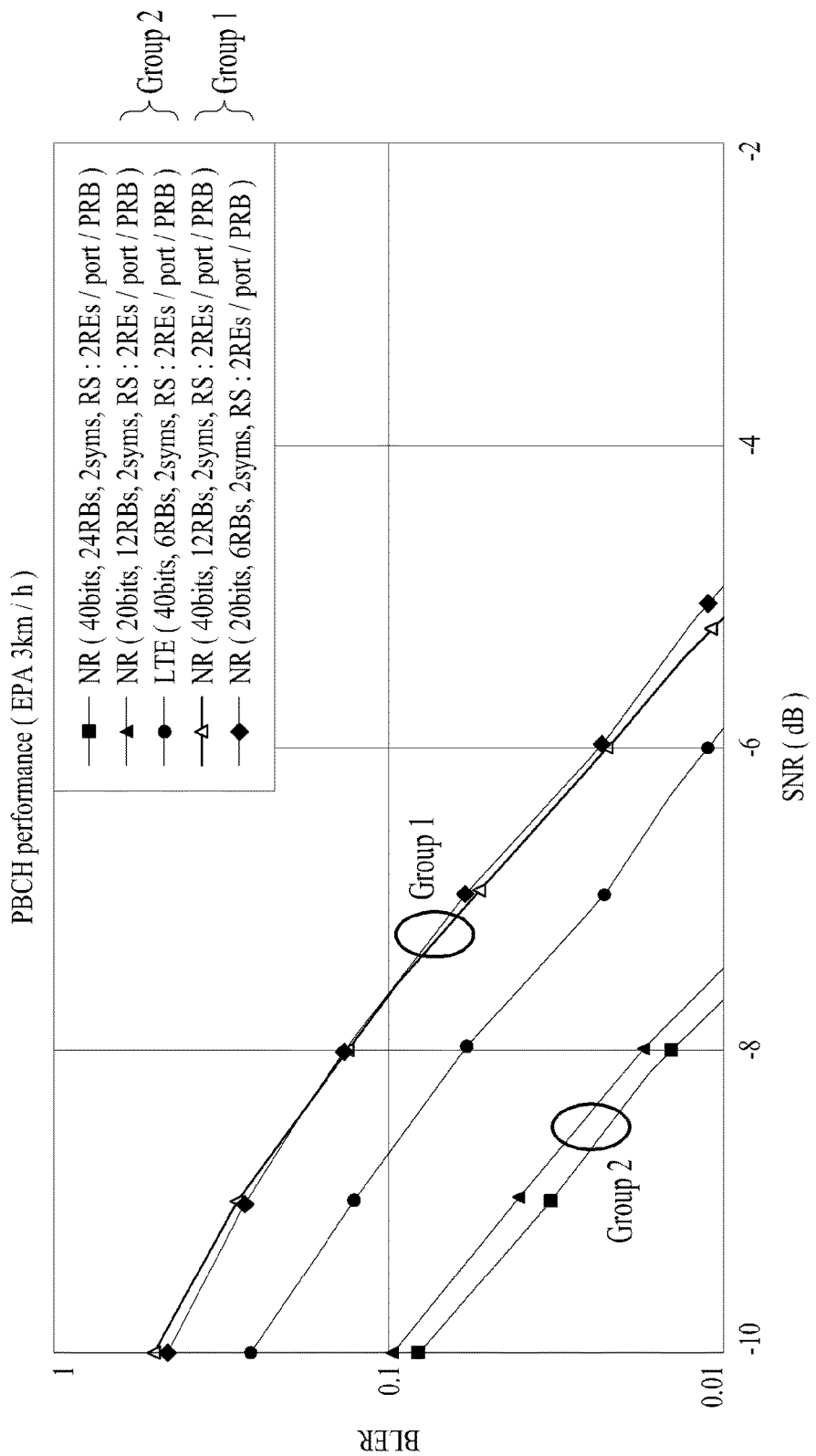
FIGS. 28 to 31 are diagrams for explaining a PBCH performance effect when a DMRS is used in a PBCH according to an embodiment of the present invention.
Figure 29:
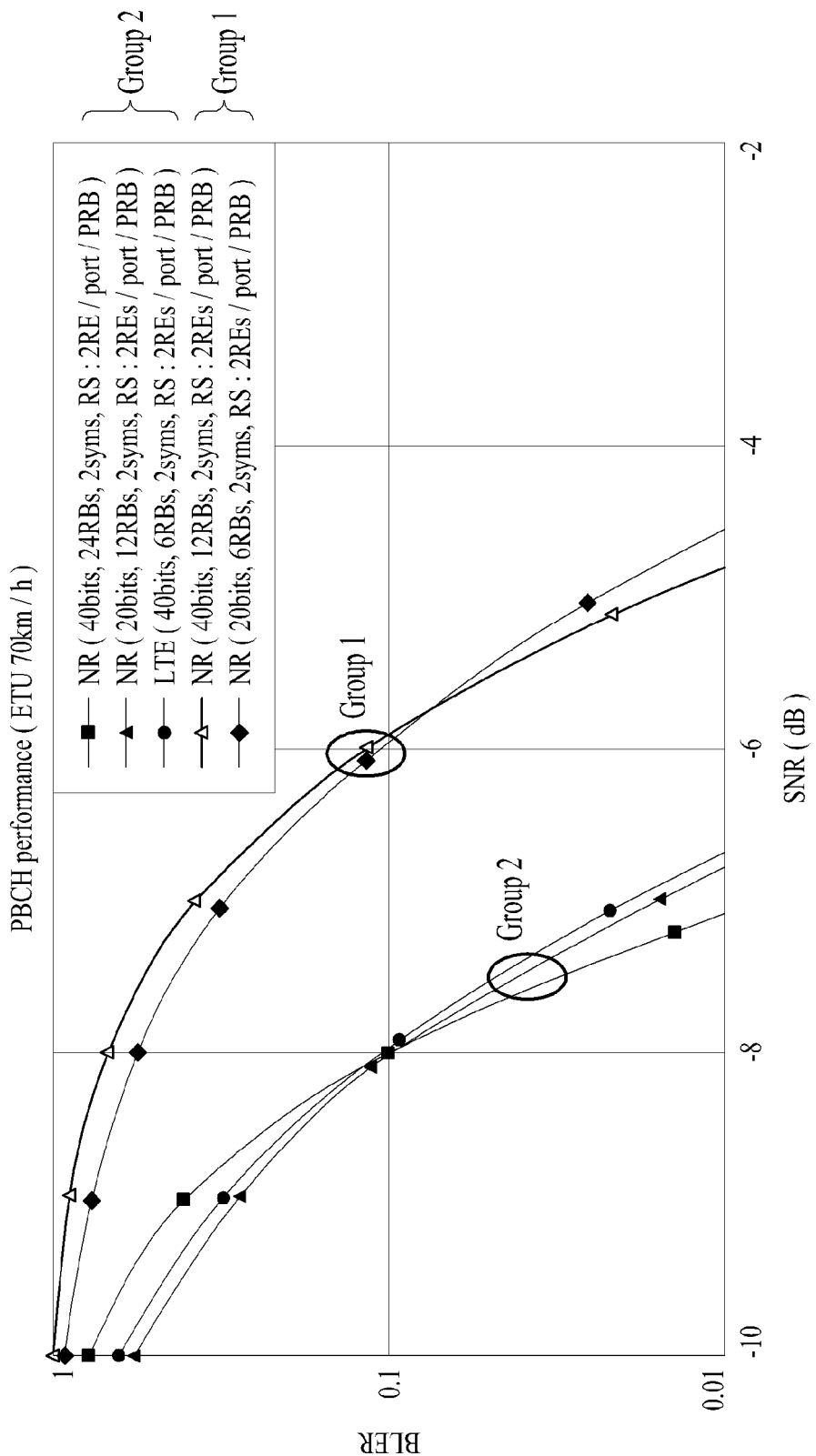

In FIGS. 28 and 29, PBCH performances are shown according to wireless channel environment. Referring to FIGS. 28 and 29, Group 1 (NR design with same overhead of LTE PBCH) has performance degradation due to channel estimation performance loss. When same DRMS overhead with LTE PBCH is considered, it is shown that more time/frequency resources for NR PBCH transmission are necessary to meet similar PBCH coverage with NR.

Figure 30:
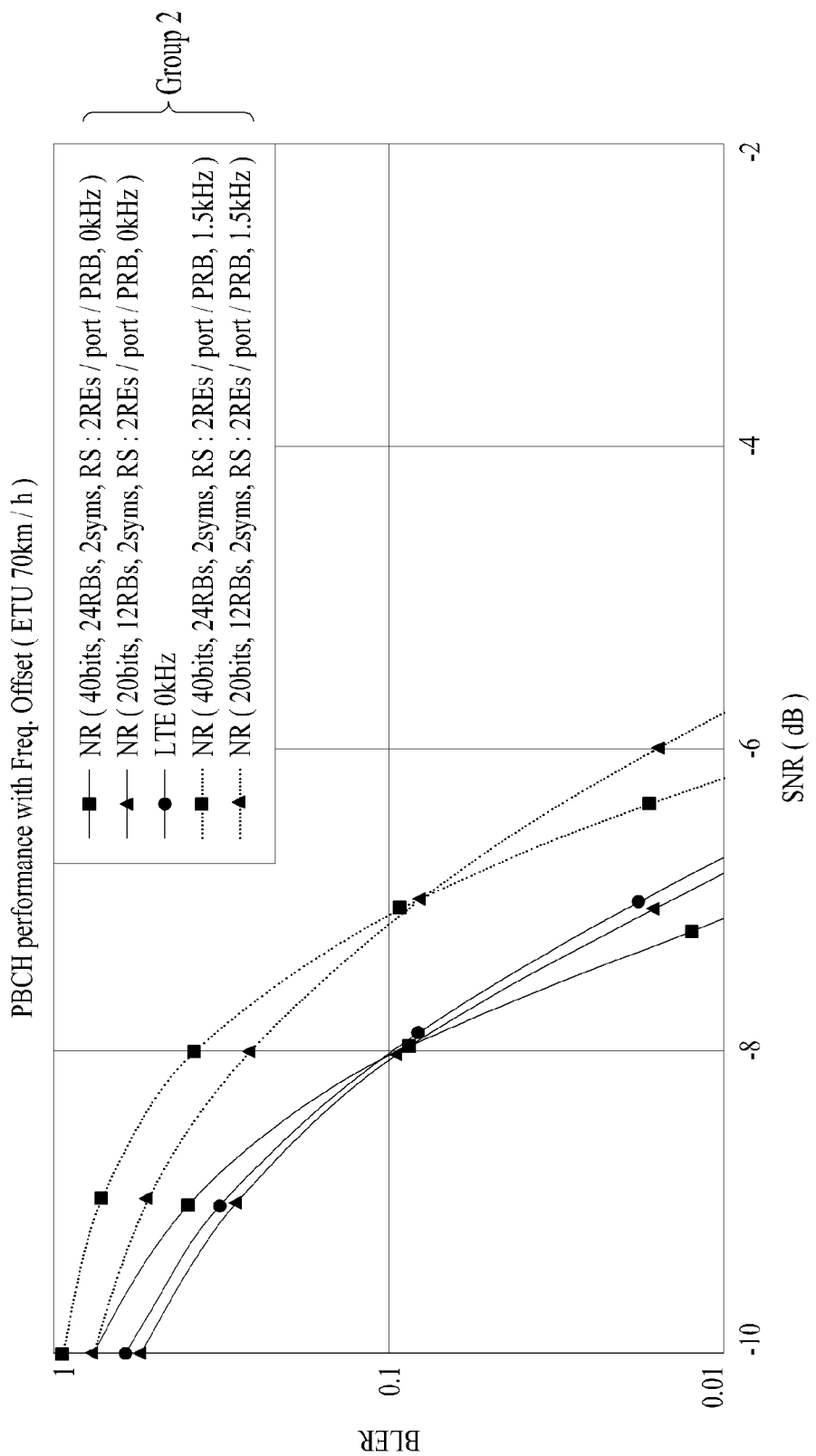

FIG. 30 shows PBCH performance with residual frequency offset after frequency offset estimation using synchronization signal in initial access. In the simulation, it may assume 1.5 kHz frequency offset which is about 10% of SCS 15 kHz.

From the simulation result, it may observe that NR PBCH design could operate at the case with residual frequency offset. It shows a possibility that self-contained DMRS at first OFDM symbol in NR PBCH could be used for data demodulation of $2^{nd}$ OF-DM symbol without residual frequency offset compensation.

Figure 31:
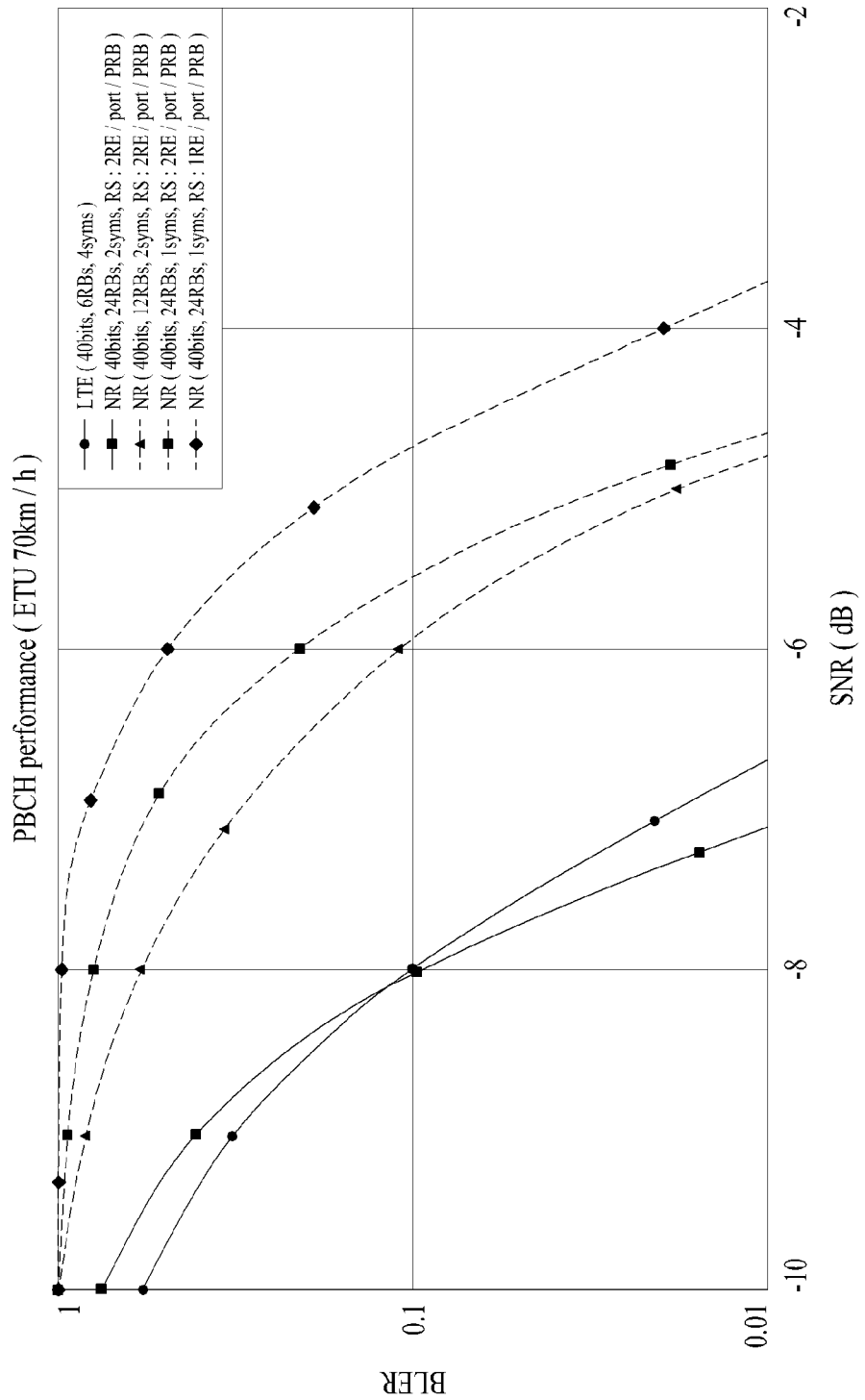

FIG. 31 shows PBCH performance comparison for PBCH design between single OFDM symbol and two OFDM symbols.

In FIG. 31, assume maximum 5 MHz bandwidth for PBCH transmission and 24 RBs are assigned for 1 symbol based PBCH transmission. If 24 RBs with 1 symbol for 40 bits is compared with 24 RBs with 2 symbols for 40 bits, about 2.5 dB performance gap is observed. Also, compared with LTE design, 1 symbol based design shows about 2 dB performance loss. So, it may observe that when maximum 5 MHz bandwidth is assumed for PBCH transmission, 1 symbol based PBCH design is not enough to achieve the required coverage.

As a different example, NR PBCH can be configured by a single OFDM symbol. In this case, it may assume a DMRS per port according to each RB. In this case, although it is able to lower a coding rate used for transmitting PBCH, channel estimation capability via a DMRS can be degraded. In order to enhance the channel estimation capability, it may assign an additional DMRS. For example, 2 REs per port can be configured as a DMRS according to an RB.

<8. Multiplexing of NR-SS and NR-PBCH>

NR-PSS, NR-SSS and/or NR-PBCH can be transmitted in a manner of being included in an SS block. TDMed SS has a benefit in terms of lower complexity of timing detection and faster acquisition for Cell-ID compared to FDMed SS. Based on the assumption that NR-PSS and NR-SSS are TDMed, it may consider three alternatives for composition of NR-SS and NR-PBCH as follows.

1) Option 1: NR-SS and NR-PBCH are TDMed. In this case, NR-SS and NR-PBCH have same bandwidth.
2) Option 2: NR-SS and NR-PBCH are TDMed. In this case, NR-PBCH has wider bandwidth.
3) Option 3: NR-SS and NR-PBCH are FDMed.

Figure 32:
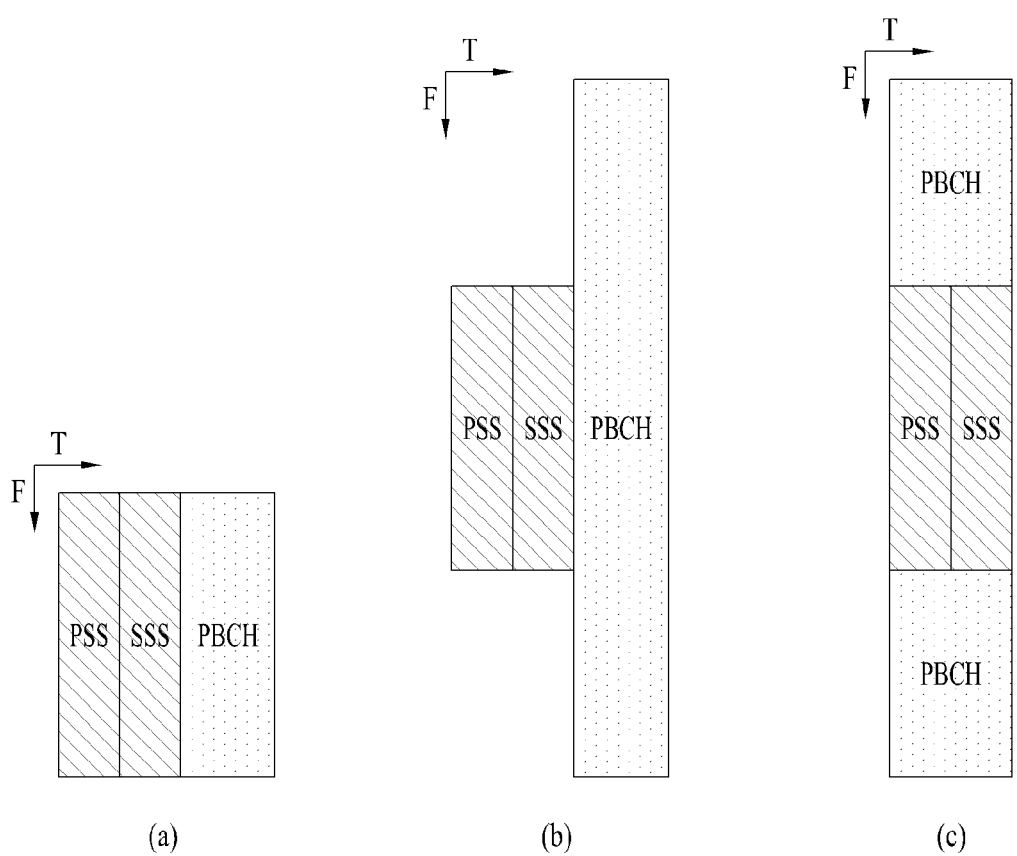

FIGS. 32 (a), (b), and (c) show composition of NR-SS and NR-PBCH according to the options, 1, 2, and 3.

For option 1, same bandwidth is assumed for NR-PSS, NR-SSS and NR-PBCH, where longer time duration is required for NR-PBCH transmission. For option 2, it is assumed that NR-PBCH has wider bandwidth than NR-SS, where NR-PBCH can obtain frequency diversity gain. For option 3, two OFDM symbols are assigned for 'SS block', where NR-PBCH is located at adjacent subbands.

Considering on the assumption to use 15 kHz or 30 kHz subcarrier spacing for below 6 GHz, three options shows that transmission bandwidth containing NR-SS/NR-PBCH is not exceed 5 MHz. For design commonality, these options could be applied to below 40 GHz. If 120 kHz or 240 kHz subcarrier spacing of 'SS block' is assumed for below 40 GHz, three options shows that transmission bandwidth containing NR-SS/NR-PBCH is not exceed 40 MHz.

In order to keep detection complexity for NR-PSS and provide robustness against frequency offset in initial detection step, it can be assumed that NR-PSS and NR-SSS have same bandwidth, but NR-PSS subcarrier spacing is wider than NR-SSS. Also, in order to facilitate same FFT size for NR-SSS and NR-PBCH, it can be assumed that NR-PBCH subcarrier spacing is same with NR-SSS subcarrier spacing.

<9. SS Bandwidth and Multiplexing>

Transmission bandwidth for synchronization signal is related with UE detection complexity. If the transmission bandwidth becomes wider, sampling rate for synchronization signal transmission and reception is also increased. As a result, synchronization signal detection complexity of UE side increases as well. Two factors (i.e. subcarrier spacing and multiplexing method for SS) can be considered as a main element which transmission bandwidth becomes wider. If wider subcarrier spacing is introduced for robustness against frequency offset, transmission bandwidth could be also linearly increased.

Also, if synchronization signals are FDMed, transmission bandwidth is increased by twice. However, if it is not preferred to increase UE side detection complexity according to wider transmission bandwidth, it may consider possible solutions (e.g. new sequence design for NR, multiplexing of synchronization signals in time domain, etc.) to prevent increasing transmission bandwidth.

In legacy LTE specification, the bandwidth for synchronization signal is defined as 1.08 MHz, and the OFDM symbol duration is defined as 70 µs. In the present invention, it may provide new PSS design which has similar transmission bandwidth with LTE and wider subcarrier spacing (i.e. 60 kHz). Also, in the present invention, time domain multiplexing is assumed for NR SS.

From the simulation result, it may observe the possibility that NR SS sequence provides a better performance than LTE SS sequence even in larger frequency offset, and detection complexity for synchronization is not higher than LTE SS detection.

In this point of view, it may consider the NR SS design that transmission bandwidth for NR synchronization signal is similar with that of LTE for below 6 GHz, and synchronization signals are multiplexed in time domain. Also, considering on linear scaling of transmission bandwidth according to subcarrier spacing, N (e.g. N is four) times wider transmission bandwidth can be applied for below 40 GHz band.

For initial access, NR assumes both single-beam and multi-beam transmission. Especially, for multi-beam transmission, beam sweeping is considered as a possible approach. Considering on beam sweeping for synchronization signals, there is a possible issue related with multiplexing of SS and PBCH.

Figure 33:
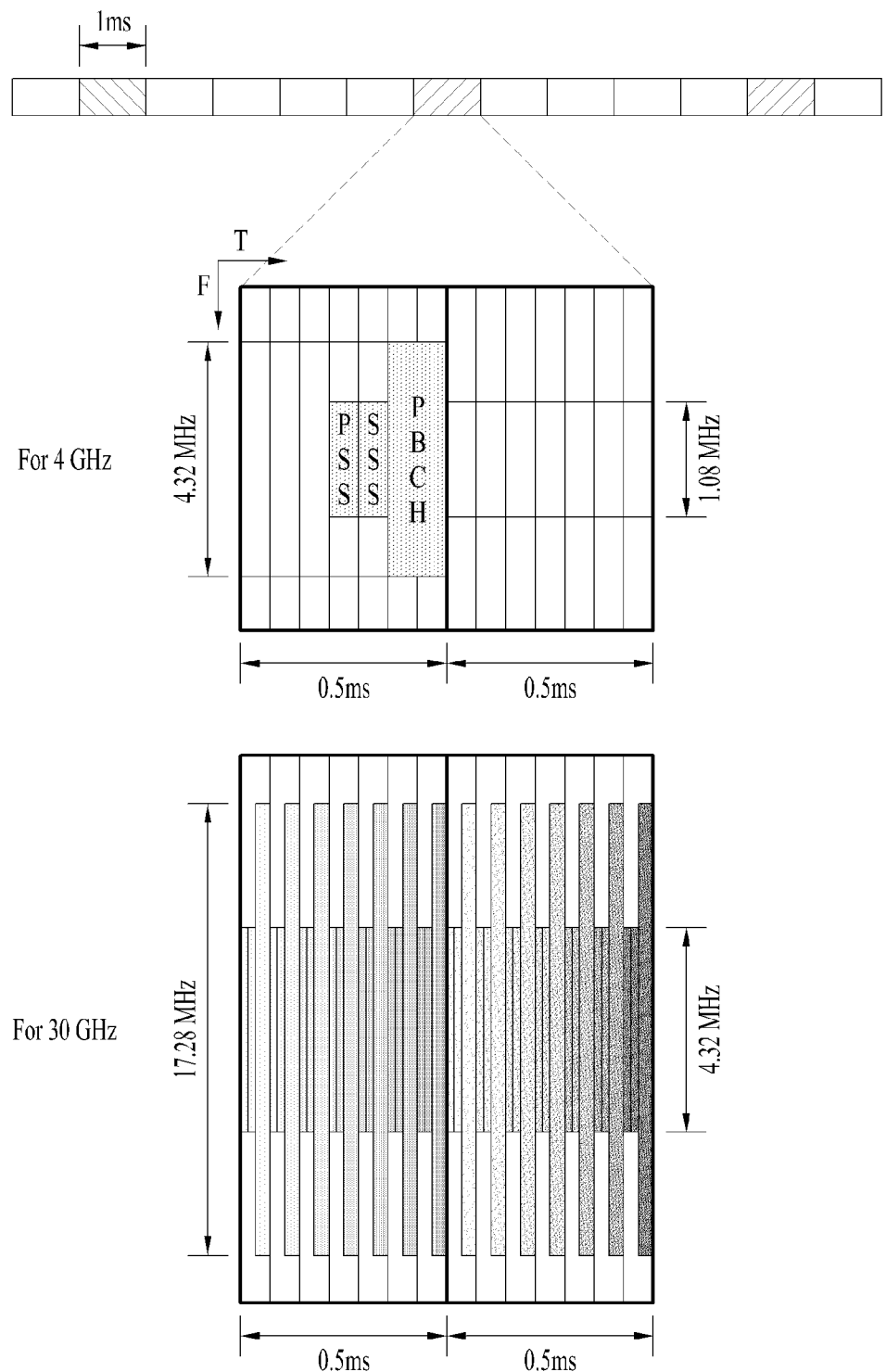

One way of multiplexing of SS and PBCH is TDMed within contiguous OFDM symbols as shown in FIG. 33. For single beam case, this method looks similar with multiplexing LTE SS and LTE PBCH. For multi-beam case, beam is swept at every N OFDM symbols, which is a time unit for multiplexing of NR SS and NR PBCH.

However, in case that transmission periodicity for NR SS and NR PBCH is different, the time period for OFDM symbols of NR PBCH transmission could be reserved for beam sweeping even in NR PBCH is not transmitted. In order to resolve the ambiguity of the time period, it can be considered that NR SS and NR PBCH are transmitted with timing gap (e.g. 0.5 ms) as shown in FIG. 34.

Figure 34:
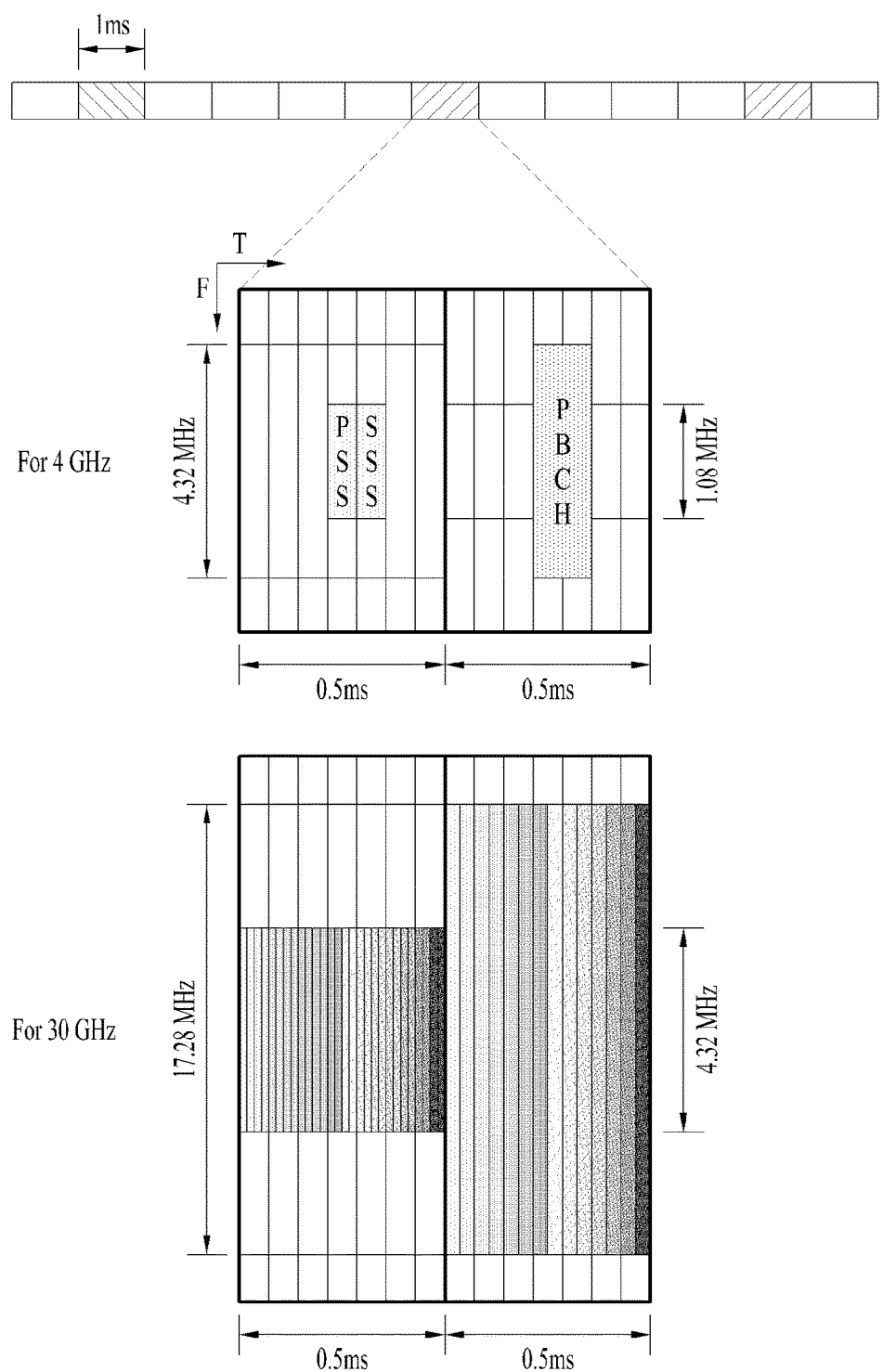

In FIG. 34, it is described that time domain multiplexed synchronization signals are transmitted using same beam direction within contiguous two OFDM symbols, and analog beam is changed at every two OFDM symbols. Also, beam sweeping is operated within timing gap (e.g. 0.5 ms). When NR PBCH is constructed by two OFDM symbols, same beam sweeping operation of NR SS could be assumed for NR PBCH. After NR synchronization signal is detected, UE can expect to receive NR PBCH which has same beam direction within timing gap. If NR PBCH is not transmitted, the time resource could be assigned for other channel/signal transmission.

<10. Frequency Raster>

The raster for NR synchronization signals can be different per frequency range. At least for frequency ranges where NR supports a wider carrier bandwidth and operation in a wider frequency spectrum (e.g. above 6 GHz), the NR synchronization signals raster can be larger than the 100 kHz raster of LTE.

If NR SS is multiplexed in time domain, it may define that the center frequency of synchronization signals is same with the center of transmission bandwidth of SS block. In the present invention, an example of time domain multiplexing for NR SS and NR PBCH within SS block is provided. In this case, it may assume same multiplexing method for both below 6 GHz and below 40 GHz. In particular, as shown in FIG. 35, common definition for center frequency of synchronization signal is applied for both frequency ranges.

Figure 35:
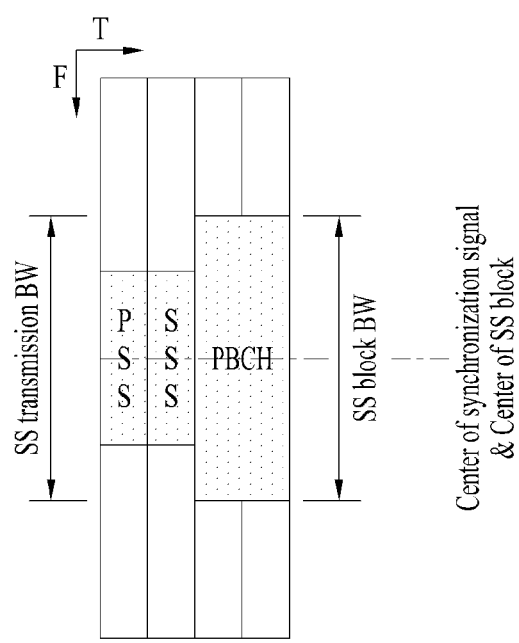

In FIG. 35, UE can assume that both NR synchronization signal and NR PBCH are transmitted at the center frequency of the NR SS block. Based on this assumption, UE can operate synchronization signal detection and PBCH decoding, which are multiplexed in time domain.

Figure 36:
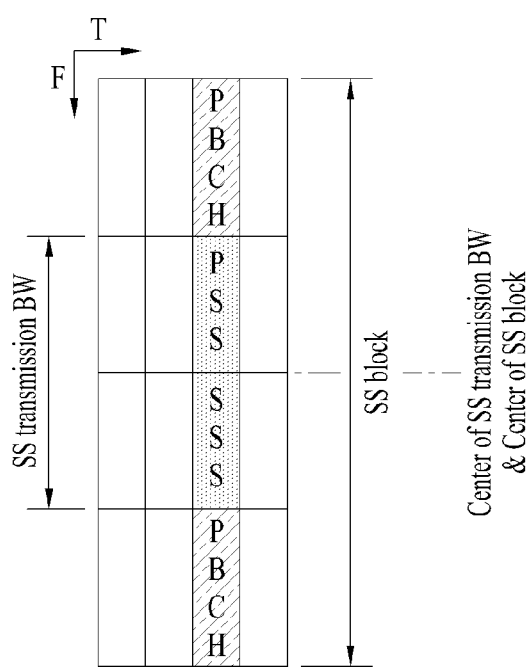

On the other hand, if NR SS is multiplexed in frequency domain, it may define that the center frequency of NR SS transmission bandwidth which is required for both NR PSS and NR SSS is same with the center of transmission bandwidth of SS block as shown in FIG. 36. Furthermore, if PBCH is multiplexed with synchronization signals in frequency domain, it could be possible that PBCH is located at each adjacent frequency band from end of SSS and PSS.

In NR, center of synchronization signal or SS transmission bandwidth can be different from the center of NR carrier. However, for at least initial access, it is needed that UE can operate synchronization signal detection and PBCH demodulation within SS block without any information regarding the position of synchronization signal in NR carrier. Meanwhile, the position of the center of synchronization signal in NR carrier can be indicated for intra frequency/inter frequency measurement.

In an NR system supporting a broadband bandwidth, a channel including a synchronization signal and information required for initial access can be transmitted on a relatively narrow band. A UE attempting to perform initial access assumes a narrow band including a synchronization signal and an initial access channel as a base bandwidth for reception to detect a signal and obtains information for accessing a cell. The base bandwidth may correspond to a minimum bandwidth capable of being transmitted by a base station. For example, LTE defines 1.4 MHz as a minimum bandwidth and maximum 20 MHz bandwidth can be supported on a single carrier. Meanwhile, in the NR system, a minimum bandwidth can be defined by 5 MHz in a band equal to or less than 6 GHz and can be defined by 20 MHz in a band equal to or less than 6 GHz.

If a minimum bandwidth is assumed, a UE is able to search for a synchronization signal and obtain minimum system information. The minimum system information may include a system bandwidth used for a UE to perform initial access and measurement. In this case, it is assumed that a center frequency of the minimum bandwidth is identical to a center frequency of the system bandwidth. In this case, the center frequency may not be matched with a center frequency of NR carrier. A channel required for initial access, a reference signal for performing measurement, and the like can be assigned on the basis of the center frequency of the minimum bandwidth and the system bandwidth. For example, it may be able to assume that a center frequency of a synchronization signal is identical to the center frequency of the minimum bandwidth and a center value of indexes of subcarriers used in the system bandwidth is identical to a position of the center frequency of the system bandwidth. An index used in the system bandwidth can be considered as a local index used in a corresponding band only. In NR carrier, a plurality of system band (or synchronization signal block bandwidth) candidates including a synchronization signal may exist. It is able to manage a frequency index such as a subcarrier and the like using a local index in each of a plurality of the system band candidates. In the NR carrier, it may be able to assume that a plurality of synchronization signals can be transmitted on a different band. A UE attempts to detect a synchronization signal in an initial access step. In this case, the UE assumes a possibility capable of detecting synchronization signals on other bands. If a plurality of synchronization signals are detected, the UE assumes a plurality of the detected synchronization signals as an independent cell or a transmitting end and performs synchronization procedure and a cell access procedure. If minimum system information forwards information on cell access, NR can inform a UE of a band on which the cell access procedure is permitted among a plurality of bands.

NR system can variably manage a period of a synchronization signal for network energy saving. If a UE does not know a transmission period provided by a network, the UE performs synchronization signal detection by assuming a default periodicity.

If a synchronization signal is transmitted with a periodicity slower than the periodicity assumed by the UE, synchronization signal detection capability of the UE is considerably deteriorated. In order to prevent the capability deterioration, at least one or more transmitting ends can transmit a channel including a synchronization signal and initial access-related information with the default periodicity assumed by the UE. In NR carrier having a broad bandwidth, a plurality of synchronization signals can be transmitted. In this case, at least one or more carriers among a plurality of the synchronization signals assume that a synchronization signal is transmitted with the default periodicity of the UE.

If a synchronization signal is transmitted with a periodicity longer than the default periodicity assumed by the UE, it may not transmit the channel including the information for initial access. In this case, a synchronization signal and an RS for performing measurement are transmitted to enable an NR cell to perform measurement even in a long period.

<11. SS Block Composition>

Figure 37:
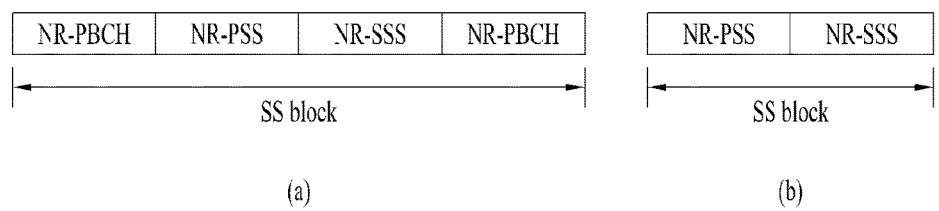

If payload size of PBCH is up to 80 bits, it may assume that total four OFDM symbols are occupied for SS block transmission. Then it is necessary to discuss the time position of NR-PSS/NR-SSS/NR-PBCH within SS block where NR-PSS, NR-SSS and NR-PBCH are presented. In initial access state, NR-PBCH can be used as reference signal for fine time/frequency tracking. In order to enhance the estimation accuracy, it is better that two OFDM symbols for NR-PBCH are located with longer distance. In this aspect, as shown in FIG. 37 ($a$), it is proposed that $1^{st}$ and $4^{th}$ OFDM symbols of SS block are used for NR-PBCH transmission. Also, it can be assumed that $2^{nd}$ OFDM symbol is assigned for NR-PSS, and $3^{rd}$ OFDM symbol is occupied for NR-SSS.

Meanwhile, when NR-SS is transmitted for the purpose of cell measurement or cell discovery, it could be not necessity to transmit both NR-PBCH and SS block time index indication. In this case, as shown in FIG. 37 ($b$), SS block is composed by two OFDM symbols, where $1^{st}$ OFDM symbol is assigned for NR-PSS and $2^{nd}$ OFDM symbol is used for NR-SSS.

Referring to FIG. 38 ($a$), NR-PBCH is allocated within 288 REs, which is 24 RBs. On the other hand, it is decided that the sequence for NR-PSS/NR-SSS has the length of 127, hence it can be assumed that 12 RBs are required for NR-PSS/NR-SSS transmission. For SS block composition, we can define that SS block is allocated within 24 RBs. Also, the value of 24RB is appropriate for RB grid alignment between different numerologies (e.g. 15, 30, 60 kHz). Even NR assumes minimum bandwidth of 5 MHz where 25 RBs for 15 kHz subcarrier spacing can be defined, it should be assumed that 24RBs are used for SS block transmission. Also, it should be defined that NR-PSS/SSS is located at middle of SS Block, which means that NR-PSS/SSS are allocated within $7^{th}$ to $18^{th}$ RBs.

Meanwhile, NR-PSS/NR-SSS/NR-PBCH can be assigned as shown in FIG. 38 ($b$). In particular, NR-PSS is assigned to a symbol #0 and NR-SSS can be assigned to a symbol #2. And, NR-PBCH can be assigned to symbols #1 to #3. In this case, the symbol #1 and the symbol #3 may correspond to dedicated symbols to which the NR-PBCH is mapped. In particular, only the NR-PBCH is mapped to the symbol #1 and the symbol #3 and the NR-SSS and the NR-PBCH can be mapped to the symbol #2 together.

<12. SS Burst Composition>

In the present invention, it is necessary to verify which OFDM symbols are available to transmit SS Block within a slot. A CP type can be semi-statically configured with UE-specific signaling. Also, NR-PSS/SSS can support a normal CP. So, CP detection issue can be eliminated in initial access.

In the NR system, NR can include an extended CP at every 0.5 ms boundary. When SS block is located within a slot or across inter-slot, it could be possible that middle of SS Block is located at 0.5 ms boundary. In this case, different length of CP among NR-PSS/SSS is applied within a SS Block. If UE operates NR-SS detection based on the assumption that normal CP is applied for NR-PSS/SSS, detection performance could be degraded. So, NR should consider that SS block is not located across 0.5 ms boundary.

Figure 39:
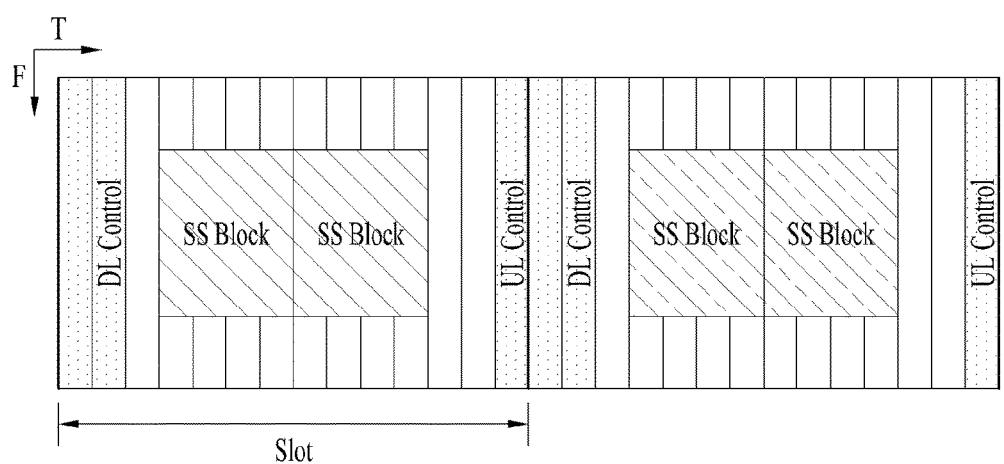
FIGS. 39 to 40 are diagrams for explaining a method of configuring a synchronization signal burst and a synchronization signal burst set.

FIG. 39 illustrates an example of SS burst composition for TDD case. In NR, DL control channel(s) is located at the first OFDM symbol(s) in a slot and/or mini slot, and UL control channel(s) is located around the last transmitted UL symbol(s) of a slot. In order to avoid a collision of SS Block and DL/UL control channel, SS block can be located in the middle of slot.

The maximum number of SS blocks within SS burst set is decided according to frequency ranges. Also, candidate values of SS blocks are determined according to frequency ranges. Meanwhile, based on the example of SS burst composition in FIG. 39, the present invention proposes overall time duration to transmit SS blocks within SS burst set.

TABLE 1

| Subcarrier Spacing | The maximum number of SS block | | | | | |
|---|---|---|---|---|---|---|
| | 1 | 2 | 4 | 8 | 32 | 64 |
| 15 kHz | 1 ms | 1 ms | 2 ms | 4 ms | — | — |
| 30 kHz | — | 0.5 ms | 1 ms | 2 ms | — | — |
| 120 kHz | — | — | — | — | 2 ms | 4 ms |
| 240 kHz | — | — | — | — | 1 ms | 2 ms |

As shown in Table 1, if subcarrier spacing of 30 kHz and 240 kHz are introduced for NR-SS transmission, it can be expected that the SS blocks are transmitted within maximum 2 ms. However, since 15 kHz and 120 kHz are default subcarrier spacing for NR-SS transmission, in order to introduce the subcarrier spacing of 30 kHz and 240 kHz, it is necessary to discuss whether or not to introduce wider minimum system bandwidth (i.e. 10 MHz for 30 kHz subcarrier spacing, 80 MHz for 240 kHz subcarrier spacing). If it is decided that NR supports only minimum system bandwidth of 5 MHz for below 6 GHz and 50 MHz for above 6 GHz, it is necessary to design SS burst set based on 15 kHz and 120 kHz subcarrier spacing. If it is assumed that the maximum number of SS Block is 8 for below 6 GHz and 64 for above 6 GHz, required time for SS Block transmission is 4 ms, which seems quite large system overhead. Also, because short duration is preferable for network energy saving and UE measurement perspective, it should be assumed that candidate position of assignment for SS block transmission is defined within N ms time duration (e.g N=0.5, 1, 2).

<13. SS Burst Set Composition>

Figure 40:
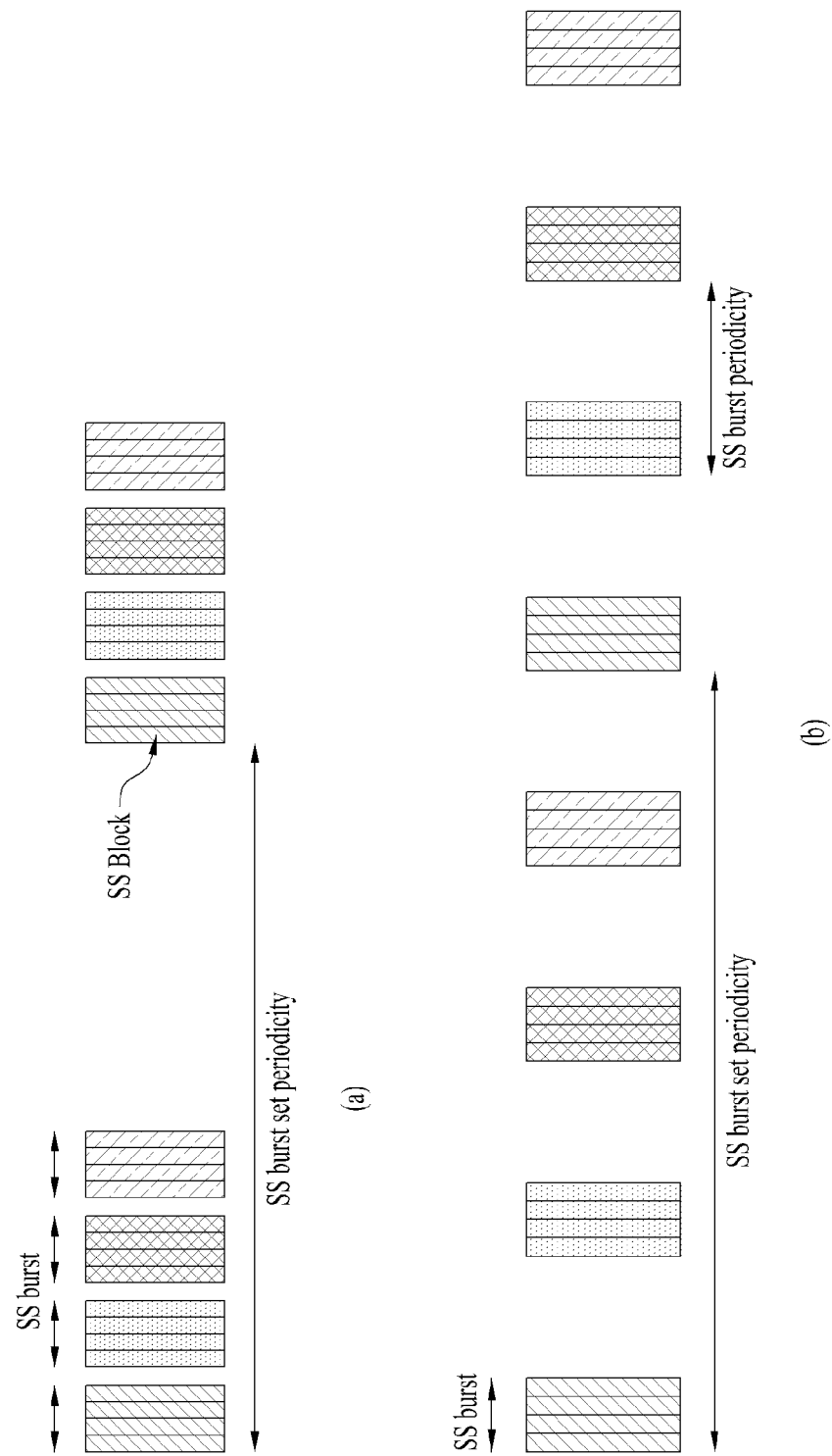

For the SS burst set composition, it may consider two types according to periodicity of SS burst occasion as shown in FIG. 40. The localized type shown in FIG. 40 (a) is that all the SS block is contiguously transmitted within the SS burst set, while the distributed type shown in FIG. 40 (b) is that SS burst is periodically transmitted within the SS burst set periodicity.

In the perspective of energy saving for IDLE UE and efficiency for inter-frequency measurement, the localized type of SS burst occasion provides the benefit compared with the distributed type of SS burst occasion. In this case, it would seem preferable to support the localized type of SS burst occasion.

For initial access, NR can consider that candidate position for SS block transmission within SS burst set periodicity is specified. Also, the position(s) of actual transmitted SS Blocks can be informed for CONNECTED/IDLE mode UE. In this case, network can have a flexibility to utilize resource according to the network condition. However, according to the configuration method to inform actually used SS Block, flexibility to compose SS burst set could be different. For example, if the individual position information of actual transmitted SS Blocks (e.g. bitmap for SS Block or SS burst) can be configured to UE, both localized type and distributed type could be operated according to network condition. This information can be included in other SI which indicates measurement related information.

SS burst set periodicity can be changed and the information of measurement timing/duration for UE can be provided by network configuration. However, it is necessary to determine the candidate position of SS block transmission when SS burst set periodicity is changed. In the present invention, two embodiments are proposed to determine the position of SS block transmission.

Embodiment 1

Network uses the candidate position assumed for default periodicity.

Embodiment 2

Network indicates the actual position to transmit SS-blocks within measurement duration.

In particular, NR can design SS burst set composition for default periodicity. Also, when SS burst set periodicity and measurement duration are indicated by network, the SS burst set composition could be assumed for SS block configuration. For example, if UE assumes 5 ms periodicity as the SS burst set periodicity for measurement in case of no indication from network, it is necessity to compose SS burst set for 5 ms periodicity. Also, the SS burst set composition can be also used for the case of default periodicity (e.g. 20 ms) and network configured periodicity (e.g. 5, 10 20, 40, 80, 160 ms).

On the other hand, if more efficient resource utilization for SS burst set composition is considered, network can indicate the actual position to transmit SS-blocks within measurement duration. For example, in the case of default periodicity, NR-SS and NR-PBCH should be transmitted within SS burst set periodicity. On the other hand, in the case of longer periodicity, only NR-SS could be transmitted for measurement purpose. If network can configure the actual position for SS block transmission, unused resource assigned for NR-PBCH can be assigned for data/control channel. Also, in the case of short periodicity, network selects some part of SS block among SS blocks within SS burst set, and can configure the actually used SS block.

<14. Signal/Channel for Time Index Indication>

SS block time index indication is delivered by NR-PBCH. If the time index indication is contained at a part of NR-PBCH (e.g. NR-PBCH contents, scrambling sequence, CRC, Redundancy Version, etc.), it has an advantage that indication is securely delivered to UE. However, it brings additional complexity of decoding of neighbor cell NR-PBCH. Meanwhile, decoding of NR-PBCH for neighbor cell would be possible, but this cannot be mandated for system design. Also, it is necessary to have further discussion on which signal and channel is appropriate to deliver the SS block time index indication.

In the target cell, the SS block time index information should be securely delivered to UE since the index will be used as the reference information of time resource designation for initial access related channel/signal (e.g. system information delivery, PRACH preamble occasion, etc.). On the other hand, for the purpose of neighbor cell measurement, the time index is used for SS block level RSRP measurement. In this case, highly accurate acquisition performance may not be necessity.

The present invention proposes that NR-PBCH DMRS is used as a signal to deliver SS block time index. Also, the present invention proposes that the time index indication should be included at a part of NR-PBCH. Using this solution, SS block time index can be detected from NR-PBCH DMRS. Then, the detected index can be confirmed by NR-PBCH decoding. And, for the neighbor cell measurement, the index can be obtained from NR-PBCH DMRS for neighbor cell.

The time index indication can be configured by two embodiments in the following.

Embodiment 1

Single index method (i.e. one time index for every SS-block within an SS-burst set)

Embodiment 2

Multiple index method (i.e. combination of SS burst index and SS block index)

If single index method is supported, large number of bits is necessity to express the all possible number of SS blocks within SS burst set periodicity. In this case, DMRS sequence and scrambling sequence for NR-PBCH are preferable to indicate SS block indication.

On the other hand, if multiple index method is applied, the design flexibility for index indication could be provided. For example, both SS burst index and SS block index can be included in single channel. Also, each index can be separately transmitted via different channel/signal. For example, SS burst index is included in NR-PBCH (e.g. contents, scrambling sequence), and the SS block index is delivered by DMRS sequence for NR-PBCH.

<15. SS Block Time Index>

Figure 41:
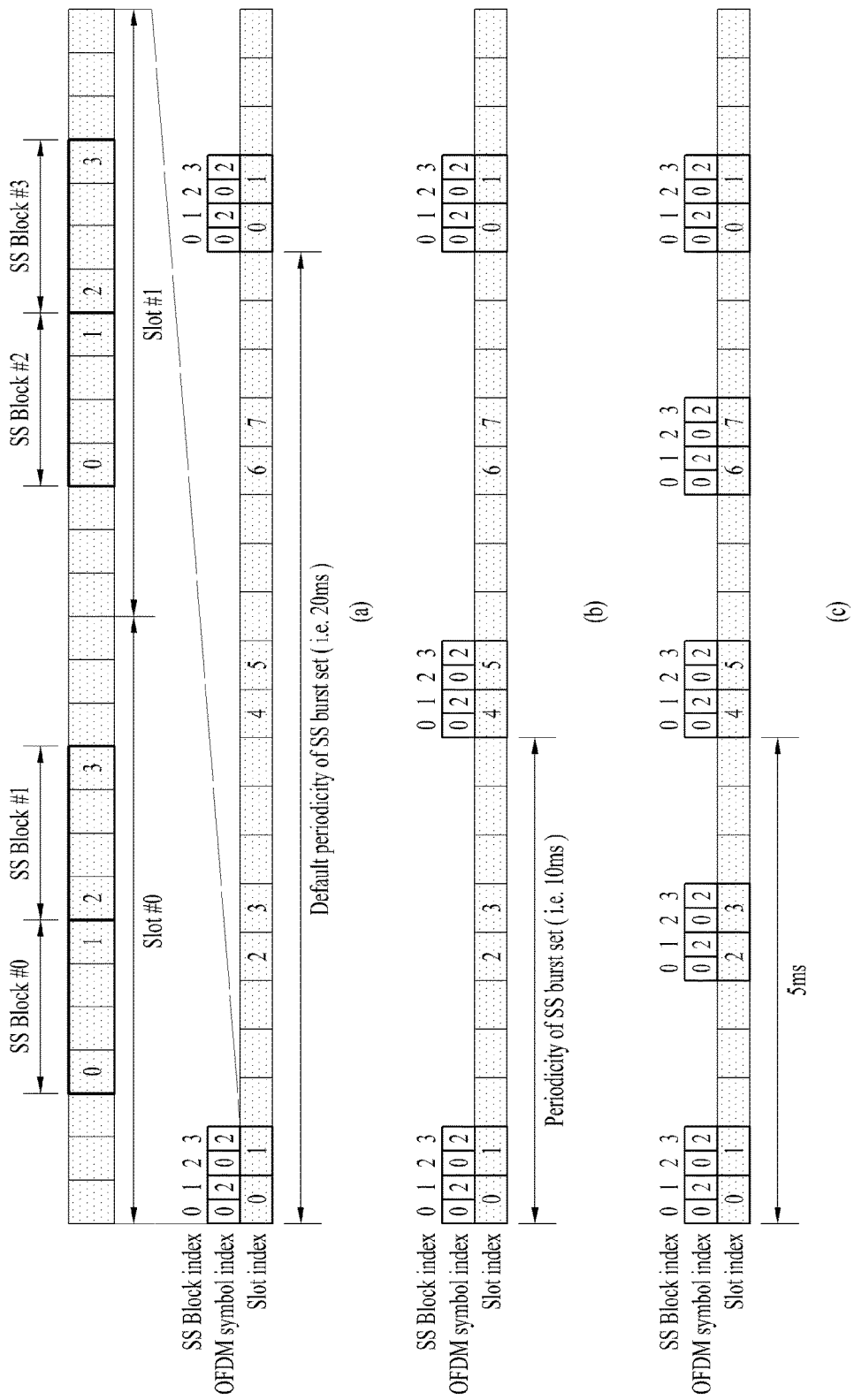
FIGS. 41 to 42 are diagrams for a method of indexing a synchronization signal and a method of indicating the index.

The present invention proposes that SS burst set is composed within shorter duration (e.g. 2 ms) for network and UE energy saving. In this case, all of SS blocks can be located within SS burst set periodicity regardless of the value of periodicity (e.g. 5, 10, 20, 40, 80, 160 ms). FIG. 41 shows an example of SS block index for the case of 15 kHz subcarrier spacing.

SS block index is explained with reference to FIG. 41. If the maximum number of SS block is defined as L, the index of SS block is from 0 to L−1. Also, the SS block index is derived from OFDM symbol index and slot index. In this case, SS burst set is composed by four SS blocks, which is located at contiguous two slots. So, the index of SS block is from 0 to 3, and the index of slot is 0 and 1. Also, SS block is composed by four OFDM symbols, and two OFDM symbols within SS block are used for PBCH transmission. In this case, the index of OFDM symbol is 0 and 2. As shown in FIG. 41 (a), the index of SS block is derived from the index of OFDM symbol and slot. For example, the SS block transmitted at slot#1 and OFDM symbol#2 is mapped to index of 3.

In NR, network can configure the periodicity of SS burst set. Also, shorter periodicity (i.e. 5, 10 ms) can be configured. In this case, more occasions can be assigned for SS block transmission. The index of SS block is identified within configured periodicity of SS burst set. As shown in FIG. 41 (c), in case of 5 ms periodicity, four SS blocks can be transmitted within configured periodicity, and total 16 SS blocks are transmitted within default periodicity. In this case, the index of SS block could be repeated within default periodicity, and four SS blocks among 16 SS blocks have same index.

<16. NR-PBCH Contents>

Based on the response LS from RAN2, it is expected that the payload size of MIB can be extended a bit. Payload size of MIB and NR-PBCH contents expected in NR are as follows.

1) Payload: 64 bits (48 bits information, 16 bits CRC)
2) NR-PBCH Contents:
At least part of SFN/H-SFN
Configuration information for common search space
Center frequency information of NR carrier <17. Transmission Scheme and Antenna Port>

In NR system, NR-PBCH transmission is performed based on single antenna port. For the single antenna port based transmission, it may consider following embodiments as a scheme for NR-PBCH transmission.

Embodiment 1

Time domain precoding vector switching (TD-PVS) scheme

Embodiment 2

Cyclic Delay Diversity (CDD) scheme

Embodiment 3

Frequency domain precoding vector switching (FD-PVS) scheme

According to the transmission scheme, NR-PBCH can achieve transmit diversity gain and/or channel estimation performance gain. TD-PVS and CDD can be considered as candidate of NR-PBCH transmission. On the other hand, FD-PVS is not preferable, because overall performance loss is appeared due to channel estimation loss.

Also, antenna port assumption for NR-SS and NR-PBCH is explained. In initial access state, it is quite natural that NR can consider different antenna port of NR-SS and NR-PBCH in order to provide network flexibility for NR-SS and NR-PBCH transmission. On the other hand, if network configuration is defined, UE can assume that antenna port of NR-SS and NR-PBCH is same or different.

<18. NR-PBCH DM-RS Design>

In NR system, DMRS is introduced for phase reference of NR-PBCH. Also, NR-PSS/NR-SSS/NR-PBCH are presented in every SS block, and OFDM symbols in a single SS block are consecutive. However, if it is assumed that transmission scheme is different between NR-SSS and NR-PBCH, it cannot be assumed that NR-SSS is used as reference signal for NR-PBCH demodulation. Instead, NR should design NR-PBCH based on the assumption that NR-SSS is not used as reference signal for NR-PBCH demodulation.

For the DMRS design, it is necessary to consider DMRS overhead, time/frequency position and scrambling sequence.

Overall PBCH decoding performance can be determined by channel estimation performance and NR-PBCH coding rate. Since the number of RE for DMRS transmission has a trade-off between channel estimation performance and PBCH coding rate, it is necessary to find the appropriate number of RE for DMRS. For example, when 4 REs per RB is assigned for DMRS, better performance can be provided. When two OFDM symbols are assigned for NR-PBCH transmission, 192 REs for DMRS and 384 REs for MIB transmission are used. In this case, when 64 bits of payload size is assumed, 1/12 coding rate can be achieved, which is same coding rate with LTE PBCH.

When multiple OFDM symbols are assigned for NR-PBCH transmission, it is necessary to discuss which OFDM symbol contains DMRS. It is preferable that DMRS is located at every OFDM symbol for NR-PBCH to prevent performance degradation due to residual frequency offset. So, each OFDM symbol for NR-PBCH transmission can include DMRS.

For the OFDM symbol position for NR-PBCH transmission, PBCH DMRS is used as fine time/frequency tracking RS. When longer time distance between two OFDM symbols including DMRS is assumed, it is more beneficial for fine frequency tracking. Hence, $1^{st}$ and $4^{th}$ OFDM symbols can be assigned for NR-PBCH transmission.

Also, regarding on frequency position of DMRS, it may assume the interleaved mapping in frequency domain, which can be shifted according to cell-ID. Equally distributed DMRS pattern could have benefit to use DFT based channel estimation which provides optimal performance in case of 1-D channel estimation. Also, in order to increase channel estimation performance, wideband wide RB bundling can be used.

For sequence of DMRS, pseudo random sequence defined by a type of Gold sequence can be introduced. The length of DMRS sequence can be defined by the number of RE for DMRS per SS block. Also, the DMRS sequence can be generated by cell-ID and slot number/OFDM symbol index within default periodicity of SS burst set (i.e. 20 ms). Also, the index of SS block can be determined based on the index of slot and OFDM symbol.

<19. NR-PBCH TTI Boundary Indication>

NR-PBCH TTI is 80 ms, and default periodicity of SS burst set is 20 ms. It means that NR-PBCH is transmitted four times within NR-PBCH TTI. When NR-PBCH is repeated within NR-PBCH TTI, TTI boundary indication is necessity. Similar with LTE PBCH, NR-PBCH TTI boundary can be indicated by scrambling sequence of NR-PBCH.

Figure 42:
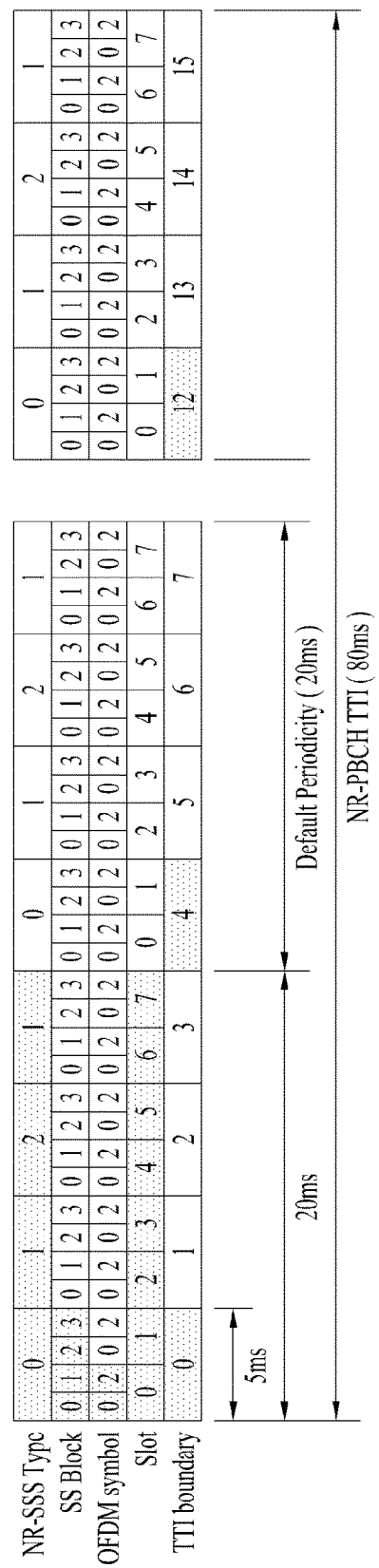

Also, referring to FIG. 42, the scrambling sequence of NR-PBCH can be determined by cell-ID and TTI boundary indication. Because multiple values of SS burst set periodicity are supported, the number of index for TTI boundary indication can be changed according to SS burst set periodicity. For example, four indices are required for default periodicity (i.e. 20 ms), and 16 indices are necessity for shorter periodicity (i.e. 5 ms).

Meanwhile, NR system supports both single beam transmission and multi-beam transmission. When multiple SS blocks are transmitted within SS burst set periodicity, SS block index can be assigned to each of the SS blocks. For the randomization between SS blocks for inter-cell, scrambling sequence should be determined by an index related with SS block. For example, if the index of SS block is derived from the index of slot and OFDM symbol, it can be considered that scrambling sequence of NR-PBCH is determined by the index of slot and OFDM symbols.

If network configures shorter periodicity of SS burst set (i.e. 5, 10 ms), more occasion for SS burst set transmission would be assigned. In this case, UE may have ambiguity regarding the TTI boundary of NR-PBCHs which are transmitted within default periodicity. For NR-PBCH TTI boundary indication for shorter periodicity, it may consider a different scrambling sequence of NR-PBCH for shorter periodicity. For example, if 5 ms of periodicity of SS burst set is assumed, 16 scrambling sequences for NR-PBCH are applied. It may have a benefit to indicate the exact boundary of NR-PBCH transmission within NR-PBCH TTI. On the other hand, blind detection complexity for NR-PBCH decoding is increased. In order to reduce the blind decoding complexity of NR-PBCH, it may introduce different NR-SSS sequence for shorter periodicity in order to distinguish NR-SSS with default periodicity from additionally transmitted NR-SSS within default periodicity.

<20. Soft Combining>

NR should support wise soft combining to at least SS burst set to provide efficient resource utilization and PBCH coverage. Since NR-PBCH is updated every 80 ms and SS burst set is transmitted every 20 ms of default periodicity, at least four times soft combining is possible for NR-PBCH decoding. Also, when shorter periodicity of SS burst set is indicated, more OFDM symbols for PBCH can be used for soft combining.

<21. PBCH Decoding for the Neighboring Cell Measurements>

For the neighbor cell measurement, it has to be decided whether the UE has to decode NR-PBCHs of neighboring cells. Decoding of neighboring cells would increase the UE complexity and it would be better not to increase unnecessary complexity. Therefore, for NR-PBCH design, it should be assumed that UE does not need to decode neighbor cell NR-PBCH for neighbor cell measurement.

On the other hand, if SS block index is delivered by a signal of a specific type, UE can obtain the SS block index of neighbor cells by performing signal detection operation, which could provide a benefit of less complexity. As the signal of the specific type, NR-PBCH DMRS can be considered.

<22. Performance Evaluation>

In the present section, a performance result is explained according to payload size, a transmission scheme and a demodulation reference signal. In this evaluation, assume that two OFDM symbols with 24 RBs are used for NR-PBCH transmission. Also, it is assumed that multiple periodicity of SS burst set (i.e. 10, 20, 40, 80 ms) is assumed, and encoded bits are transmitted within 80 ms.

1. Payload Size and NR-PBCH Resource

Figure 43:
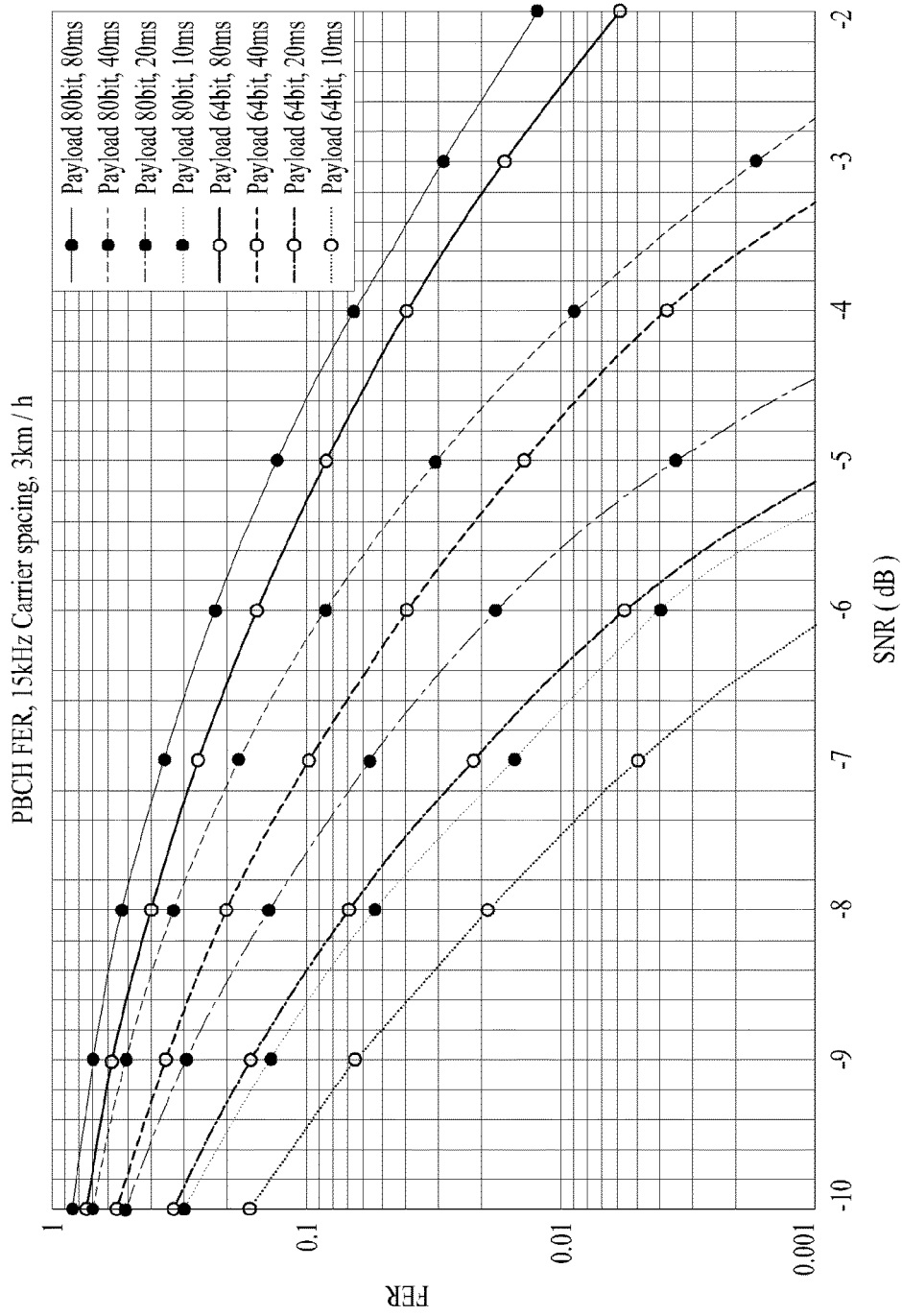

FIG. 43 provides evaluation result according to MIB payload size (i.e. 64, 80 bits). In this evaluation, assume that 384 REs for information and 192 REs for DMRS are used within two OFDM symbols and 24 RBs. Also, single antenna port based transmission scheme (i.e. TD-PVS) is assumed.

Referring to FIG. 43, it is able to observe that NR-PBCH with 20 ms periodicity can provide 1% error rate at −6 dB SNR. Also, it is observed that performance of 64 bits of payload case have 0.8 dB gain than that of 80 bits of payload case. So, if payload size between 64 bits and 80 bits is assumed, the performance requirement of NR-PBCH (i.e. 1% BLER at −6 dB SNR) can be satisfied using 24RBs and two OFDM symbols.

2. Transmission Scheme

Figure 44:
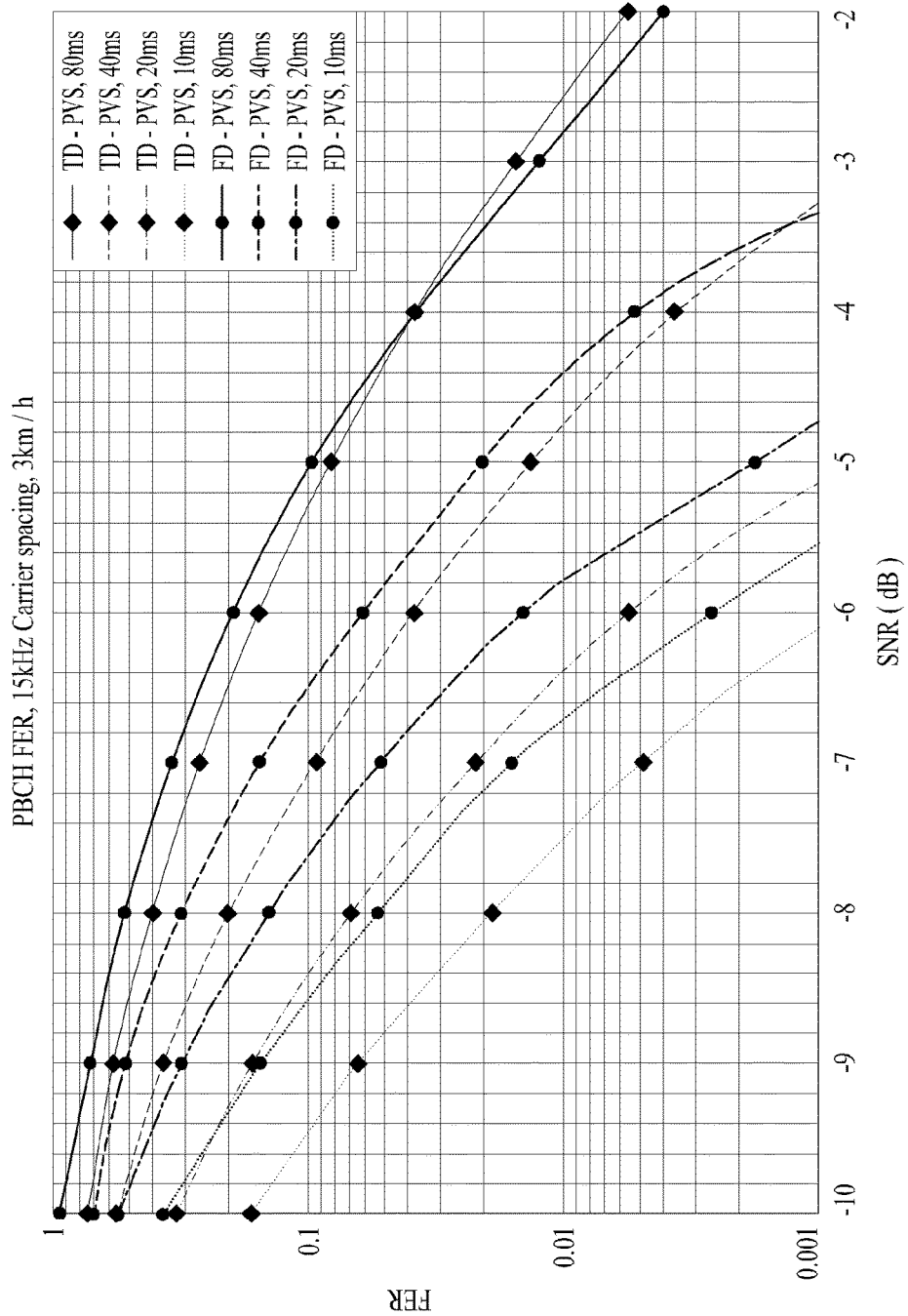

FIG. 44 provides evaluation result according to NR-PBCH transmission schemes (i.e. TD-PVS and FD-PVS). Note that precoders are cycled in every PBCH transmission subframe (e.g. 20 ms) for TD-PVS and every N RBs (e.g. N is 6) for FD-PVS. Also, in FIG. 44, assume several periodicity of SS burst set (i.e. 10, 20, 40, 80 ms), and soft combining of NR-PBCH across SS burst set within 80 ms.

As shown in FIG. 44, Time-Domain Precoding Vector Switching (TD-PVS) scheme shows better performance than Frequency-Domain Precoding Vector Switching (FD-PVS) due to better channel estimation performance. In this evaluation, it is able to see that channel estimation performance is more important than transmit diversity gain in very low SNR region.

3. DMRS Density

Figure 45:
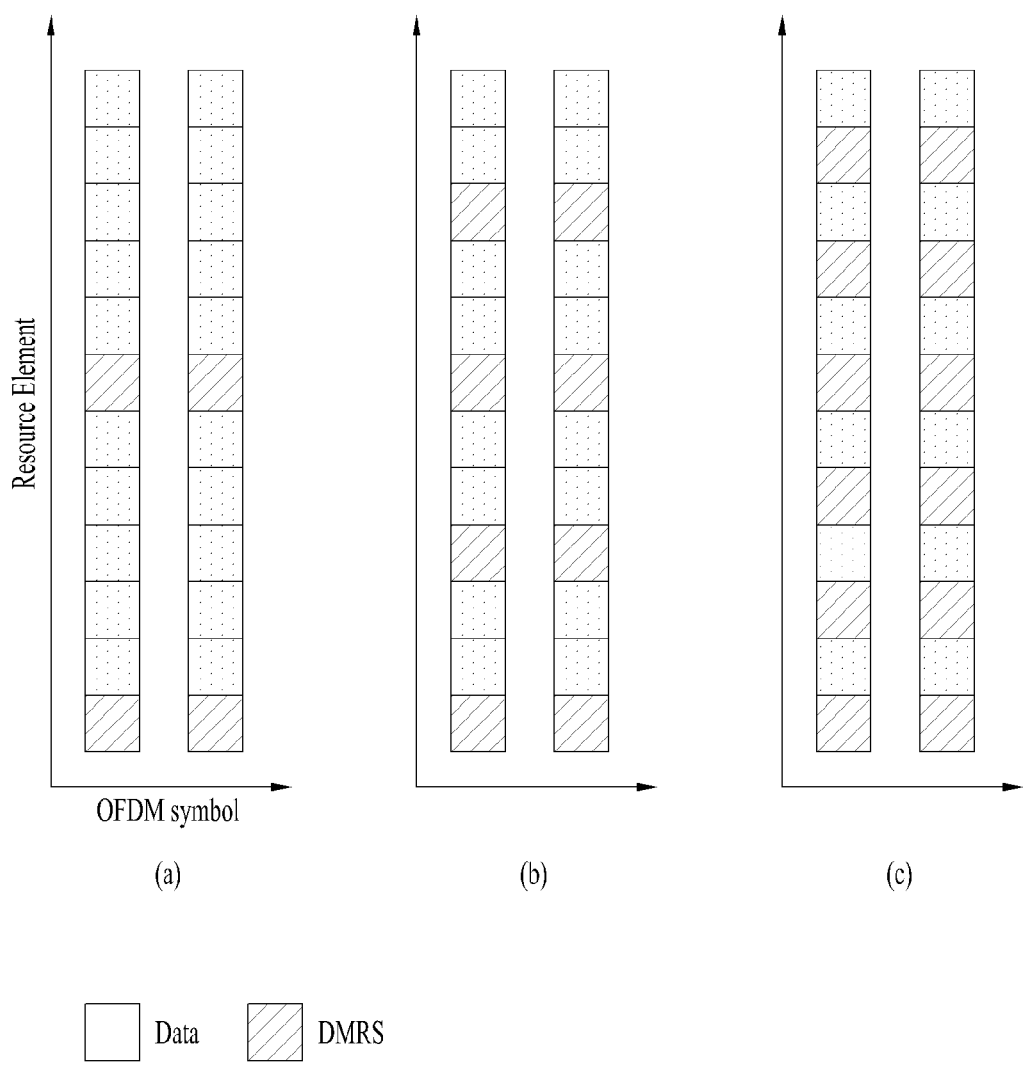

At the low SNR region, channel estimation performance enhancement is an important factor for demodulation performance enhancement. However, when RS density of NR-PBCH is increased, the channel estimation performance is improved, but coding rate is decreased. So, in order to see the trade-off between channel estimation performance and channel coding gain, the decoding performances are compared with each other according to DMRS density. FIG. 45 illustrates an example of the DMRS density.

FIG. 45 (*a*) shows a case that 2 REs per symbol are used for DMRS, FIG. 45 (*b*) shows a case that 4 REs per symbol are used for DMRS, and FIG. 45 (*c*) shows a case that 6 REs per symbol are used for DMRS. Note that single port based transmission scheme (i.e. TD-PVS) is used for this evaluation.

FIG. 45 shows DMRS pattern for single antenna port based transmission. Referring to FIG. 45, DMRS position in frequency domain is changed according to RS density, which keeps equal distance between reference signals. Also, in FIG. 46, it shows performance result according to reference signal density of DMRS.

Figure 46:
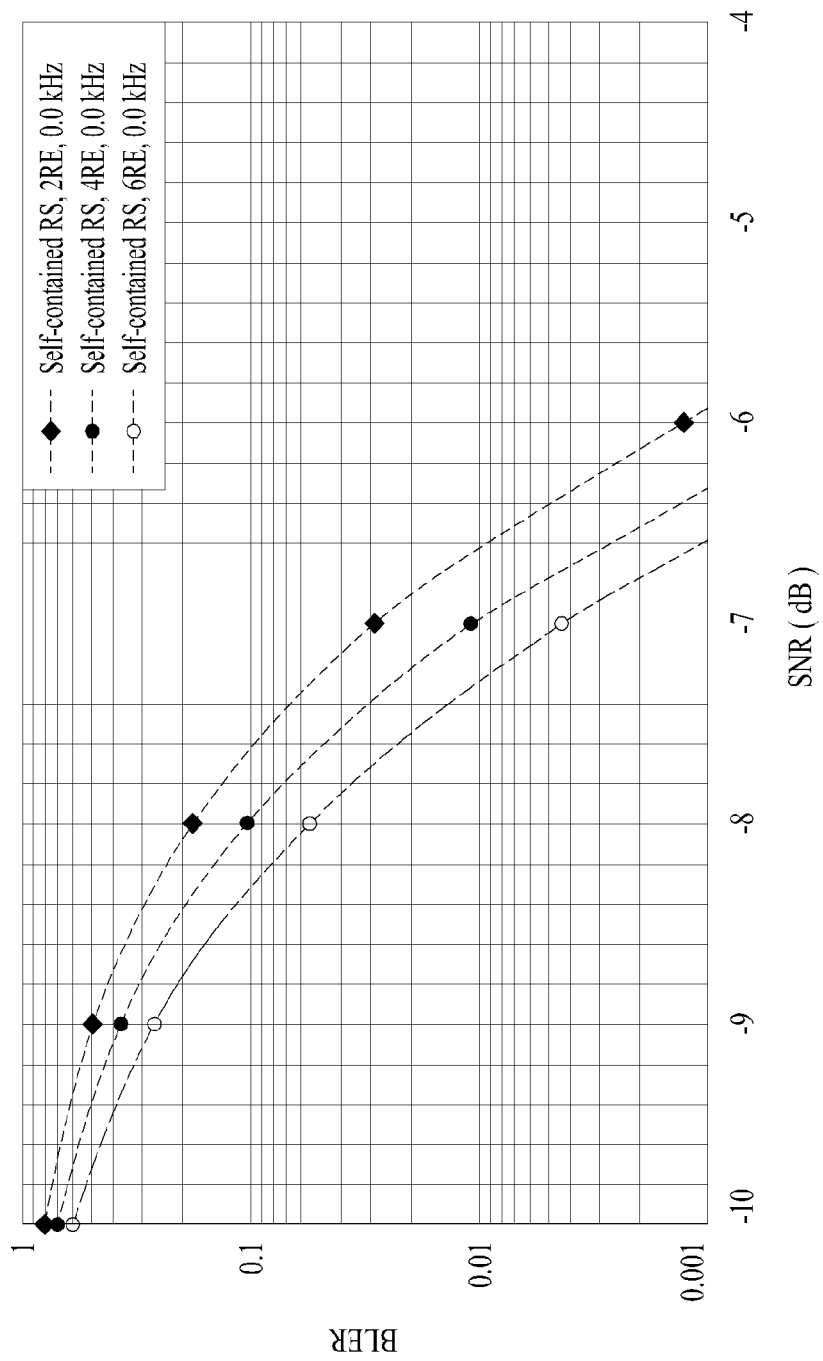

As shown in FIG. 46, NR-PBCH decoding performance shown in FIG. 45 (*b*) is better than performance shown in FIG. 45 (*a*) because of better channel estimation performance. On the other hand, FIG. 45 (*c*) shows worse performance than FIG. 45 (*b*), because the effect of the coding rate loss is greater than the gain of channel estimation performance enhancement. Due to the aforementioned reasons, 4 RE per symbol seems proper point of RS density.

4. DMRS Time Position and CFO Estimation

If NR supports self-contained DMRS, it is able to perform fine frequency offset tracking on NR-PBCH using self-contained DMRS. Since frequency offset estimation accuracy depends on the OFDM symbol distance, it may assume three types of NR-PBCH symbol spacing as shown in FIG. 47.

This simulation is performed on SNR −6 dB, and 10% CFO (1.5 kHz) is applied over samples in a subframe. 4 REs per symbol are used as self-contained RS, and located on the symbols where PBCH is transmitted.

Figure 48:
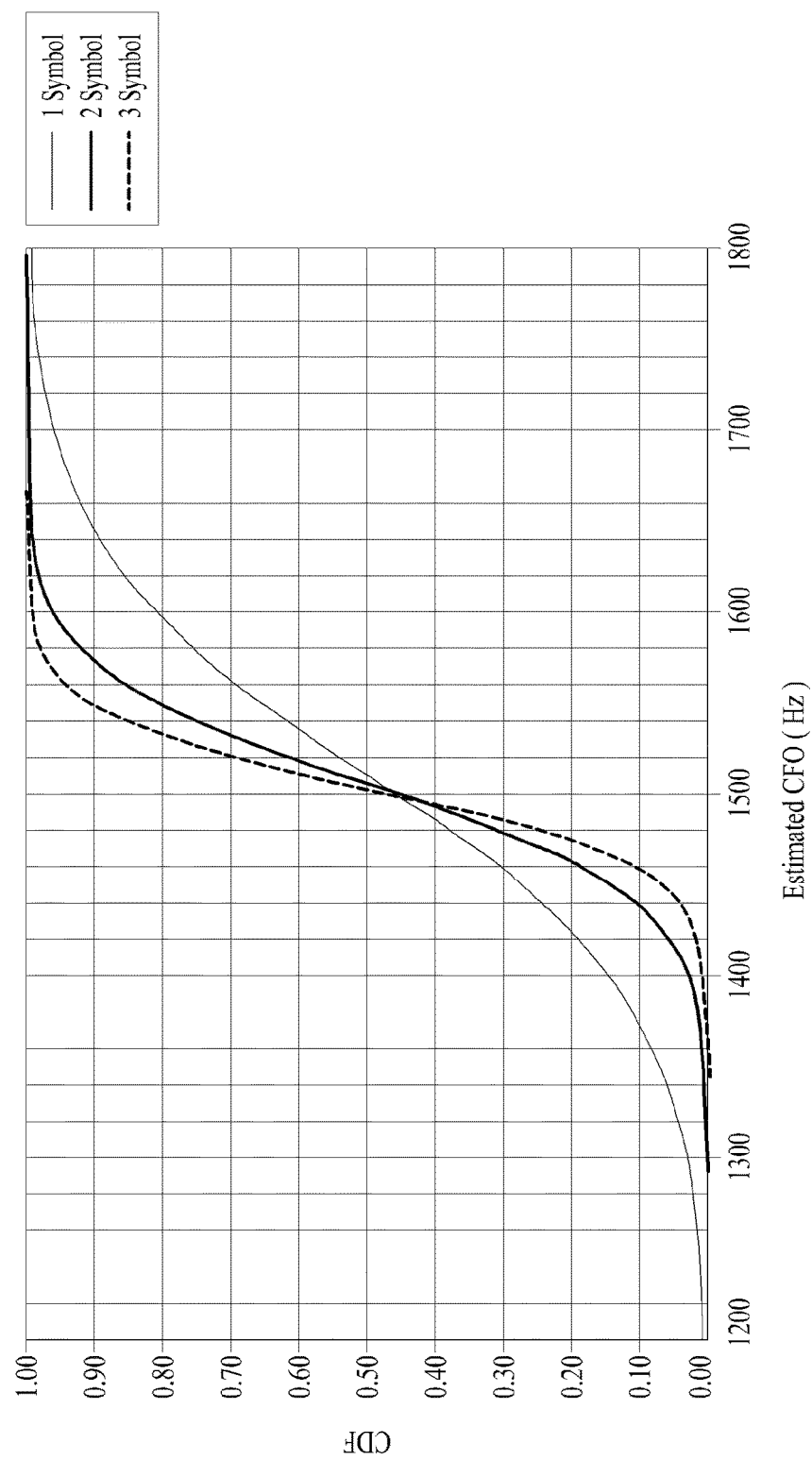
Figure 49:
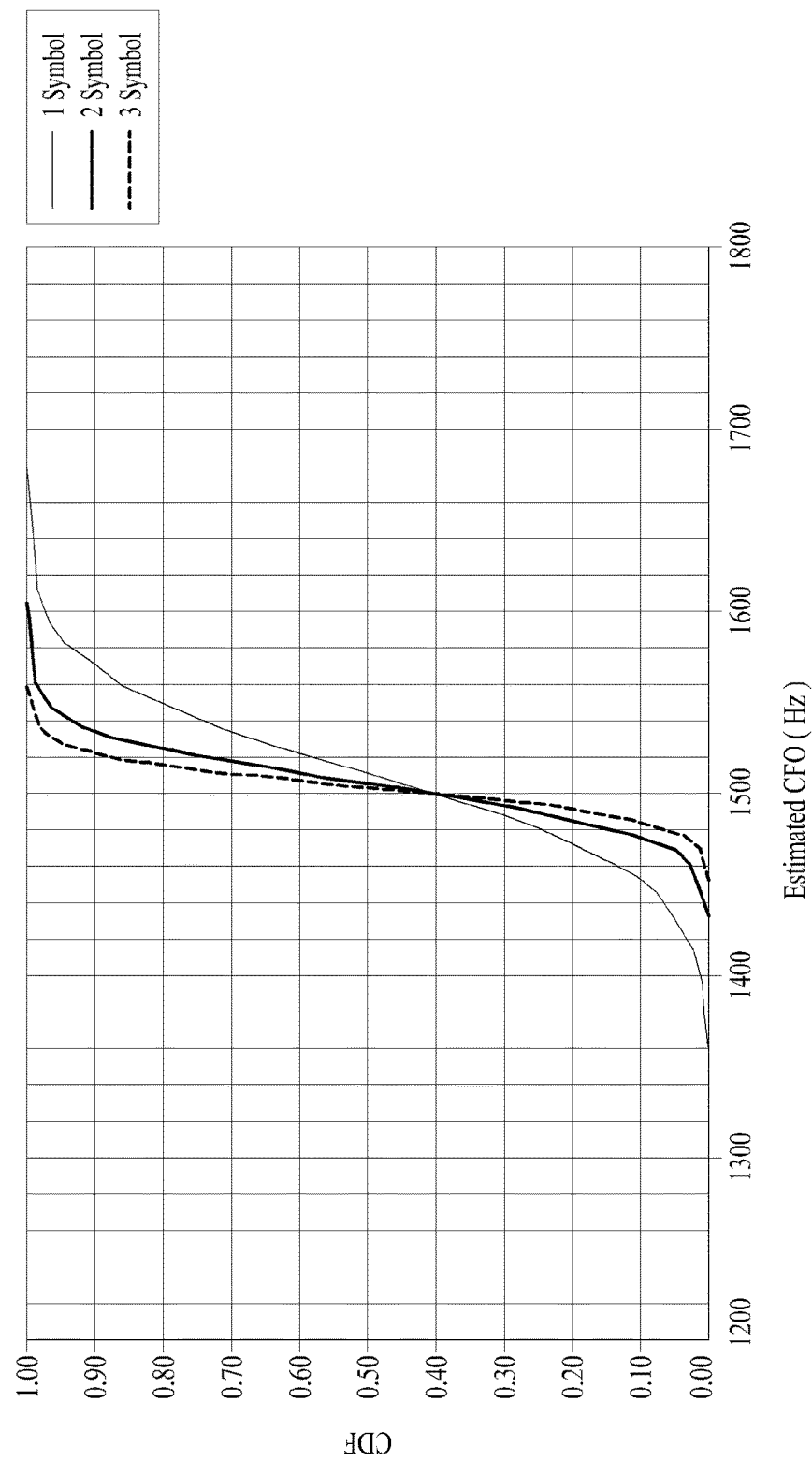

FIGS. 48 and 49 show CDF of estimated CFO according to different NR-PBCH symbol spacing. As shown in FIGS. 48 and 49, CFO of 1.5 kHz is well estimated within error of ±200 Hz by 90% of UEs in both cases, and if at least 2 symbols are introduced as NR-PBCH symbol spacing, 95% of UEs shows error within ±200 Hz, and 90% of UEs shows error within ±100 Hz in both cases.

CFO estimation performance is better when the spacing between PBCH symbols is larger, because phase offset caused by the CFO grows large as spacing increase, making easy to measure phase offset with similar effect as noise suppression. Also, large average window helps the accuracy of CFO estimation.

Figure 50:
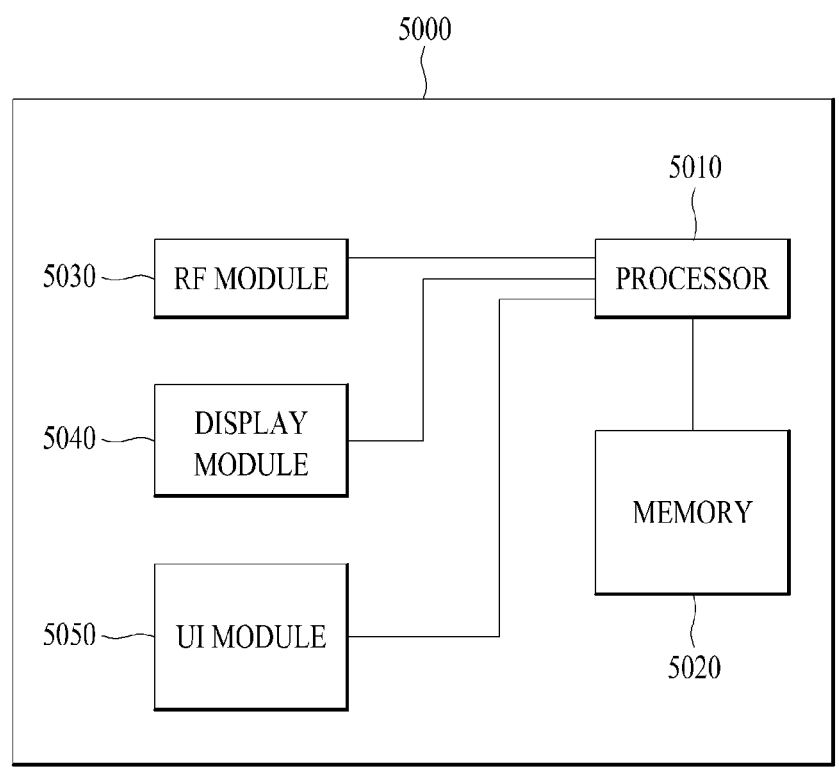
FIG. 50 is a block diagram of a communication apparatus according to an embodiment of the present disclosure.

FIG. 50 is a block diagram of a communication apparatus according to an embodiment of the present disclosure.

Referring to FIG. 50, a communication apparatus 5000 includes a processor 5010, a memory 5020, an RF module 5030, a display module 5040, and a User Interface (UI) module 5050.

The communication device 5000 is shown as having the configuration illustrated in FIG. 50, for the convenience of description. Some modules may be added to or omitted from the communication apparatus 5000. In addition, a module of the communication apparatus 5000 may be divided into more modules. The processor 5010 is configured to perform operations according to the embodiments of the present disclosure described before with reference to the drawings. Specifically, for detailed operations of the processor 5010, the descriptions of FIGS. 1 to 49 may be referred to.

The memory 5020 is connected to the processor 5010 and stores an Operating System (OS), applications, program codes, data, etc. The RF module 5030, which is connected to the processor 5010, upconverts a baseband signal to an RF signal or downconverts an RF signal to a baseband signal. For this purpose, the RF module 5030 performs digital-to-analog conversion, amplification, filtering, and frequency upconversion or performs these processes reversely. The display module 5040 is connected to the processor 5010 and displays various types of information. The display module 5040 may be configured as, not limited to, a known component such as a Liquid Crystal Display (LCD), a Light Emitting Diode (LED) display, and an Organic Light Emitting Diode (OLED) display. The UI module 5050 is connected to the processor 5010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of transmitting a synchronization signal block, which is transmitted by a base station in a wireless communication system, the method comprising:
   mapping a synchronization signal block containing a primary synchronization signal (PSS), an secondary synchronization signal (SSS), and a physical broadcasting channel (PBCH) to a plurality of symbols; and
   transmitting the synchronization signal block mapped to the plurality of the symbols to a user equipment,
   wherein, in a symbol to which the PSS is mapped, in a symbol to which the SSS is mapped, and in a symbol to which only the PBCH is mapped,
      centers of subcarriers to which the PSS, the SSS, and the PBCH are mapped are the same, and
      the number of subcarriers to which the PBCH is mapped is greater than the number of subcarriers to which the PSS and the SSS are mapped.

2. The method of claim 1, wherein the PBCH is mapped to a plurality of symbols and wherein the symbol to which the SSS is mapped is located between symbols to which only the PBCH is mapped.

3. The method of claim 2, wherein all of the symbols to which the PBCH is mapped comprise a plurality of DMRSs.

4. The method of claim 3, wherein a plurality of the DMRSs are arranged with an equal interval in each of the symbols to which the PBCH is mapped.

5. The method of claim 1, wherein subcarrier spacing for the SSS is identical to subcarrier spacing for the PBCH.

6. The method of claim 2, wherein the SSS is mapped to at least one symbol among a plurality of the symbols to which the PBCH is mapped.

7. The method of claim 6, wherein subcarriers to which the PBCH is mapped, in the at least one symbol to which the PBCH and the SSS are mapped, are located at the top or the bottom of a frequency axis of subcarriers to which the SSS is mapped.

8. The method of claim 1, wherein the PSS, the SSS, and the PBCH are mapped to a plurality of contiguous symbols.

9. A method of receiving a synchronization signal block, which is received by a user equipment (UE) in a wireless communication system, the method comprising:
   receiving, from a base station, a synchronization signal block,
   wherein a primary synchronization signal (PSS), an secondary synchronization signal (SSS), and a physical broadcasting channel (PBCH) contained the synchronization signal block are mapped to a plurality of symbols; and
   wherein, in a symbol to which the PSS is mapped, in a symbol to which the SSS is mapped, and in a symbol to which only the PBCH is mapped,
      centers of subcarriers to which the PSS, the SSS, and the PBCH are mapped are the same, and
      the number of subcarriers to which the PBCH is mapped is greater than the number of subcarriers to which the PSS and the SSS are mapped.

10. The method of claim 9, wherein the PBCH is mapped to a plurality of symbols and wherein the symbol to which the SSS is mapped is located between symbols to which only the PBCH is mapped.

11. The method of claim 10, wherein all of the symbols to which the PBCH is mapped comprise a plurality of DMRSs.

12. The method of claim 11, wherein a plurality of the DMRSs are arranged with an equal interval in the symbols to which the PBCH is mapped.

13. The method of claim 10, wherein the SSS is mapped to at least one symbol among a plurality of the symbols to which the PBCH is mapped.

14. The method of claim 13, wherein subcarriers to which the PBCH is mapped, in the at least one symbol to which the PBCH and the SSS are mapped, are located at the top or the bottom of a frequency axis of subcarriers to which the SSS is mapped.

15. A user equipment (UE) receiving a synchronization signal block in a wireless communication system, the UE comprising:
   an RF unit configured to transceive a radio signal with a base station; and
   a processor connected with the RF unit configured to:
   receive, from a base station, a synchronization signal block,
   wherein a primary synchronization signal (PSS), an secondary synchronization signal (SSS), and a physical broadcasting channel (PBCH) contained the synchronization signal block are mapped to a plurality of symbols; and
   wherein, in a symbol to which the PSS is mapped, in a symbol to which the SSS is mapped, and in a symbol to which only the PBCH is mapped,
      centers of subcarriers to which the PSS, the SSS, and the PBCH are mapped are the same, and
      the number of subcarriers to which the PBCH is mapped is greater than the number of subcarriers to which the PSS and the SSS are mapped.

16. The UE of claim 15, wherein the PBCH is mapped to a plurality of symbols and wherein the symbol to which the SSS is mapped is located between symbols to which only the PBCH is mapped.

17. The UE of claim 16, wherein all of the symbols to which the PBCH is mapped comprise a plurality of DMRSs.

18. The UE of claim 17, wherein a plurality of the DMRSs are arranged with an equal interval in the symbols to which the PBCH is mapped.

19. The UE of claim 15, wherein the SSS is mapped to at least one symbol among a plurality of the symbols to which the PBCH is mapped.

20. The UE of claim 19, wherein subcarriers to which the PBCH is mapped, in the at least one symbol to which the PBCH and the SSS are mapped, are located at the top or the bottom of a frequency axis of subcarriers to which the SSS is mapped.

* * * * *